United States Patent
Garg

(10) Patent No.: US 10,812,661 B2
(45) Date of Patent: Oct. 20, 2020

(54) USER CONTROLLED CALL MANAGEMENT

(71) Applicant: NATIONAL UNIVERSITY OF SINGAPORE, Singapore (SG)

(72) Inventor: Hari Krishna Garg, Singapore (SG)

(73) Assignee: National University of Singapore, Singapore (SG)

( * ) Notice: Subject to any disclaimer, the term of this patent is extended or adjusted under 35 U.S.C. 154(b) by 702 days.

(21) Appl. No.: 14/901,510

(22) PCT Filed: Jun. 27, 2014

(86) PCT No.: PCT/SG2014/000310
§ 371 (c)(1),
(2) Date: Dec. 28, 2015

(87) PCT Pub. No.: WO2014/209236
PCT Pub. Date: Dec. 31, 2014

(65) Prior Publication Data
US 2016/0150089 A1  May 26, 2016

Related U.S. Application Data

(60) Provisional application No. 61/891,969, filed on Oct. 17, 2013, provisional application No. 61/840,740, filed on Jun. 28, 2013.

(51) Int. Cl.
*H04M 7/00* (2006.01)
*H04L 29/08* (2006.01)
*H04M 3/42* (2006.01)

(52) U.S. Cl.
CPC ............ *H04M 7/006* (2013.01); *H04L 67/02* (2013.01); *H04M 3/42085* (2013.01);
(Continued)

(58) Field of Classification Search
CPC combination set(s) only.
See application file for complete search history.

(56) References Cited

U.S. PATENT DOCUMENTS 6,731,609 B1 * 5/2004 Hirni ................... H04L 12/1813
370/260
6,731,735 B1  5/2004 Cook
(Continued)

FOREIGN PATENT DOCUMENTS

WO  2001/0041412 A2  6/2001
WO  2010/0030702 A1  3/2010

OTHER PUBLICATIONS

Examination Report No. 4 from the Intellectual Property Office of Australia for Application No. 2014299320 dated Jun. 18, 2018, 4 pages.
(Continued)

*Primary Examiner* — Michael J Moore, Jr.
(74) *Attorney, Agent, or Firm* — Michael Best & Friedrich LLP

(57) ABSTRACT

A system and methods for call facilitation are provided. The system includes interfaces to call handling networks for receiving or transmitting information by voice, data, email or internet protocol, a storage means and a processing means. The storage means stores caller and/or callee associated information. And the processing means initiates and controls calls to one or more of the call handling networks utilizing associated information corresponding to the caller and the callee of the calls. The associated information includes identification information, calling rules, authentication information, and electronic addresses for each caller and/or callee. In addition, a method for facilitation of a call between a caller and a callee includes setting-up and/or controlling the call in response to information in one or more
(Continued)

URL links accessed by the caller and/or the callee via their electronic addresses and/or online accounts.

20 Claims, 36 Drawing Sheets

(52) U.S. Cl.
CPC .... *H04M 7/003* (2013.01); *H04M 2203/2016* (2013.01); *H04M 2203/6081* (2013.01)

(56) References Cited

U.S. PATENT DOCUMENTS

| | | | |
|---|---|---|---|
| 6,978,004 B1 | 12/2005 | Levine | |
| 8,229,097 B2 | 7/2012 | Brooks et al. | |
| 8,325,895 B2* | 12/2012 | Nishide | H04M 3/382 |
| | | | 370/260 |
| 2002/0046279 A1 | 4/2002 | Chung | |
| 2002/0067812 A1* | 6/2002 | Fellingham | H04M 1/56 |
| | | | 379/93.25 |
| 2003/0026394 A1* | 2/2003 | Chapman | H04M 7/1295 |
| | | | 379/93.01 |
| 2003/0064715 A1* | 4/2003 | Sugane | H04M 1/72522 |
| | | | 455/414.1 |
| 2004/0202303 A1* | 10/2004 | Costa-Requena | H04M 3/56 |
| | | | 379/205.01 |
| 2007/0294354 A1 | 12/2007 | Sylvain | |
| 2008/0037729 A1* | 2/2008 | Mobin | H04M 7/003 |
| | | | 379/88.17 |
| 2009/0252159 A1* | 10/2009 | Lawson | H04M 7/0021 |
| | | | 370/352 |
| 2011/0069661 A1* | 3/2011 | Waytena, Jr. | H04L 67/303 |
| | | | 370/328 |
| 2012/0106574 A1 | 5/2012 | Sylvain | |
| 2014/0270129 A1* | 9/2014 | Bracken | H04M 3/565 |
| | | | 379/202.01 |
| 2014/0333713 A1* | 11/2014 | Shoemake | H04L 65/1069 |
| | | | 348/14.05 |
| 2015/0180981 A1* | 6/2015 | Tan | H04M 7/003 |
| | | | 709/219 |

OTHER PUBLICATIONS

Examination Report No. 1 from the Intellectual Property Office of Australia for Application No. 2014299320 dated Jul. 25, 2017 (6 pages).

Examination Report No. 2 from the Intellectual Property Office of Australia for Application No. 2014299320 dated Nov. 15, 2017 (4 pages).

Ott, J., 'SIP Conferencing', IIR. SIP Congress 2001 Stockholm, Sweden, May 21-24, 2001.

Johnston et al., "Session Initiation Protocol (SIP), Call Control—Conferencing for User Agents," rfc: 4579, Microsoft Corporation, Aug. 2006, 43 pages.

Examination Report No. 3 from the Intellectual Property Office of Australia for Application No. 2014299320 dated Mar. 2, 2018, 6 pages.

* cited by examiner

USER CONTROLLED CALL MANAGEMENT

PRIORITY CLAIM

The present application claims priority to U.S. Provisional Patent Application Nos. 61/840,740, filed Jun. 28, 2013 and 61/891,969, filed Oct. 17, 2013.

FIELD OF THE EMBODIMENTS

The present embodiments generally relate to methods and systems for user-controlled call management, and more particularly relates to methods and systems for facilitation of a call between a caller and a callee utilizing one or more of URL links, caller/callee identification information, calling rules, authentication information, and electronic addresses.

BACKGROUND

The internet is the primary, though not limiting, example of a data network used by users for accessing information made available over the internet (an intranet also being included whenever internet is mentioned). Broadband internet can be accessed by an electronic device via a wired connection (e.g., LAN, WAN, DSL, or cable), a wireless connection (e.g., WiFi, satellite, or Bluetooth), a cellular connection (e.g., 3G, LTE, 4G, WiMAX, or WCDMA), or other equivalent means. Also, voice calling is used for communication between two or more persons in real-time using voice. Currently, many voice calling systems have been enhanced to include video calling.

Systems have also been disclosed whereby a data call is used to set-up a voice call. Such systems can either be web-based or be "app" based (i.e., using an "app" running on mobile devices). However, such conventional systems suffer from the drawback that they disclose the use of internet and data calls to set-up a voice call from a single caller to a single callee's electronic address using internet or "apps". Conventional systems are also known which route an incoming call to a callee's registered phone number to a different electronic address of the callee per the electronic address of the caller and the settings and preferences of the callee made known to system in advance using an on-line callee account on a data/internet server.

However, such conventional solutions only provide for a callee to be able to set the voice call to be received at an electronic address of his choice. In other words, the caller can only initiate the call to one electronic address of the callee and also use only one of his electronic addresses for calling. If a callee is not available at the designated electronic address, a caller may have to dial the electronic addresses of the callee (known to caller) one electronic address at a time till the callee answers the call.

Furthermore, other typical systems suffer from the drawback that they disclose use of internet and data calls to set-up voice call from a single caller to a single callee electronic address using internet or "apps". For example, a two-step method has been described for a caller to be able to call multiple phone numbers of a callee by calling a dedicated access code first that is used for validating the calling party and then have the calling party enter valid list identification via IVR. This method can be highly inconvenient to the caller as it involves two steps. Also, it describes calls to only the callee's phone numbers and no other type of electronic address.

In very limited environments, a call can be automatically shifted from/to a cellular network to/from a WiFi network on the same device if the device detects simultaneous presence of both networks instead of presence of only one of the networks. However, such conventional systems give no control to the user in terms of device or electronic address or connectivity. For example, one such system provides for a change of network on the same device but does not maintain continuity of a voice or a data call. Another known system provides for an ongoing session to be suspended at one device and then continued at another. Again, no continuity of a voice/data call can be provided. In a third such system, a method is provided for a continued VoIP call based on the measurements of signal quality and a change-over if a communication link falls below a threshold. All of these conventional methods suffer from the drawback that they either do not provide for a seamless change-over or they are based on signal quality and not user preference. Also, none of these methods provide for voice calls that take place over regular phones (such as landlines or cellular phones).

Other prior art systems provide for calls from a landline phone line to a softphone. These systems, however, suffer from many drawbacks. For example, they do not take into account the fact that multiple phones can be connected to a landline phone line and hence do not provide for any system and method to manage such situations. Also, the adapter in one such system acts as a PBX and does not provide for any means for the user using the soft phone to join an ongoing call.

Current systems and methods also do not utilize the power of data call and voice call simultaneously to provide for a rich calling experience. Simultaneous presence and availability of multiple devices/electronic addresses/networks to both the caller and/or callee devices is not utilized together (simultaneously or near-simultaneously termed together as simultaneously), resulting in a less than acceptable experience given present available technology.

Thus, what are needed are methods and systems for user controlled call management that seeks to address at least one of the abovementioned problems to provide efficient, robust and user-friendly user controlled call management. Furthermore, other desirable features and characteristics will become apparent from the subsequent detailed description and the appended claims, taken in conjunction with the accompanying drawings and this background of the disclosure.

SUMMARY

According to the Detailed Description, a system for call facilitation is provided. The system includes one or more interfaces to call handling networks, storage means and processing means for call initiation and/or call control. The one or more interfaces to call handling networks receive or transmit information by voice, data, email or internet protocol. The storage means stores caller and/or callee associated information. And the processing means is coupled to the one or more interfaces and the storage means for initiating and controlling calls by voice, data, email or internet protocol to one or more of the call handling networks between a caller and a callee utilizing the associated information corresponding to the caller and callee. The associated information for each caller and/or callee stored in the storage means includes one or more of identification information, calling rules, authentication information, and electronic addresses.

In addition, a method for facilitation of a call between a caller and a callee is provided. The method includes setting-up and/or controlling the call in response to information in one or more URL links accessed by the caller and/or the callee via their electronic addresses and/or on-line accounts.

Also, a method for allowing one or more electronic devices to participate in a phone call over a land-line phone line is provided. The method includes the step of emulating one or more land-line phone lines using the Internet.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with a present embodiment.

Figure 1:
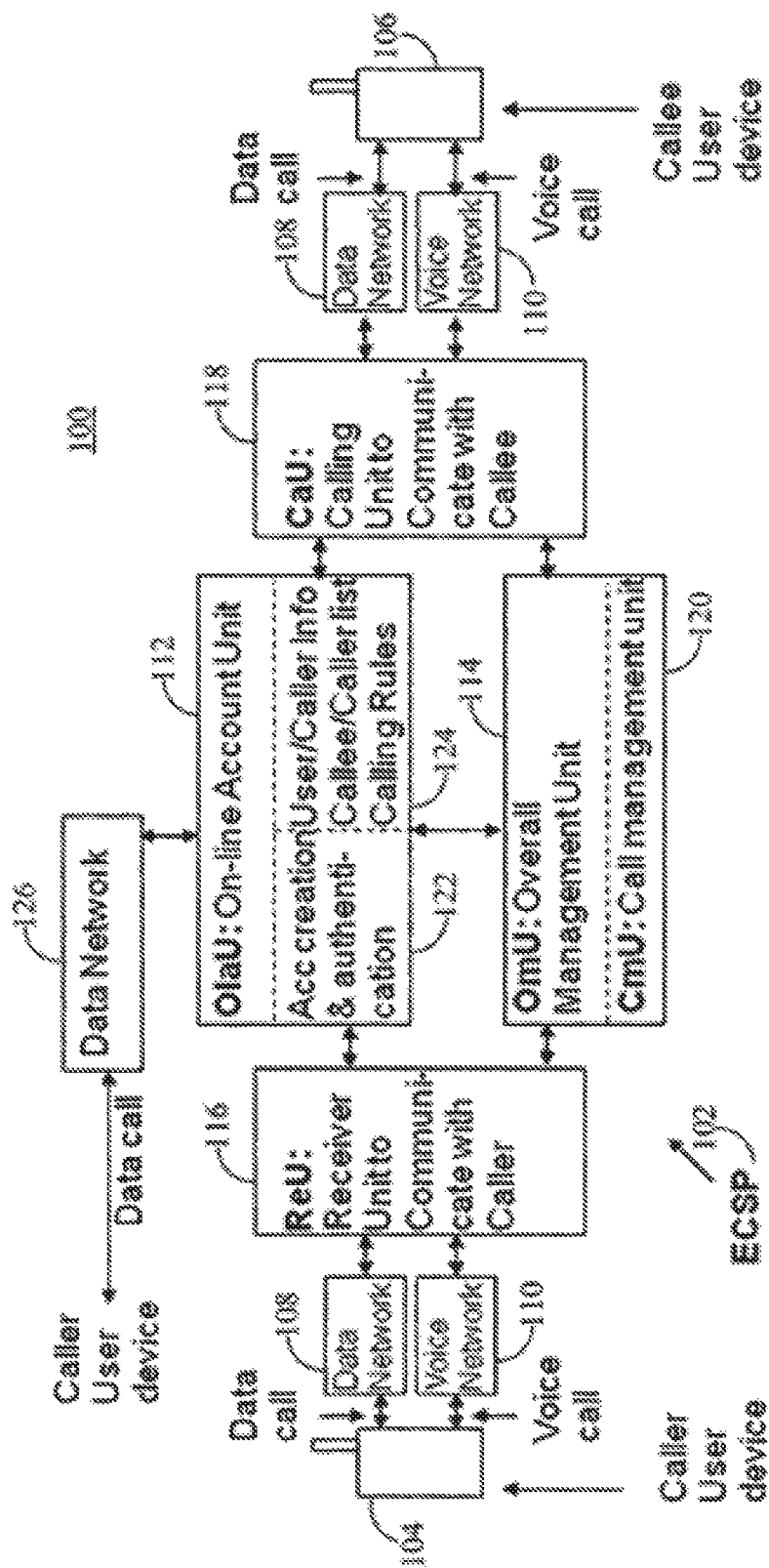
FIG. 1 depicts an ECSP system block diagram with ReU, CaU, OlaU, and OmU as major components, in accordance with a present embodiment.

Skilled artisans will appreciate that elements in the figures are illustrated for simplicity and clarity and have not necessarily been depicted to scale. For example, the dimensions of some of the elements in the block diagrams or flowcharts may be exaggerated in respect to other elements to help to improve understanding of the present embodiments.

DETAILED DESCRIPTION

Abbreviations

3G: 3$^{rd}$ Generation Cellular Communication Systems
4G: 4$^{th}$ Generation Cellular Communication Systems
ACSP: Access/Connectivity Service Provider
App: or "app"; applications running on smart devices
ATA: Analog Telephone Adapter
Caller-ID: String of digits (phone number of caller) displayed at callee's phone
CaU: Calling unit to communicate with callee
CDMA: Code Division Multiple Access
CmU: Call management Unit
DS: Data Server
DSL: Digital Subscriber Line
DTMF: Dual Tone Multi Frequency Signaling
ECSP: Enhanced Communications Service Provider
Hi-Fi: High Fidelity
ID: Identification
IM: Instant Messaging
IP: Internet Protocol
IPv6 Internet Protocol Version 6
ISP: Internet service provider
IVR: Interactive Voice Response
LAN: Local Area Network
LTE: Long Term Evolution
MSN: Microsoft portal
OlaU: On-line account unit
OmU: Overall management Unit
OS: Operating System (for example, Windows, iOS, Linux, Android)
PBX: Private Branch Exchange (includes IP-PBX)
PC: Personal Computer
PIN: Personal Identification Number
PSTN: Public Switched Telephone Network
ReU: Receiver unit to communicate with caller
SIM: Subscriber Identity Module for cellular; Includes USIM.
SLC: Soft Landline Converter
SLD: Soft Landline De-convertor
SLMU: Soft Landline Management Unit
SLP: Soft Landline Phone
SMS: Short Messaging Service
ST: SingTel (an instance of ACSP)
TCP/UDP/RTSP: Transmission Control/User Datagram/Real Time Streaming Protocol
TV: Television
URL: Uniform Resource Locator
USIM: Universal SIM
VoIP: Voice over IP
WAN: Wide Area Network
WCDMA: Wide-band CDMA
WiFi: Another name for WLAN
WLAN: Wireless Local Area Network
WiMAX: Worldwide Interoperability for Microwave Access

Definitions

Electronic Devices: These are devices that can be used for voice calls, data calls or both types of calls. The list non-exhaustively includes landline phones, VoIP phones, mobile phones, smartphones, smart TVs, soft-phones, tablets, laptops, e-book readers, netbooks, WiFi phones, PCs, gaming consoles, watches, and Hi-Fi speakers. It includes phones connected to broadband internet via ATA and electronic devices running "apps" including a VoIP client. A person may have one or more than one such electronic device (or, simply, device) available at any time.

Electronic address: This is an address that can be used to reach the caller and/or callee. Electronic addresses include email addresses (gmail, hotmail, etc), IM addresses (MSN, Yahoo, etc), VoIP addresses (Skype-ID), phone numbers, IPs or equivalent addresses for routing data traffic; on-line accounts or other such information access. A person can have multiple electronic addresses. For instance, a person may have a home phone number for a phone that can be either a VoIP phone-line or a regular PSTN line, an office phone number for a phone that can be either a VoIP phone-line or a regular PSTN line, a mobile phone number, a Skype-ID for a Skype account that can be used to make PC-to-PC or PC-to-phone voice calls.

Mobile phones are now available that can take in two or more SIM cards. Thus a device such as a mobile phone may be reached via any of the associated phone numbers (electronic addresses). Hence a device may have multiple electronic addresses as well as multiple types of electronic addresses with multiple electronic addresses of each type. Many smartphones, tablets and other devices now have cellular and WiFi capabilities for internet access and VoIP calls as well as cellular capability for voice calls.

Electronic addresses also includes phone numbers in the context of a PBX (or, equivalently, an IP-PBX) system. In such cases, a caller in a PBX system may not dial the entire phone number if the callee is also within the PBX system. Also such callers may have to dial a code followed by the phone number of the callee if the callee is external to the PBX system. For instance in some PBX environments, a caller within the PBX system needs to call only the last few digits of a phone number if that callee is also with the PBX system. External calls require a caller to dial an outside access number (e.g., "9") followed by the phone number. Such truncated electronic addresses (e.g., the PBX truncated phone number) or extended electronic addresses (e.g., the external call electronic address) are also included here as embodiments disclosed herein can be integrated into a PBX system to provide the callers and callees in the PBX system benefits of the present embodiments.

The electronic address(es) of a device may also change over time. An electronic address uniquely identifies a person owning that electronic address. In general no two persons have the same electronic address, though in some instances people may elect to share a common electronic address. Also certain types of electronic addresses can be associated with one or more devices. For example, a SIM card in a device provides an electronic address such as a mobile phone number associated with that device. Service providers also have multi-SIM services where more than one user device has the same phone number.

Certain other types of electronic addresses (such as email addresses) are not associated with any device and can be accessed on numerous devices. For example, a person can sign into his Skype account using a computer at work or a tablet at home and then use his Skype-ID for VoIP voice calls using that device. The same goes for on-line accounts and email and IM addresses.

Electronic addresses can also be defined in an environment or they can be universal. For example, a phone number is universal while a Skype-ID is defined only within the Skype environment. Similarly, an email address is a universal electronic address for emails while it is also used as an electronic address for a 'Facebook' account, making it an electronic address also defined within the Facebook environment. Similarly, some servers have fixed public IP addresses while many other devices have IP addresses that are assigned by a service provider and, therefore, defined within the environment of that service provider and may change.

Users and service providers may be required to exchange authentication information such as account name, password, and PIN from time to time or upon occurrence of certain events (such as call initiation or account log-in) before services provided via certain electronic addresses are provided to the authorized/authenticated users. Such an exchange may be automated or require user intervention.

Different electronic addresses can have different communication capabilities associated with them. For example, an electronic address such as a mobile phone number can be used to receive/make voice calls as well as SMS while a landline phone number can only be used for a voice call. An email address is mostly useful for non-realtime communications and not for voice calls.

Communications Provider: Broadly, these can be separated into two categories: (i) access/connectivity providers, and (ii) service providers. For instance, internet service providers (ISP) provide internet access while email service providers (e.g., MSN) provide email services. Another instance can be cellular service provider that provides mobile connectivity (e.g., a mobile operator) while an international phone service provider can be used for providing long distance calling services. Once broadband internet connectivity is provided then Skype can provide VoIP voice calling services to a Skype-ID. Also, a device may have capability to access the same electronic address and services associated with it using more than one communications provider. For instance, it is common to have mobile devices that have cellular as well as WiFi capabilities to access the internet. Hence, one may use the same device to make a voice call using either cellular and/or WiFi internet access and provide the users means to switch the call from one to the other if he so desires. The same applies to data calls.

In many instances, access/connectivity providers may be the same or be in collaboration to provide communication services to the user. Communication providers may also work together to provide a complete service. For example, if a first user has a mobile phone provided by one mobile operator and a second user has a mobile phone provided by another mobile operator, then the two mobile operators must work together in some manner (sometimes through intermediaries) if the first user wanted to use his mobile phone to call the second user's mobile phone.

Voice Call: A voice call provides real time communication between two persons. A voice call can be voice or video depending on network and device capabilities, user preferences and settings. Collectively, such a call is termed as a voice call. Traditionally, landline phones were used for voice calls. Later mobile phones were used for voice calls. Now, there is a diversity of options available to consumers from soft phones, VoIP systems, smartphones, to regular phones connected to broadband internet via ATA. Broadband internet is used in many instances for voice calls. A voice or a voice plus video call is referred to as a voice call in the rest of the disclosure.

Data Call: A data call is used by a device to access information over the internet. Hence, it consists of data communication between a computer server and a device using the internet as the network for communication. Data calls can also be made by visiting a website and interacting with it for data/information communications. A data call may also be made via data communications in one or more data messages with a computer server that may also be associated with a website. Traditionally, internet and associated websites were accessed via a data call using devices such as computers (e.g., PC, laptops, tablets, and e-books), while cellular/mobile or landline phones were used for voice calls. However, with the advent of broadband internet and 3G mobile communications, it is possible to make voice calls over the internet and data calls by accessing the internet using mobile devices. In fact, mobile devices can now be used to make simultaneous or near-simultaneous voice and data calls. Mobile devices now include smartphones and tablets that can run one or more applications (popularly known as "apps") for making voice calls and data calls and a mix of voice and data calls.

DESCRIPTION

The following detailed description is merely exemplary in nature and is not intended to limit the embodiments or the application and uses of the embodiments. Furthermore, there is no intention to be bound by any theory presented in the preceding background of the embodiments or the following detailed description. It is the intent of the present embodiments to present methods and systems for user-controlled call management. The present embodiments relate to systems and methods for a user to initiate, set-up and make simultaneous or near-simultaneous multiple calls (that can be data calls and voice/video calls or a mix of the two) in a "simple manner". This "simple manner" includes one or more of making a regular phone voice call, making a VoIP voice call, clicking a link displayed at a website, using on-line accounts, using data channels, making data calls to set up and manage voice calls, using an "app" on a device such as smartphone and/or other internet enabled devices, and other equivalent methods. Accessing (sending and/or receiving) information using the internet is termed a data call while communication between two or more persons is called a voice call. The present embodiments further relate to systems and methods to facilitate the caller during the entire call from initiation and call set-up to call in progress and to call completion. For instance, the caller is able to initiate the call in a way that he may use one of many of his devices/electronic addresses for the call, simultaneously reaching out to the callee on more than one device/electronic address, and enable himself (and the callee) to change-over the call from one device/electronic address to another during the call. Data calls are used to facilitate the voice calls as well as data calls. For instance, a data call can be used by the caller and/or the callee to change his device or mode of voice call (e.g., from a voice call on a landline to a voice call on a mobile or to a VoIP voice call) for an ongoing voice call. Similarly, a data call can be shifted from one device to another by the user for an ongoing data call.

In one embodiment, a system for call facilitation includes one or more interfaces to call handling networks, a storage means and a processing means. The one or more interfaces enable receiving information from or transmitting information to the call handling networks by voice, data, email or internet protocol. The storage means stores caller and/or callee associated information including one or more of identification information, calling rules, authentication information, and electronic addresses. The processing means is coupled to the one or more interfaces and the storage means for initiating and controlling calls by voice, data, email or internet protocol to one or more of the call handling networks between a caller and a callee utilizing the associated information corresponding to the caller and callee.

The processing means may include means for associating one or more calling rules for setting-up a call between a caller and a callee with one or more electronic addresses of the caller and/or the callee, where the calling rules and the electronic addresses include one or more of the calling rules and one or more of the electronic addresses, respectively, of the associated information for the caller and/or the callee stored in the storage means. The processing means may also include means for selecting one or more of the associated calling rules to be used for connecting the caller to the callee.

The calling rules may include the caller calling more than one of the one or more electronic addresses of the callee simultaneously and/or the caller calling a selected one of the one or more electronic addresses of the callee. The calling rules may also include making a call from a selected one of the one or more electronic addresses of the caller.

One of the electronic addresses of the callee may be associated with a callee's electronic device such that calling the selected one of the electronic addresses of the callee connects the caller to the associated electronic device. Similarly, one of the electronic addresses of the caller may be associated with a caller's electronic device such that making a call from the selected one of the one or more electronic addresses of the caller connects the callee to the associated electronic device.

The system may also include one or more codecs coupleable between the one or more interfaces and the processing means, the processing means selecting one of the codecs for initiating and or controlling a call in response to at least some of the associated information for each caller and/or callee accessing or accessed by the call. The codecs may include either or both of audio codecs and video codecs and the associated information for selecting one of the codecs may include preferences and/or system settings for the caller and/or the callee.

The processing means may further initiate the call as a video call, a voice call or a video and voice call in response to the associated information for the caller and/or the callee. Additionally, the processing means may generate one or more URL links for call initiation and/or call control, the URL links including time related information indicating a start time and an end time between which the at least one of the one or more URL links is accessible. The time related information may be selectable by the caller, the callee, a third party and/or the processing means.

In accordance with other embodiments, a method for facilitation of a call between a caller and a callee is provided. The method includes setting-up and/or controlling the call in response to information in one or more URL links accessed by the caller and/or the callee via their electronic addresses and/or on-line accounts. The step of setting-up the call in response to the one or more URL links may include the step of setting up a video call, a voice call and/or a video and voice call in response to the information in the one or more URL links accessed by the caller and/or the callee. The information in one URL link accessed by the caller and/or the callee may include time related information indicating a start time and an end time between which the URL link is accessible, the time related information being selectable by the caller, the callee, a third party and/or a system accessed by the caller and/or the callee for setting-up and/or controlling the call.

The step of setting-up the call in response to the one or more URL links may include generating the one or more URL links for the callee to access, each URL link associated with one or more call control instructions, sending an electronic message to an electronic address of the callee, the electronic message comprising the one or more URL links, and executing the one or more associated call control instructions to set-up the call in dependence on the URL link that is accessed by the callee. The call control instructions may include one or more of answering the call, rejecting the call, rejecting the call with a message back to the caller, or forwarding the call to another electronic address. The method may further include the step of establishing a VoIP call with the callee in dependence on the callee accessing the URL link associated with answering the call.

The step of setting-up the call in response to the one or more URL links may include obtaining an electronic address of the caller, generating one of the one or more URL link as a URL link for the caller to access, receiving information in response to the caller accessing the URL link, extracting caller information and callee information from the received information, and connecting the caller and the callee based on the extracted caller information and the extracted callee information. The method may also include obtaining one or more calling rules and connecting the caller and the callee based on the extracted caller information, the extracted callee information and the one or more calling rules. And the method may also include establishing a VoIP call with the caller.

The step of setting-up the call in response to the one or more URL links may include the callee receiving a first URL link of the one or more URL links for contacting a server for call setup, the caller contacting the server for call setup, the server setting up a first call with an email address of the caller, the server setting up a second call with an email address of the callee in response to the callee accessing the first URL link, and the server merging the first call to the caller's email address and the second call to the callee's email address for call setup of a voice or multimedia call between the caller and the callee. The server setting up the first call with the caller may include the server generating a second URL link of the one or more URL links in response to the caller contacting the server for call setup and the server setting up the first call with the caller's email address in response to the caller accessing the second URL link. The caller may contact the server for call setup by voice, by data, by email or by accessing a third URL link of the one or more URL links. The callee may receive the first URL link from the server in response to the callee setting up one or more calling rules with the server.

Any of the embodiments may further include authenticating the caller and/or the callee. In addition the step of setting-up the call in response to the URL links may include the step of setting-up a conference call between multiple attendees, the step of setting-up the conference call including obtaining attendee information of at least one of the multiple attendees; generating, based on the attendee information, the one or more URL links for at least one of the multiple attendees to access, each URL link associated with one or more call control instructions; sending an electronic message to the electronic address of at least one of the multiple attendees, the electronic message comprising the one or more URL links; extracting attendee information in response to a URL link of the one or more URL links accessed by at least one of the attendees; and executing the one or more associated call control instructions to set-up the conference call in dependence on the URL link that is accessed by at least one of the multiple attendees. The attendee information may include an electronic address of the attendee and setting up the conference call may further include authenticating at least one of the multiple attendees. The call control instructions may include one or more of joining the conference call, rejecting the conference call, and rejecting the conference call with a message. Setting up the conference call may further include the step of establishing a VoIP call with the attendee in dependence on the attendee accessing the URL link associated with joining the conference call and the URL link may include a conference call identifier.

The step of controlling the call in response to the URL links may include the steps of controlling an ongoing call of creating a URL link of the one or more URL links embedded with an identifier associated with the call and one or more instructions for call control of the ongoing call and upon accessing the URL link, executing the one or more instructions for call control. The ongoing call may be a voice or data call. The method may further include the step of creating the identifier associated with the ongoing call and the one or more instructions for call control may include one or more call parameters. The one or more call parameters may also include one or more electronic addresses of the caller and/or callee such that upon accessing the URL link the ongoing call is replaced with a new call at a selected electronic address of the caller and/or callee. Further, the one or more call parameters may include a network and the ongoing call may be connected over a first network such that upon accessing the URL link the ongoing call is connected over a second network different from the first network. In addition, one of the electronic addresses may be associated with an electronic device such that upon accessing the URL link the ongoing call is replaced with a new call at a selected electronic address associated with the electronic device.

The step of controlling the call in response to the one or more URL links may additionally include the steps of controlling an ongoing call of providing a mechanism to execute one or more instructions for call control and configuring the mechanism to execute the one or more instructions for call control upon activation of the mechanism, wherein the mechanism includes making a voice call. The step of controlling the call in response to the one or more URL links may also include the steps of controlling an ongoing call of providing a mechanism to execute one or more instructions for call control and configuring the mechanism to execute the one or more instructions for call control upon activation of the mechanism, the mechanism including accessing the Internet, using an application running on an electronic device, or making a data call.

Embodiments may further include a method of allowing one or more electronic devices to participate in a phone call over a land-line phone line by emulating one or more land-line phone lines using the Internet. The step of emulating the land-line phone lines may include configuring the one or more electronic devices to determine if the land-line phone line is in use, configuring the one or more electronic devices to simultaneously ring when an incoming phone call is received over the land-line phone line, configuring the one or more electronic devices to receive the incoming phone call at any of the one or more electronic devices, configuring the one or more electronic devices to join an ongoing phone call over the land-line phone line, and configuring the one or more electronic devices to make an outgoing call at any of the one or more electronic devices.

Embodiments further seek to allow:
1. A caller is able to call a callee at his multiple electronic addresses simultaneously.
2. A caller is able to use a device and/or electronic address of his choice for the call.
3. A caller and/or a callee are able to change one or more of his device/electronic address/connectivity as per his choice even during the voice and/or data call.
4. A landline phone line can be converted to a soft landline that is identical to a landline phone line.

Corresponding to each embodiment above, a system can be built to provide corresponding communication services to callers and callees.

In the following description, there is no distinction between a user using web-based on-line systems and data calls to such systems for an enhanced calling (voice and data) experience or equivalent systems consisting of an "app". Such "apps" could be running on a user device such as a tablet or a smartphone that the user interacts with and that makes one or more data calls to on-line systems for enhanced calling. It will be clear to those skilled in the art that an "app" based system using data calls for access and on-line information system access via websites and/or data calls are equivalent in terms of functionalities and once such functionalities are understood for on-line system, an "app" for a smart device (e.g., phone or tablet) can be built and vice versa.

Method and System for Setting-Up a Call Between a Caller and a Callee

According to an embodiment of the embodiments, there is provided a system and a method for voice and data calls such that a caller is able to call a callee at his multiple electronic addresses simultaneously.

According to another embodiment of the embodiments, there is provided a system and a method for voice and data calls such a caller is able to use a device and/or electronic address of his choice for the call.

Here, a "device" is defined in the broadest sense possible. One type of device provides connectivity to the internet. Such a device can be a PC, laptop, netbook, mobile phone, soft phone, e-book reader, TV, watch, smartphone, IP phone, gaming device, set-top box, iPAD, tablet PC and other such equivalent devices as any of these can be used to access the web for accessing websites as well as making calls using VoIP and other technologies. Typically, a computer uses LAN, routers, WLAN, DSL, fiber-optic cables, regular cables, 3G, LTE, WiMAX, or 3G+ for data communication required to access the internet. A terminal or computer typically accesses the web and its contents, services and applications via an Internet browser.

Another type of "device" can be a land line (or fixed line) phone, a cellular/mobile phone, a smartphone, a tablet phone, an IP phone, or a WiFi phone. It is a device that can be used for making/receiving a voice call via an electronic address consisting primarily of numeric strings or a phone number. Most mobile phones now are equipped with capability for voice calling as well as broadband connectivity (e.g., 3G, LTE, or 4G) for internet browsing. Since computing and communications devices, terminals, and appliances are convergent, they are used interchangeably without any loss of clarity, generality, or limitations to the embodiments described herein.

Referring to FIG. 1, a system diagram 100 depicts a system 102 called enhanced calling service provider (ECSP). The system 102 interfaces with callers and callees 104, 106 via data and voice call networks 108, 110. The system 102 also maintains on-line accounts in an on-line account unit 112. The on-line accounts for the users may be used to specify user preferences and personalize system settings for each user. The ECSP can be located in one of the following manners:

1. Independently located and in communication with the callers and/or callees via data (internet) and voice (PSTN, cellular, VoIP) networks.
2. Part of caller's access/connectivity provider's infrastructure
3. Part of callee's access/connectivity provider's infrastructure
4. Part of both caller and callee access/connectivity providers' infrastructures
5. Part of both caller and callee access/connectivity provider infrastructure where caller and callee have the same access/connectivity provider.
6. Part of PBX of an organization.
7. Part of VoIP provider infrastructure such as Vonage and Skype.
8. Part of LAN infrastructure including LAN access points.
9. Part of ISP infrastructure
10. Part of mobile operator infrastructure
11. Part of websites infrastructures including data/content servers
12. Part of PSTN providers Enhanced Calling Service Provider (ECSP):

In embodiments of the embodiments, the enhanced calling services are provided by the enhanced calling service provider (ECSP) via the system 102 that can communicate with its users via either a voice call or a data call or both. Such voice and data calls can also be simultaneous. The ECSP comprises the following components:

1. An overall management unit, OmU 114;
2. A receiver unit to communicate with caller, ReU 116;
3. A calling unit to communicate with callee, CaU 118; and
4. The on-line account unit, OlaU 112.

These units may be co-located closely interconnected and/or interlinked (via high speed internet or dedicated links or LAN for instance) and may appear as one unit to the users. Multiple copies of each of these units may exist interconnected and dispersed in a geographical manner to facilitate users situated in diverse location. They may also be components of the same system communicating with each other via dedicated communications methods (such as internal bus of a computer) known to those skilled in the art. It is also observed that an access/connectivity provider (such as a mobile operator or ISP) can also be an ECSP if they host an ECSP system, implement ECSP methods and provide the associated services. A brief description of each component of the ECSP follows.

Overall Management Unit (OmU) 114:

This is the "brain" behind the ECSP 102 as it manages the overall system of communications between (i) the ECSP 102 and the caller 104, and (ii) the ECSP 102 and the callee 106; and internal communications within various units of the ECSP 102. It also provides for the logic and capabilities for information processing required for the ECSP 102 to operate. The OmU 114 includes a call management unit (CmU) 120 for the purposes of data and voice call management tasks. This includes hosting caller information, providing for the caller to manage his information, and managing various calls (voice/data) including their set-up, monitoring, and billing.

Receiver Unit to Communicate with Caller (ReU) 116:

The ReU 116 receives information from the caller 104 as the caller 104 initiates contact with the ECSP 102 to make a voice call to the callee 106. This can be either a voice or a data call from the user U (the caller 104) to the ReU 116. The ReU 116 monitors such calls from caller 104, takes information about the call such as caller-ID (caller electronic address) of the caller device 104 and other information it receives from user U. The ReU 116 then passes it to the overall management unit OmU 114 for user authentication, billing, and further processing.

If required, the receiver unit ReU 116 may also set up calls from the ECSP 102 to the user U's electronic addresses, as per the overall system set-up and user U's preferences and settings. This may include one or more simultaneous and/or serial calls at one or more electronic addresses of the caller 104. Some of these voice calls can either be regular phone calls or VoIP calls from the ReU 116 to the caller electronic address as per the corresponding caller electronic address.

Calling Unit to Communicate with Callee (CaU) 118:

The CaU 118 receives information from the overall management unit OmU 114 as it decides to use the CaU 118 to make a voice call to the callee 106. This may include one or more simultaneous and/or serial calls at one or more electronic addresses of the callee 106. Some of these voice calls can either be regular phone calls or VoIP calls from the CaU 118 to the callee electronic address as per the corresponding callee electronic address. The CaU 118 monitors such calls and passes relevant information to the overall management unit OmU 114 for authentication, billing, and further processing.

Upon instructions from the OmU 114, the receiver unit ReU 116 and the calling unit CaU 118 merge the calls from/to the caller 104 to/from the ReU 116 and the CaU 118 to the callee 106 for voice communication from the caller 104 to the callee 106 to take place as per the overall system set-up and user U's preferences and settings. The caller 104 may also be required to provide additional information (e.g., log-in, password) for setting up VoIP calls from the ReU 116 to the caller electronic address and the CaU 118 to the callee electronic address.

In most cases, when a caller makes a voice call to the ReU 116, the caller-ID information is used to authenticate the caller. In other cases, additional authentication steps such as asking the caller to enter account information/number and a password/PIN via IVR with or without using the caller-ID can be incorporated. For VoIP calls, one or more data calls may be used by the system even before the caller makes the voice call to authenticate the caller.

On-line Account Unit (OlaU) 112:

The OlaU 112 provides for data interaction between the users and the ECSP 102 via on-line accounts and/or an "app" running on user devices. This is done to facilitate communication services (e.g., calling, call switching) and also for authentication or billing. Thus, users are able to create on-line accounts to manage information used for communication services, voice/data calls as well as user account set up, authentication, billing and payments. These and many other functions may also be built in "apps" running on user devices.

User Account Creation via OlaU 122:

A user creates an on-line account with his service provider ECSP's OlaU 112 to facilitate the call services provided by the service provider. Such on-line accounts have a user name, an electronic address (account) associated with the user name, and a password. Say the name of the service provider for enhanced calling services is ECSP. A user U opens an account with user name ImU, account/electronic name/address ABC and password PAS. Only one user can have the electronic address ABC with ECSP. ImU may be shared with other users of ECSP. Password PAS is known only to user U and ECSP and is used to authenticate U to ECSP by the OmU 114 when U accesses ABC via a data call or calls the ReU 116 via a data call.

User Authentication via OlaU 122:

Each user account also has at least one electronic address of the user (caller) that may be used to authenticate the caller when the caller initiates contact with the ReU 116 for making a call to a callee. Typically, such an electronic address is a phone number used for caller authentication via caller-ID when the caller uses a voice call to contact the ReU 116. This is important as the phone number of the caller is automatically provided as caller-ID when the caller makes a voice call using his phone (e.g., mobile, landline). In such a case, caller authentication is relatively simple. When the call from the caller is a data call, then the account electronic address ABC and password PAS is used to authenticate the caller. In many instances of VoIP calls, the caller may be authenticated via exchange of relevant information in earlier data calls.

The user may interact with the ECSP 102 via an on-line web-based access for all interactions and services or have an "app" running on his device providing him with the same functionality. Such an "app" can make one or more data calls to the ECSP to achieve the same purpose as on-line access.

User Account Information with OlaU 124:

The OlaU 112 maintains account records for each of its users. Say a typical user is U and one such user is U1. The user U1 stores the following information with the OlaU 112 for each of his N callees say C1, C2, . . . , CN:

Callee Name (Identifier) C1
   Callee electronic address #1, C11 (phone number, VoIP address)
   Callee electronic address #2, C12 (phone number, VoIP address)
   . . .
   Callee electronic address # A1, C1A1 (phone number, VoIP address)
   Caller Information for Callee C1
   Caller electronic address #1, Ca11 (phone number, VoIP address)
   Caller electronic address #2, Ca12 (phone number, VoIP address)
   . . .
   Caller electronic address # F1, Ca1F1 (phone number, VoIP address)
Callee Name (Identifier) C2
   Callee electronic address #1, C21 (phone numbers, VoIP address)
   Callee electronic address #2, C22 (phone numbers, VoIP address)
   . . .
   Callee electronic address # A2, C2A2 (phone numbers, VoIP address)
   Caller Information for Callee C2
   Caller electronic address #1, Ca21 (phone number, VoIP address)
   Caller electronic address #2, Ca22 (phone number, VoIP address)
   . . .
   Caller electronic address # F2, Ca2F2 (phone number, VoIP address)
Callee Name (Identifier) C3
   Callee electronic address #1, C31 (phone number, VoIP address)
   Callee electronic address #2, C32 (phone number, VoIP address)
   . . .
   Callee electronic address # A3, C3A3 (phone number, VoIP address)
   Caller Information for Callee C3
   Caller electronic address #1, Ca31 (phone number, VoIP address)
   Caller electronic address #2, Ca32 (phone number, VoIP address)
   . . .
   Caller electronic address # F3, Ca3F3 (phone number, VoIP address)
   . . .
Callee Name (Identifier) CN
   Callee electronic address #1, CN1 (phone number, VoIP address)
   Callee electronic address #2, CN2 (phone number, VoIP address)
   . . .
   Callee electronic address # AN, CNAN (phone number, VoIP address)
   Caller Information for Callee CN
   Caller electronic address #1, CaN1 (phone number, VoIP address)
   Caller electronic address #2, CaN2 (phone number, VoIP address)
   . . .
   Caller electronic address # FN, CaNFN (phone number, VoIP address)

Note that the total number of callees for each of the users can be different.

Further, the caller may have a common list of caller electronic addresses for all callees. This is shown below.

Caller Information for All Callees
   Caller electronic address #1, Ca1 (phone number, VoIP address)
   Caller electronic address #2, Ca2 (phone number, VoIP address)
   . . .
   Caller electronic address # F, CaF (phone number, VoIP address)

The ECSP 102 provides such on-line creation and maintenance services to all its users U1, U2, . . . and so on. The above information is arranged in a table form for ease of representation and understanding in the following:

User/Caller U1:
   Electronic Address(es) Registered by U1 with ECSP:
   phone numbers, VoIP account, on-line account. One or more of Ca1, Ca2, . . . ABC etc. One or more of these can be designated by the user to the ECSP 102 for it to use for caller authentication (via caller-ID function, for instance) or account ABC. "EA" denotes electronic address(es) in this disclosure. Table 1 illustrates an exemplary callee/caller information table for user U1 stored in a database 124 of the OlaU 112.

TABLE 1

| Callee Name (Identifier) C1 | Callee EA: C11 C12 . . . C1A1 | Caller EA: Ca11 Ca12 . . . Ca1F1 |
|---|---|---|
| Callee Name (Identifier) C2 | Callee EA: C21 C22 . . . C2A2 | Caller EA: Ca21 Ca22 . . . Ca2F2 |
| . . . | . . . | . . . |
| Callee Name (Identifier) CN | Callee EA: CN1 CN2 . . . CNAN | Caller EA: CaN1 CaN2 . . . CaNFN |

If the caller has a list of caller electronic addresses common for all callees, Table 2 (Callee Information Table for user/caller U1 stored in the database 124) and Table 3 (Caller Information Table for user/caller U1 stored in the database 124) are representations of the callees/caller electronic addresses for the user U1 as obtained.

TABLE 2

| Callee Name (Identifier) C1 | Callee EA: C11 C12 . . . C1A1 |
|---|---|
| Callee Name (Identifier) C2 | Callee EA: C21 C22 . . . C2A2 |
| . . . | . . . |
| Callee Name (Identifier) CN | Callee EA: CN1 CN2 . . . CNAN |

TABLE 3

| Caller EA: Ca1 Ca2 Ca3 . . . CaF |
|---|

Calling Rules:

In accordance with the present embodiment, the enhanced calling server ECSP 102 also allows the user U1 (and in a similar manner all other users) to set the "calling rules" for each of the callees in his user account with OlaU. These rules are stored in the database 124 and inform the ECSP 102 the steps to take when the ReU 116 is contacted by the user U1 to establish a call to a callee say C1 or C2 or C3, . . . in his account with the ECSP 102. These rules can take into consideration broad parameters such as time/day/month information, and other items. There may also be some default rules to be used as per system settings. Calling rules may be based on call-back or call completion as dialed.

Calling Rules for Calling the Callee:

These are the calling rules that govern the behavior of Calling Unit to Communicate with Callee, the CaU 118. For instance, such calling rules can be:

U1 calling rule for callee C1:

If it is past 5 pm, call in order of C11, C12, C13 till callee C1 answers

If it is pre 5 pm, call C11 & C1A simultaneously and if no answer call C13.

Calling rules also specify how the system should handle a call when there are 'busy' signals or 'no answer' or when a callee electronic address is not listed by the user/caller with the ECSP 102. Whenever the callee answers a call, all other calls and execution of the calling rule is terminated. It will be clear to those skilled in the art that more complex rules can be built and integrated into the ECSP 102 in accordance with the present embodiment. These rules are dynamic in the sense that users can log into their on-line accounts with the ECSP 102 (via, for example, a data network 126) and change/update/modify this information any time they wish. This may also be done via an "app" running on user devices.

Calling Rules for Calling Caller:

These are the calling rules that govern the behavior of Receiver Unit to Communicate with Caller, the ReU 116. For instance, a simple rule can be:

If the ReU 116 is contacted via a voice call by a caller using a mobile phone with phone number (electronic address) Ca, then connect this voice call to the voice call from the Calling Unit to Communicate with Callee, the CaU 118, to the callee electronic address for a voice call from the caller to callee.

Other calling rules can be:

U1 calling rule for caller for a callee C1:

If it is past 5 pm, call in order of Ca11, Ca12 till caller answers

If it is pre 5 pm, call Ca11 & Ca1F1 simultaneously & if no answer call Ca13.

Similar calling rules will be apparent to those skilled in the art when the caller has listed a common set of electronic addresses for all callees. Calling rules also specify how the system should handle calls when there are 'busy' signals or 'no answer'. Whenever the caller answers a call, all other calls and execution of calling rules is terminated. It will be clear to those skilled in the art that more complex rules can be built and integrated into the ECSP 102 in accordance with the present embodiment. Both call-thru and call-back rules can be implemented for the caller. These rules are dynamic in the sense that users can log into their on-line accounts with the ECSP 102 and change/update/modify this information any time they wish.

For the VoIP calls between the caller and the Receiver Unit to Communicate with Caller, the ReU 116 and/or VoIP calls between the callee and the Calling Unit to Communicate with Callee, the CaU 118, the user U1 may also be required to provide relevant account information for the VoIP calls to be set up by the ReU 116 and/or the CaU 118.

In accordance with the present embodiment, the callee may also register his own calling rules when a caller calls him. In such cases, the ECSP 102 takes the two sets of calling rules (one specified by the caller for the callee, and one specified by the callee for the callee) and combine them to create super calling rules for the callee.

In addition, calling rules may also include the caller-ID to be displayed at the caller and callee devices for a voice call when the ReU 116 calls the caller and the CaU 118 calls the callee. Such information may be specified as per caller settings and preferences.

It is also possible to have an "app" running on user (caller/callee) devices for interactions between the user and the ECSP 102 and managing various aspects of the ECSP 102 (account set-up, authentication, account access, account information management including caller/callee electronic addresses and calling rules). The ECSP 102 may also have a set of "default" calling rules. Also, the "app" may provide for the caller- to specify the caller/callee electronic addresses and calling rules for a call at the time of call initiation by the user.

Call Set-Up Procedure for a Voice Call Between Caller and Callee Using ECSP

Figure 2:
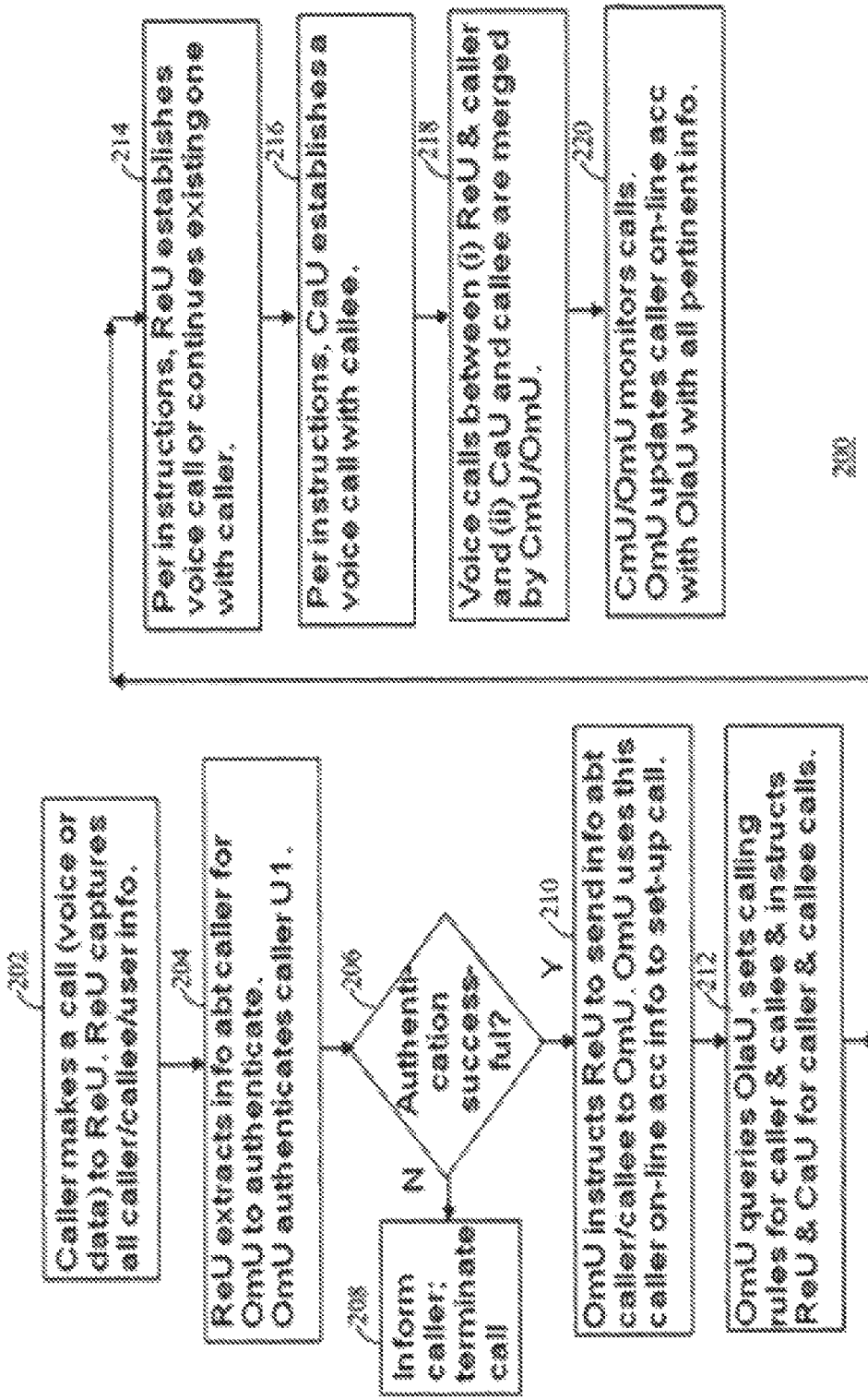
FIG. 2 depicts a flowchart for a call set-up procedure in accordance with the present embodiment.

Referring to FIG. 2, a flowchart 200 depicts a method for call set-up. It is a general flowchart that includes the caller making a data or a voice call to the ECSP 102 for call set-up. A data call consists of one or more data messages.

The steps of a caller using the ECSP 102 to make a voice call to a callee are as follows:

1. At step 202, the caller/user makes a call (voice or data) to the ReU 116. The ReU 116 captures all the user information provided in such a call including caller-ID.
2. At step 204, the ReU 116 extracts pertinent information about the user from the captured information for the OmU 114 to perform authentication. At step 206, the overall management unit OmU 114 authenticates the user/caller U1 based on information from the ReU 116 and the authentication information stored in the OlaU 122. At step 208, the ECSP 102 terminates the process if OmU 114 is unable to authenticate the caller/user.
3. If authenticated at step 206, processing proceeds to step 210 where the OmU 114 further instructs the ReU 116 to collect (the user may be prompted if required) and send further information about the user including user information captured by the ReU 116 and pass it to the OmU 114. The OmU 114 processes this information along with information in the caller/user on-line account with the OlaU 112 for the OmU 114 to do call set-up.

This includes
(i) caller/user electronic address(es), and
(ii) callee electronic address(es)
to be used by the ECSP 102 to set up the call.
4. Based on the callee and caller electronic addresses, at step 212 the OmU 114 queries the OlaU 112 and establishes
   (i) calling rules for the caller to be used and instructs the ReU 116 to act accordingly to establish and/or continue the existing voice call (if applicable) with the caller; and
   (ii) calling rules for callee to be used and instructs the CaU 118 to act accordingly to establish a voice call with callee.
5. At step 214, the ReU 116 establishes and/or continues the existing voice call (if applicable) with the caller as per instructions from the OmU 114.
6. At step 216, the CaU establishes a voice call with the callee as per instructions from the OmU 114.
7. At step 218, the voice call between the ReU 116 and the caller and the CaU 118 and the callee are merged by CmU/OmU 120, 114 to create a voice call between the caller and the callee.
8. At step 220, the CmU/OmU 120, 114 monitors the calls for billing and other such purposes. The OmU 114 may also update the caller/user on-line account with the OlaU 112 with call records and other pertinent information about the call.

Once a caller makes a voice call to the ECSP 102, the ECSP 102 may use call-back or continue this voice call as per user preferences, settings, and calling rules. The tasks at steps 214 and 216 can be reversed in order or done simultaneously. Also one task may only be done if the other is completed. Also, the ECSP 102 may determine the appropriate caller-IDs to provide for the voice calls that it establishes as per system and user settings and preferences. Also the ReU 116 and the CaU 118 may set up the calls as per cost considerations to minimize the overall cost of communications.

In general, the ECSP 102 requires caller authentication, two sets of electronic addresses and two sets of calling rules to establish the voice call between a caller and a callee. The two sets of electronic addresses are
   electronic addresses of the caller; and
   electronic addresses of the callee.
The caller also needs to be identified and authenticated for the service. Further, calling rules for the call set-up between
   the CaU 118 and the callee, and
   the ReU 116 and the caller
are needed. The details of each of the steps described above for two cases:
   Caller/user makes a data call to the ReU 116, and
   Caller/user makes a voice call to the ReU 116
are described below.

Case 1. Caller/User Makes a Data Call to ReU of ECSP

Figure 3:
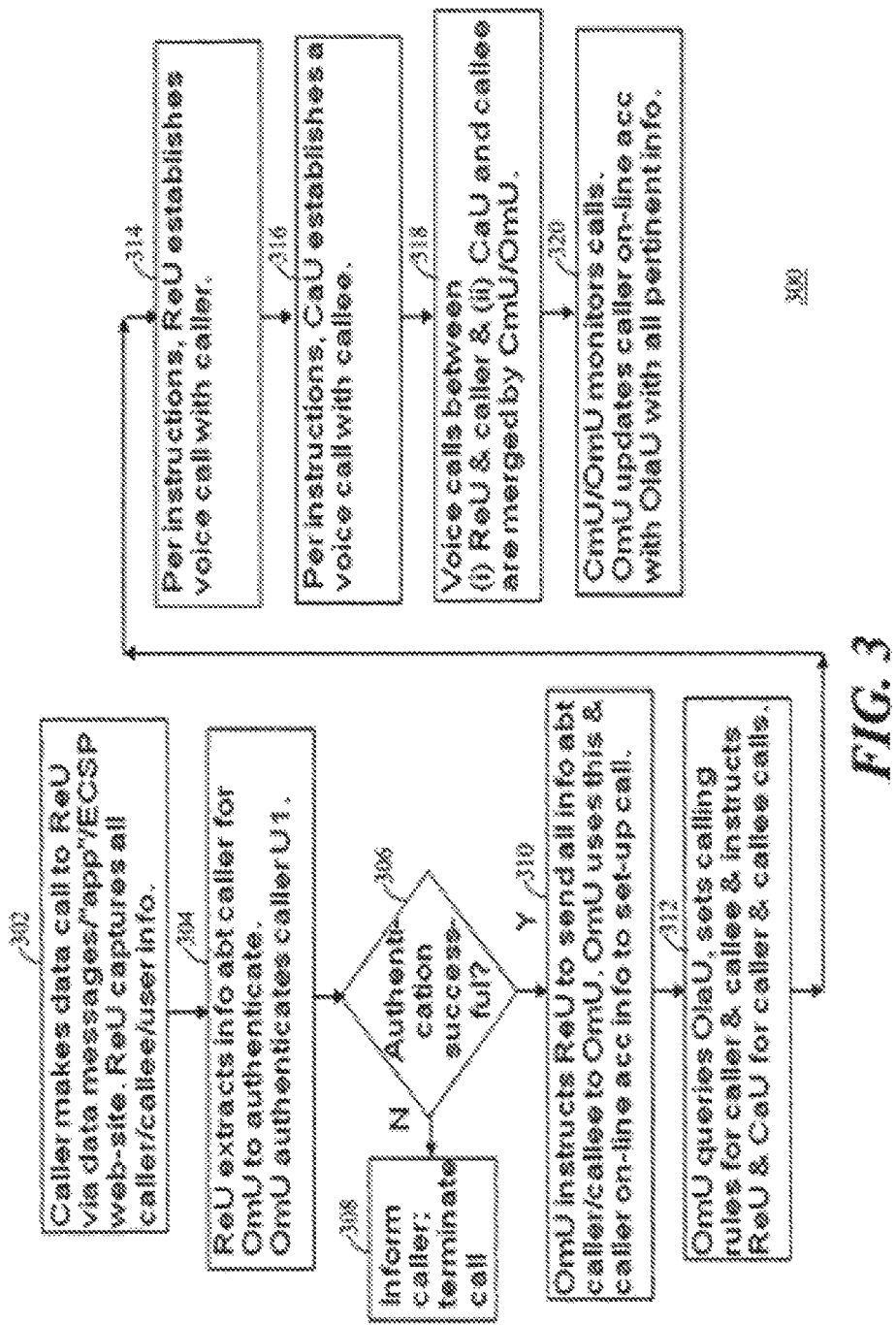
FIG. 3 depicts a flowchart of a first case operation in accordance with the present embodiment when a caller contacts the ECSP via a data call.

FIG. 3 depicts a flowchart 300 depicting the process when the caller contacts the ECSP 102 via a data call for call set-up.

Step 302. The caller/user makes a data call to the ReU 116 of the ECSP 102. The ReU 116 captures all the user information provided in such a data call. A caller can make a data call to the ECSP 102 by (i) signing into online account with the ECSP 102 on the ECSP's website, or (ii) clicking a link that performs the equivalent task, or (iii) sending one or more data messages to the ECSP 102 containing the online account information (account name, password), and callee identification information. This data call can also be made via an "app" running on a caller device. The data call can also be encrypted for further protection. The ReU 116 extracts an account name and a password provided by the user/caller and all other information such as an IP address of the caller/user device and the callee electronic identifiers and/or electronic addresses in the data call, if any. Certain callee electronic address(es) may be designated for callee identification (callee must be identified uniquely) purposes for the caller/user of the ECSP 102. This is to avoid confusion as it is possible that a caller/user uses a certain callee electronic address for more than one callee in its callee/caller information table. Such an address alone cannot be used to identify a callee uniquely.

Step 304.

The ReU 116 extracts pertinent information about user from the captured information for the OmU 114 to perform authentication. The overall management unit OmU 114 authenticates user/caller U1 based on information from the ReU 116 at step 306. For step 304, the ReU 116 extracts the account name and password supplied by the caller in step 302 and sends it to the OmU 114. Based on this information, the caller/user is authenticated by the OmU 114 for its services (step 306). The ECSP 102 terminates the process at step 308 if the OmU 114 is unable to authenticate the caller/user at step 306.

Step 310.

If authenticated, then the OmU 114 further instructs the ReU 116 to collect (user may be prompted if required) and send further information as provided by the user for the OmU 114 to process for call set-up and passes it to the OmU 114. If the user is making the data call via accessing ECSP's website, the user (once authenticated) is now presented a menu by the ReU 116 for him to select from the phone-book (callee/caller information table for the caller/user organized as a phone-book) a callee by selecting his identifier or electronic address that identifies the callee uniquely. This can also be done manually by entering such information. Similar information can also be provided to the ECSP 102 by an "app" running on the caller/user device via one or more data messages sent by the caller/user now or earlier in step 302. Now with the caller and callee identified uniquely, the OmU 114 determines the callee electronic addresses and caller electronic addresses for the call using either
   Callee/caller information table, or
   Callee information table and caller information table.
Further, one or more electronic addresses provided in the data call for either caller or callee or both are also included. It is also possible that the callee and/or caller electronic addresses and/or calling rules are exclusively provided in the data call by the caller.

Step 312.

Based on the callee and caller electronic addresses and content of data call, the OmU 114 establishes
   (i) calling rules for caller to be used and instructs the ReU 116 to act accordingly to establish a voice call with caller; and
   (ii) calling rules for callee to be used and instructs the CaU 118 to act accordingly to establish a voice call with callee.

Step 314.

The ReU 116 establishes a voice call with caller as per instructions from the OmU 114.

Step 316.

The CaU 118 establishes a voice call with callee as per instructions from the OmU 114.

Step 318.

The voice call between the ReU 116 and the caller and the CaU 118 and callee are merged by the OmU 114 to create a voice call between caller and callee.

Step 320.

The OmU 114 monitors the calls for billing and other such purposes the OmU 114 may also update the caller/user on-line account with the OlaU 112 with call records and other pertinent information about the call.

Case 2. Caller/User Makes a Voice Call to ReU of ECSP

Figure 4:
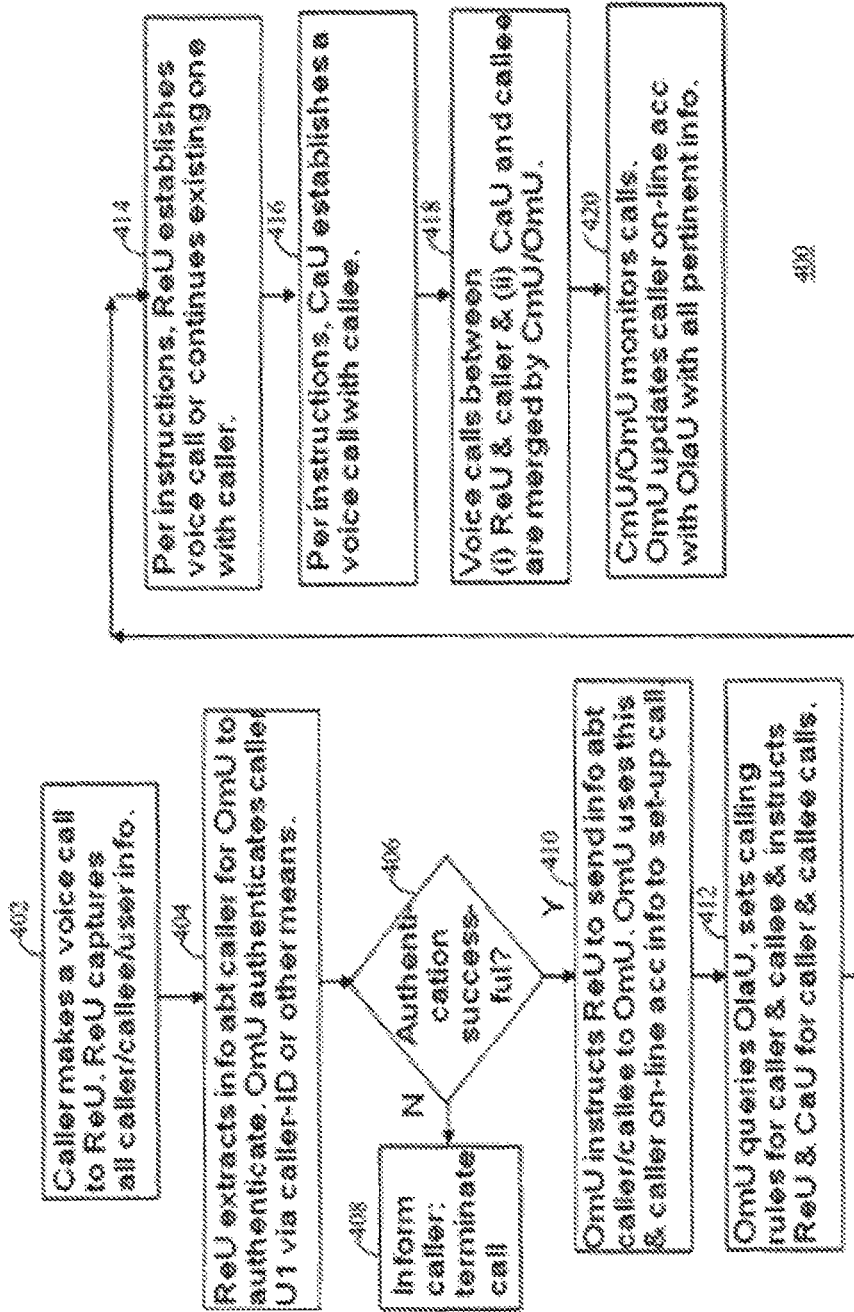
FIG. 4 depicts a flowchart of a second case operation in accordance with the present embodiment when the caller contacts the ECSP via a voice call.

Referring next to FIG. 4, a flowchart 400 depicts processing in accordance with case 2 when the caller contacts the ECSP 102 via voice call for a call set-up.

Step 402.

The caller/user makes a voice call to the ReU 116 of the ECSP 102. The ReU 116 captures all the user information provided in such a voice call including caller-ID/VoIP account information of the caller/user. In case of VoIP voice calls, the caller/user may already be authenticated by the ECSP 102 via earlier one or more data calls. For phone calls from the caller/user, the caller-ID is to be used for caller authentication. A caller can make a voice call to the ECSP 102 by (i) a regular phone call by dialing a phone number (consisting of an access code (if required) common to many callers/users) followed by one of callee phone a regular phone call by dialing a phone number (consisting of an access code (if required) common to many callers/users) followed by one of callee phone numbers (that identifies a callee uniquely) or by dialing a the ReU 116 phone number used by callers for call set up and entering one of callee phone numbers (that identifies callee uniquely); or (ii) a VoIP (such as Skype) call by selecting a unique callee VoIP electronic address and selecting the call button.

Step 404.

The ReU 116 extracts pertinent information about user from the captured information for the OmU 114 to perform authentication. Overall management unit the OmU 114 authenticates user/caller U1 based on information from ReU. For step 404, the ReU 116 extracts the caller-ID information of the caller for a regular phone call or his VoIP account information (such as Skype-ID) for caller authentication and sends it to the OmU 114 of the ECSP 102. Based on this information, at step 406 the caller/user is authenticated by the OmU 114 for its services. The ECSP 102 terminates the process at step 408 if the OmU 114 is unable to authenticate the caller/user. Similarly, it uses information such as number called by the caller to reach the ReU 116 or otherwise provided by the caller for a regular phone call or the VoIP address of the callee for callee identification.

Step 410.

If authenticated, then the OmU 114 further instructs the ReU 116 to collect (user may be prompted if required) and send all call information (provided by the caller/user or collected otherwise) for the OmU 114 to process for call set-up and passes it to the OmU 114. The caller is identified uniquely by the caller-ID for a regular phone call and via an account name & password provided in one or more data messages for a VoIP call. The callee is identified uniquely by the electronic address/identifier provided by the caller. This information is extracted by the ReU 116 from the phone number digits dialed by the caller or the VoIP address of the callee selected by caller/user for the VoIP call.

Now with the caller and callee identified uniquely, the OmU 114 determines the callee electronic addresses and caller electronic addresses for the call using either (i) Callee/caller information table, or (ii) Callee information table and caller information table. Further, one or more electronic addresses provided in the voice call for either caller or callee or both are also included. It is also possible that the callee and/or caller electronic addresses and/or calling rules are exclusively provided in the voice call by the caller.

Step 412.

Based on the callee and caller electronic addresses and content of voice call, the OmU 114 establishes (i) calling rules for caller to be used and instructs the ReU 116 to act accordingly to establish calling rules for caller to be used and instructs the ReU 116 to act accordingly to establish and/or continue the existing voice call with caller; and (iii) calling rules for callee to be used and instructs the CaU 118 to act accordingly to establish a voice call with callee.

Step 414.

The ReU 116 establishes and/or continues the existing voice call with caller as per instructions from the OmU 114.

Step 416.

The CaU 118 establishes a voice call with callee as per instructions from the OmU 114.

Step 418.

The voice call between the ReU 116 and the caller and the CaU 118 and callee are merged by the OmU 114 to create a voice call between caller and callee.

Step 420.

The OmU 114 monitors the calls for billing and other such purposes. The OmU 114 may also update the caller/user on-line account with the OlaU 112 with call records and other pertinent information about the call.

Figure 5:
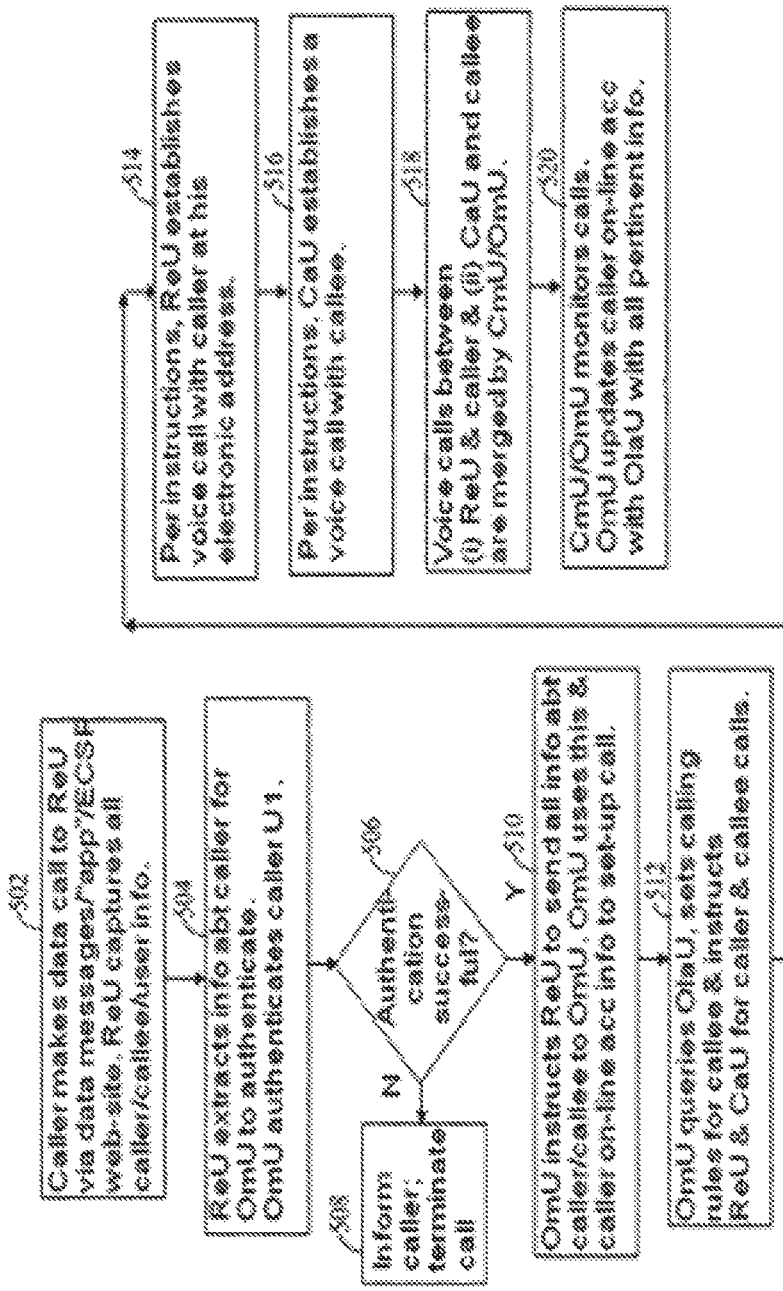
FIG. 5 depicts a flowchart of operation in accordance with the present embodiment when the caller contacts the ECSP via a data call and there is only one caller electronic address.
Figure 6:
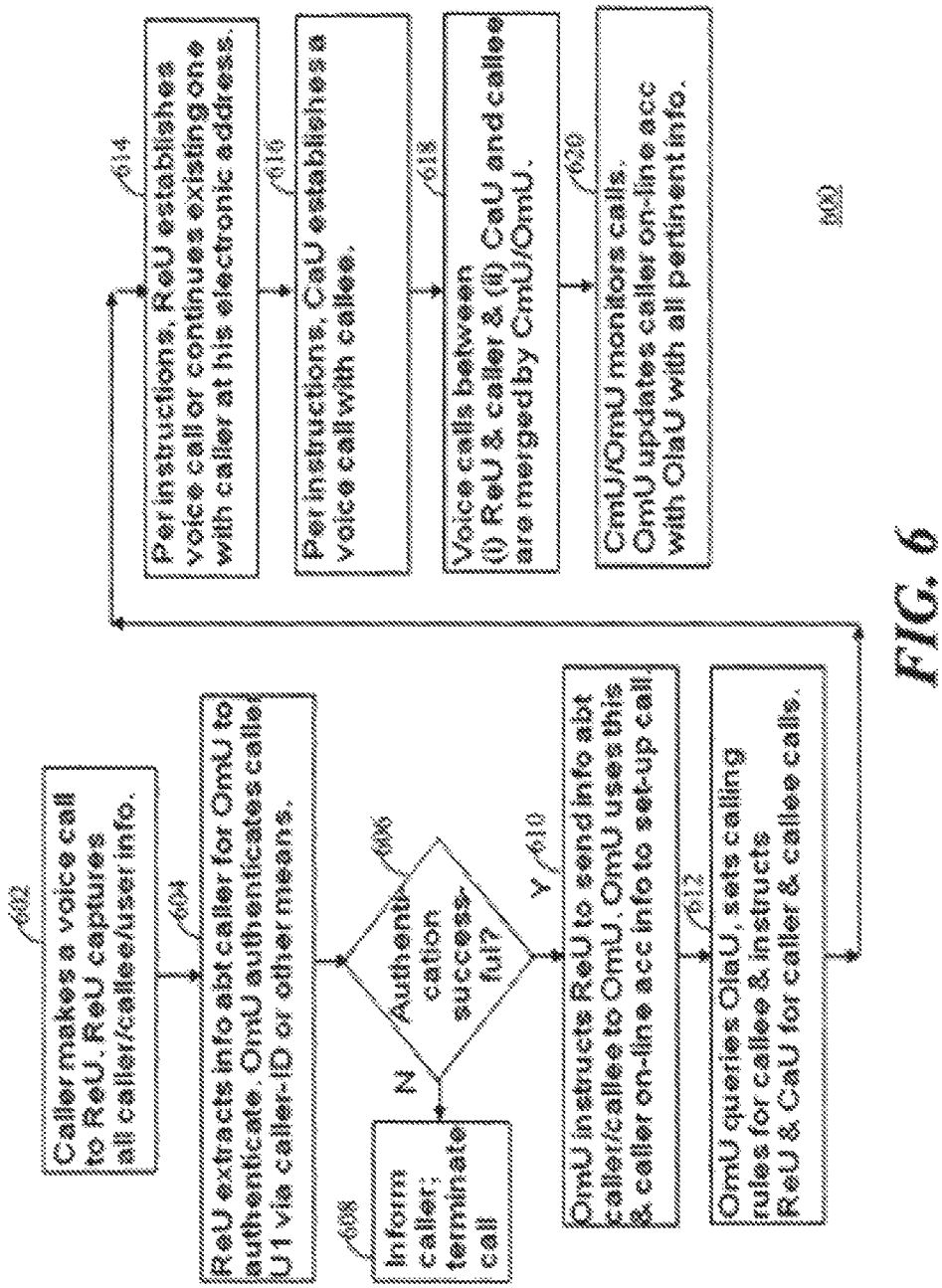
FIG. 6 depicts a flowchart of operation in accordance with the present embodiment when the caller contacts the ECSP via a voice call and there is only one caller electronic address.

Further, it is also possible to describe the corresponding embodiments of a system for a caller to use an electronic address to contact the ReU 116 of the ECSP 102 for initiating the call to two or more electronic addresses of the callee and have the callee answer the call at an electronic address of his choice. In FIG. 5, a flowchart 500 shows the process when the caller contacts the ECSP 102 via a data call and there is only one caller electronic address. This caller address may be provided in the data call or a priori stored in the on-line account of the caller with the ECSP 102 and retrieved from there. Similarly, FIG. 6 shows a flowchart 600 depicting processing when the caller contacts the ECSP 102 via voice call and there is only one caller electronic address.

Figure 7:
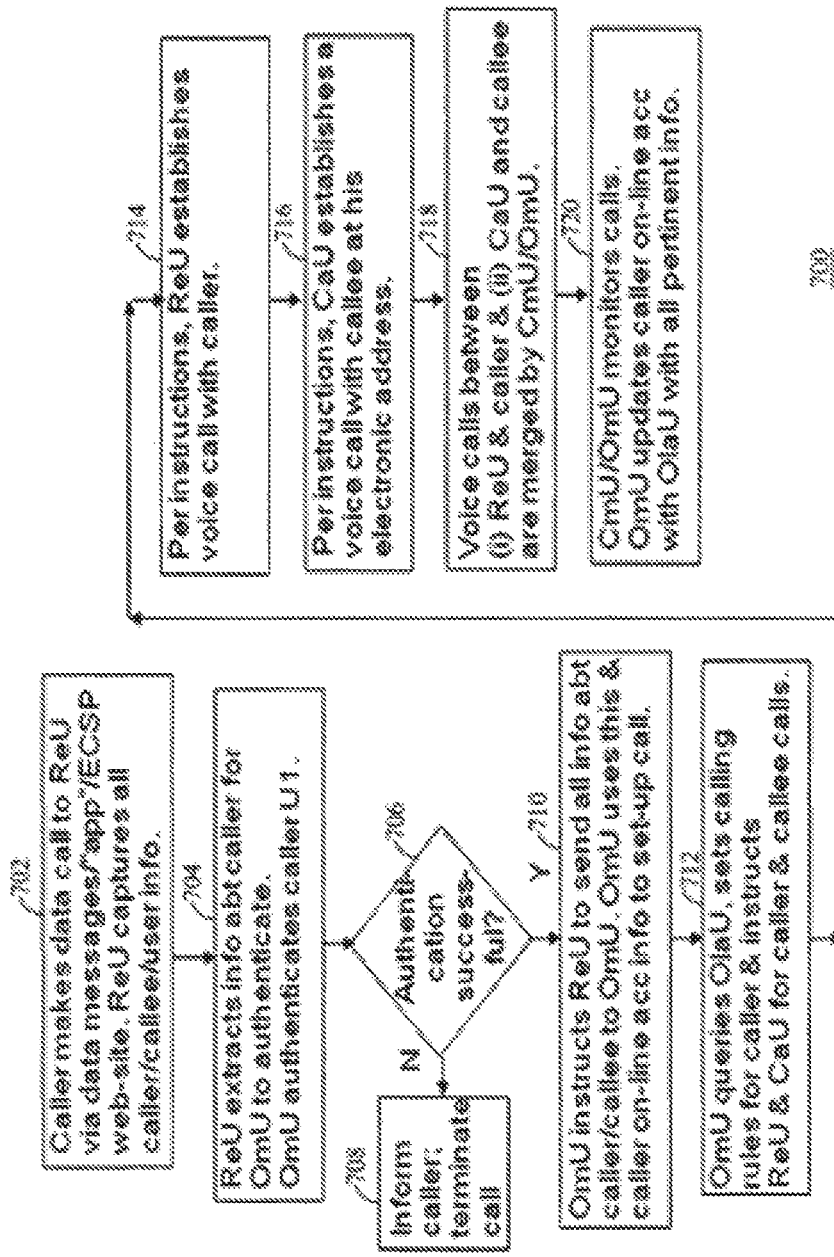
FIG. 7 depicts a flowchart of operation in accordance with the present embodiment when the caller contacts the ECSP via a data call and there is only one callee electronic address.
Figure 8:
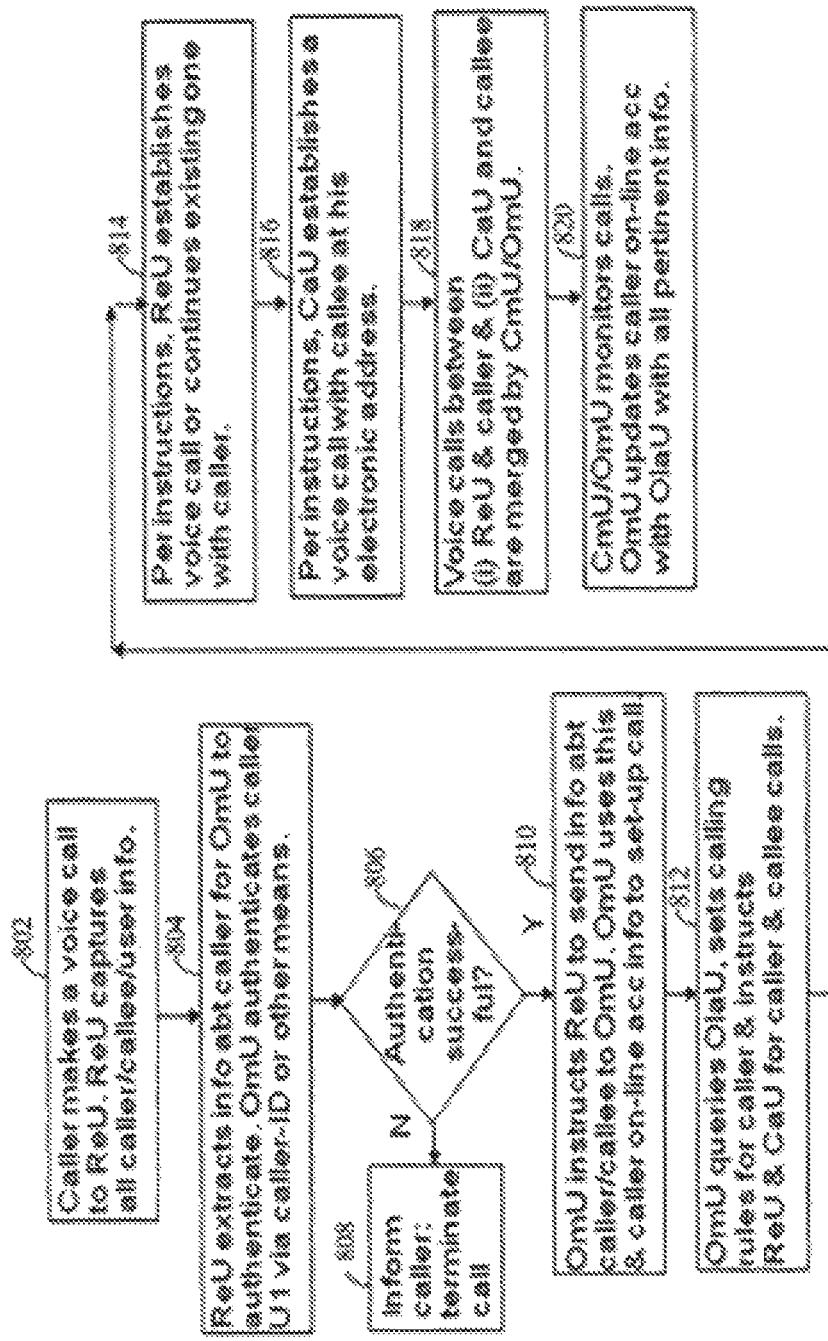
FIG. 8 depicts a flowchart of operation in accordance with the present embodiment when the caller contacts the ECSP via a voice call and there is only one callee electronic address.

It will be apparent to those skilled in the art that it is also possible to describe the corresponding embodiments of a system for a caller to use an electronic address to contact the ReU 116 for initiating the call to a single electronic address of the callee and use one of multiple electronic address and a device of his choice for the call after that. FIG. 7 depicts a flowchart 700 showing call processing when the caller contacts the ECSP 102 via a data call and there is only one callee electronic address. Similarly, FIG. 8 shows a flowchart 800 depicting call processing when the caller contacts the ECSP 102 via voice call and there is only one callee electronic address.

Further, the calls from (i) the ReU 116 to the caller and (ii) the CaU 118 to the callee may be set up in a way that the caller-ID of the incoming calls to the caller and the callee is pre-designated and assigned as per caller preference and settings. Also, the ReU 116 and the CaU 118 may set up the calls as per cost considerations to minimize the overall cost of communications.

Method and System for Controlling an Ongoing Call Between a Caller and a Callee Voice Calls Voice Call Change-Over:

There are two parties for an ongoing voice call, namely the caller and callee. For now, say the call was set up by the ECSP 102 for the caller. As per the embodiments described, the caller may have initially contacted the ReU 116 via a data or a voice call to establish the ongoing voice call. Embodiments where a caller and/or callee may change one or more of (i) device,
(ii) electronic address,
(iii) connectivity (for instance PSTN to cellular; from cellular broadband to WiFi)

during an ongoing voice call will now be described.

Figure 9:
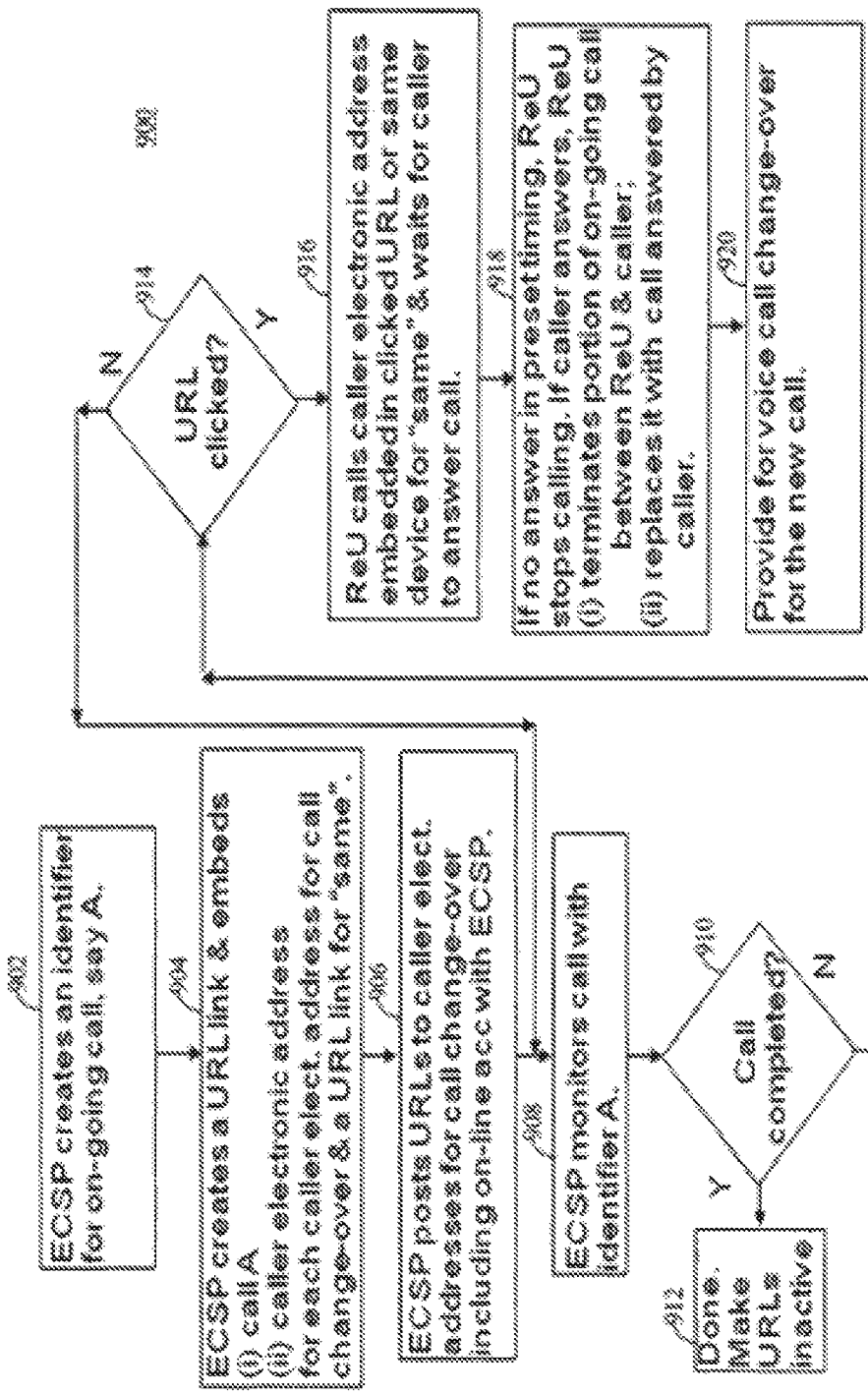
FIG. 9 depicts a flowchart for voice call change-over by the caller in accordance with the present embodiment.

ECSP Initiated Voice Call Change-Over by Caller:

Referring to FIG. 9, a flowchart 900 depicts call change-over by the caller. For an ongoing voice call, the ECSP 102 creates an identifier (or uses an already existing one if any) for the call at step 902, say call identifier A. Call identifier A can be a string of alphanumeric and other characters uniquely identifying a call. It may be the same call identifier for the entire duration of the call or may change or be updated as a call is shifted in accordance with the present embodiments. It may also capture all pertinent information associated with a call such as time duration or addresses of parties or be used to extract such information from a database. Thereafter, at step 904, the ECSP 102 creates a URL link embedded with A and a caller electronic address for call change-over. The caller may have specified one or more of his electronic addresses to the ECSP 102 for the purposes of call change-over. These electronic addresses for call change-over may also be stored in the on-line account of the caller with the OlaU 112 of the ECSP 102. The OlaU 112 also stores electronic addresses of the caller for posting such one or more URLs. This URL is posted by the ECSP 102 at step 906 to the caller electronic addresses stored in on-line accounts of the caller in the OlaU 112 for posting call change-over URLs via "app", data call to the caller, emails, SMS, IM, Facebook page, caller's on-line account with the OlaU 112, the ECSP 102 and other websites. If the call is completed 910, the URLs are inactivated at step 912. When the call is not completed, processing monitors for a click of the URL at step 914. When this URL is clicked by the caller (step 914), the ReU 116 calls the electronic address of the caller embedded in the URL at step 916. Once the caller answers this call from the ReU 116, the ReU 116 at step 918 identifies and terminates the portion of the ongoing voice call (identifier A) embedded in the URL between itself and the caller and replaces it with the call answered by the caller. The ReU 116 may have a pre-set overlap between the two calls to ensure smooth handover. The URL may also be a URL that contains instructions for "same" instead of caller electronic address for call change-over. Such a URL when clicked (step 914) establishes a new voice call (for call change-over) between the "same" caller device (where the URL is clicked) and the ReU 116 at step 916. It may be a VoIP or a regular phone call. Finally, the ECSP 102 creates such URLs for each of the electronic addresses specified by the caller for the purposes of call change-over. All the URLs are posted by ECSP in the same manner for the caller to click.

Instead of creating URLs for a one-click solution to call change-over, it is also possible to have the "app" or the ECSP 102 on-line system to interact with the caller to achieve the same purpose via one or more data calls. For instance, when the URL is clicked, the ECSP 102 may request additional password before setting up the call from ReU. In the "app" or the on-line account with the ECSP 102, the caller may specify/select his electronic address from a menu for call change over and press the call change-over button.

The URLs remain active as long as the call A is ongoing. As soon as voice call A is terminated, the URLs become inactive (step 912). Also once the call undergoes a change-over, ECSP may yet again provide change-over mechanism for the changed-over call (step 920).

Figure 10:
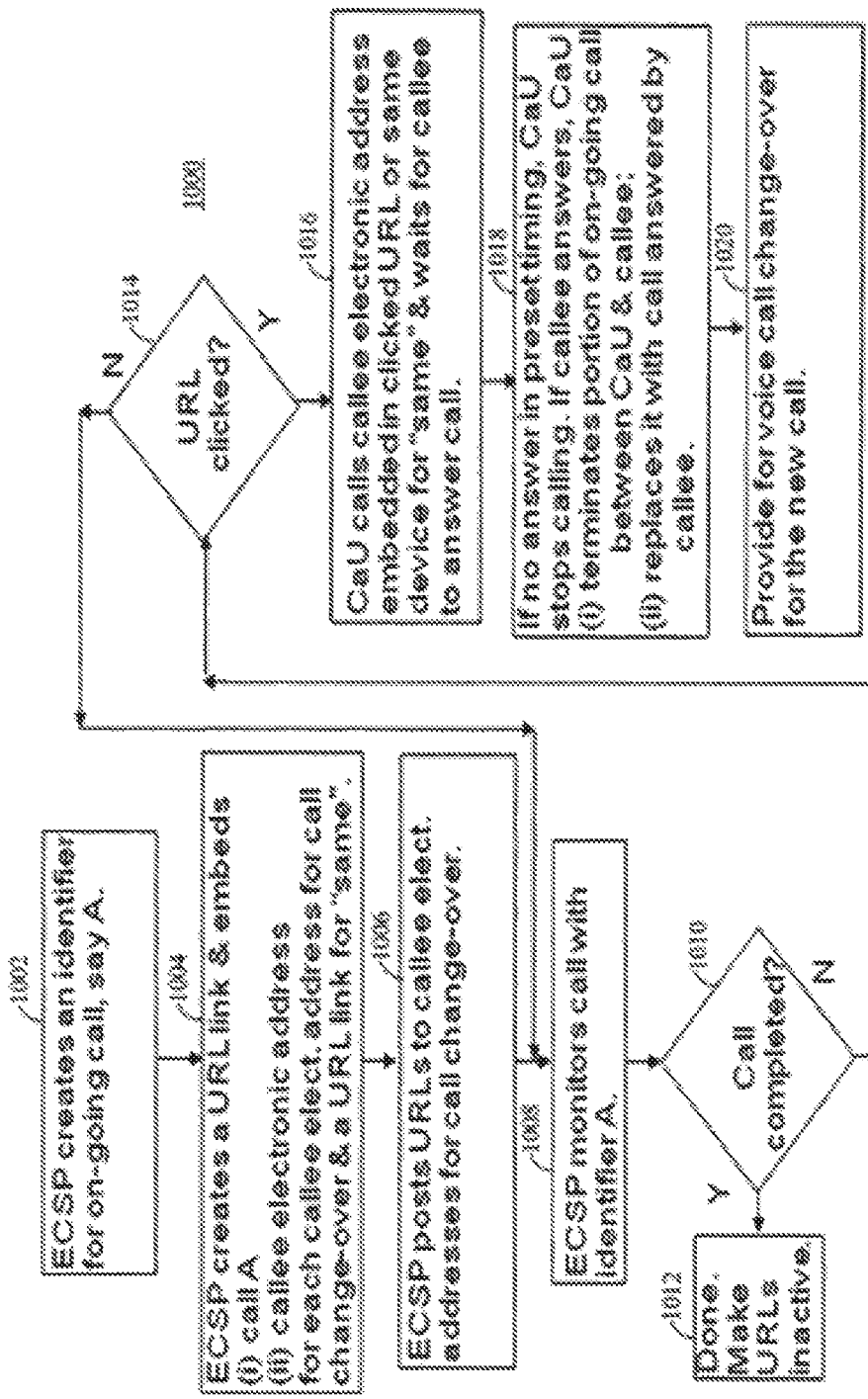
FIG. 10 depicts a flowchart for voice call change-over by the callee in accordance with the present embodiment.

ECSP Initiated Voice Call Change-Over by Callee:

FIG. 10 shows a flowchart 1000 for call change-over by the callee. For an ongoing voice call, the ECSP 102 creates an identifier for the call (call identifier A) at step 1002. At step 1004, the ECSP 102 creates a URL link embedded with A and a callee electronic address for call change-over. The caller may have specified one or more of callee electronic addresses to the ECSP 102 for the purposes of call change-over. These callee electronic addresses for call change-over may also be stored in the on-line account of the caller with the OlaU 112 of the ECSP 102. The OlaU 112 also stores electronic addresses of the callee for posting such one or more URLs as provided by the caller. This URL is posted at step 1006 by the ECSP 102 to the callee electronic addresses stored in the on-line account of caller in the OlaU 112 for posting call change-over URLs via emails, SMS, data call to callee, IM, Facebook page, callee's on-line account with the OlaU 112 (if any) and other websites. The ECSP 102 monitors the call with the call identifier A at step 1008 and, when the call is determined to be completed at step 1010, the ECSP 102 inactivates the URL. However, while monitoring the call at step 1008, when the URL is clicked by the callee at step 1014, the CaU 118 calls the electronic address of the callee embedded in the URL at step 1016. Once the callee answers this call from the CaU 118, the CaU 118 at step 1018 identifies and terminates the portion of the ongoing voice call (identifier A) embedded in the URL between itself and the callee and replaces it the call answered by the callee. The CaU 118 may have a pre-set overlap between the two calls to ensure smooth handover. The URL may also be a URL that contains instructions for "same" instead of callee electronic address for call change-over. Such a URL when clicked at step 1014 establishes a new voice call (for call change-over) between the "same" callee device (where the URL is clicked) and the CaU at step 1016. Finally, the ECSP 102 creates such URLs for each of the callee electronic addresses specified by the caller for the purposes of call change-over at step 1020. All the URLs are posted by the ECSP 102 in the same manner for the callee to click (step 1006). The ECSP 102 may send the URL for the voice call change-over to the callee via SMS even if it knows no other electronic address of the callee. Alternately, the ECSP 102 may SMS the callee at an on-line account (may be temporary for the duration of the call) information inviting him to log in for call change-over.

Instead of creating URLs for a one-click solution to call change-over, it is also possible to have the "app" or the ECSP 102 on-line system to interact with the callee via one or more data calls to achieve the same purpose. For instance, when the URL is clicked, the ECSP 102 may request additional callee verification before setting up the call from CaU. In the "app" or the on-line account with the ECSP 102, the callee may specify/select his electronic address from a menu for call change over and press the call change-over button. The URLs remain active as long as the call A is ongoing. As soon as voice call A is terminated (step 1010), the URLs become inactive (step 1012). Also, once the call undergoes a change-over, the ECSP 102 may yet again provide change-over mechanisms for the changed-over call.

Figure 11:
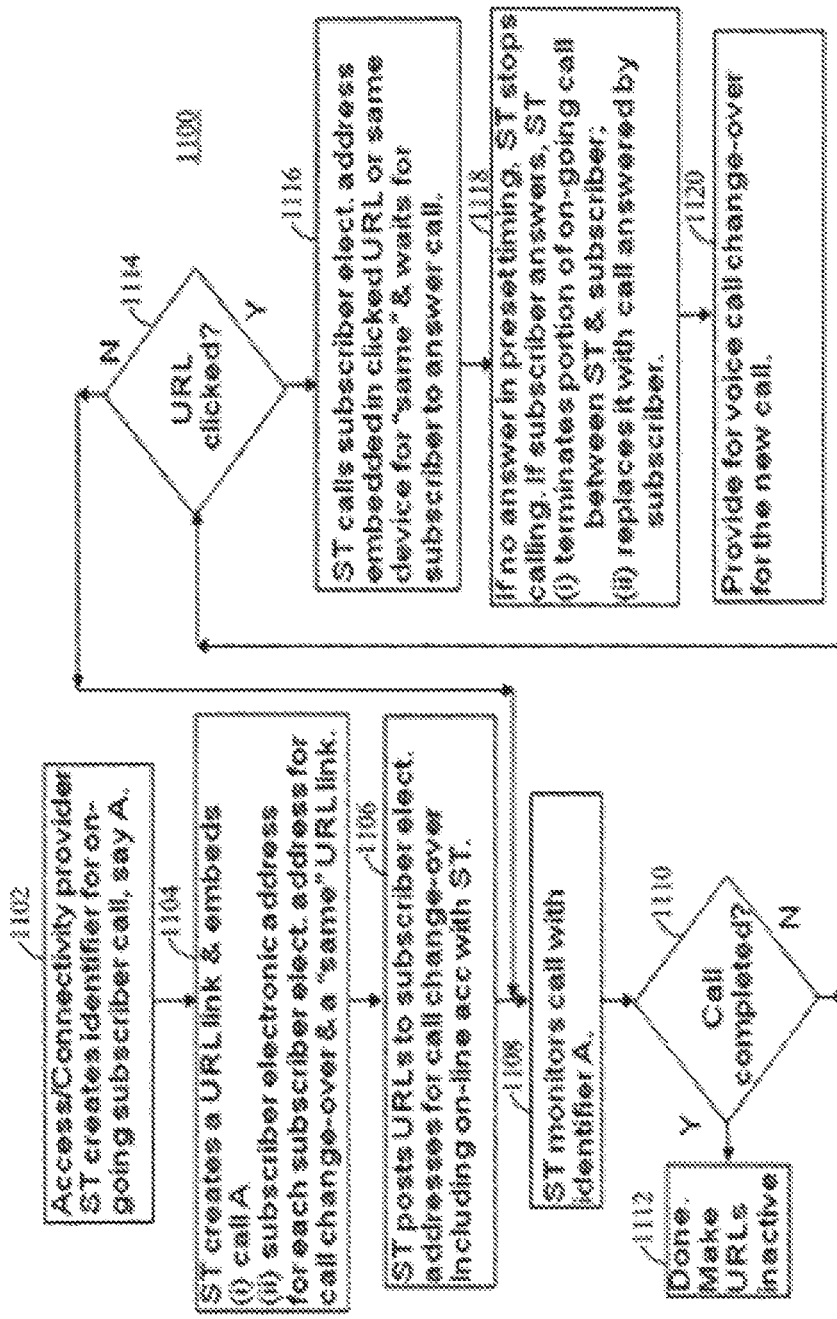
FIG. 11 depicts a flowchart for access/connectivity provider ACSP assisted voice call change-over by the caller/callee in accordance with the present embodiment.

Access/Connectivity Provider ACSP Initiated Voice Call Change-Over:

For an ongoing voice call between the ReU 116 and the caller (or the CaU 118 and the callee), there are service providers other than the ECSP 102 that can also provide the services of call change-over. FIG. 11 depicts a flowchart 1100 for voice call change-over by the caller/callee initiated by an access/connectivity provider, ACSP. Here, ST is used as the ACSP in the flowchart 1100. Say the user (either a caller or a callee) is using ST as his mobile phone operator (access/connectivity provider or ACSP) and the voice call A (call identifier A) is between the user's mobile phone and another party (not necessarily the ReU 116). Then ST can also provide the services of call change-over to the user via a user on-line account that provides ST with electronic addresses of the user for call change over and posting of URLs (step 1106). Even a URL for "same" can be posted. It may also be done via an "app". For instance, a voice call may be shifted from a cellular voice channel to a cellular broadband channel or to a WiFi channel on the same device via an "app", preferably in one-click, by the caller as many smartphones have capability to use cellular voice, cellular broadband, and WiFi networks simultaneously. In a similar manner, the callee's access/connectivity provider ACSP can also provide for call change-over to the callee. In fact, it will be apparent to those skilled in the art that the ACSP of either the caller and/or the callee or both can provide for call change-over to either one or both parties. For example, a caller's ACSP may send the URL for the voice call change-over to the callee via a SMS even if it knows no other electronic address of the callee. Alternately, a caller's ACSP may SMS the callee an on-line account (may be temporary for the duration of the call) information inviting him to log in for call change-over. In many cases, the ACSP of the caller and callee may be the same.

Thus far, all voice call change-over were initiated by either the ECSP 102 or the access/connectivity providers ACSP. In the following embodiments, one of caller and/or callee may request an ECSP 102 and/or an ACSP for a voice call change-over. Such a voice call change-over request may be via a data call or a voice call initiated by either the caller or the caller. Together, either the caller and/or the callee is referred to as a "user".

User Initiated Voice Call Change-Over

In the following, voice call change-over is made via a data or a voice call by either one of the caller or the callee and if the ECSP 102 and/or the ACSP provide such a change-over.

Voice Call Change-Over: Caller Initiated Data Call to ECSP.

Figure 12:
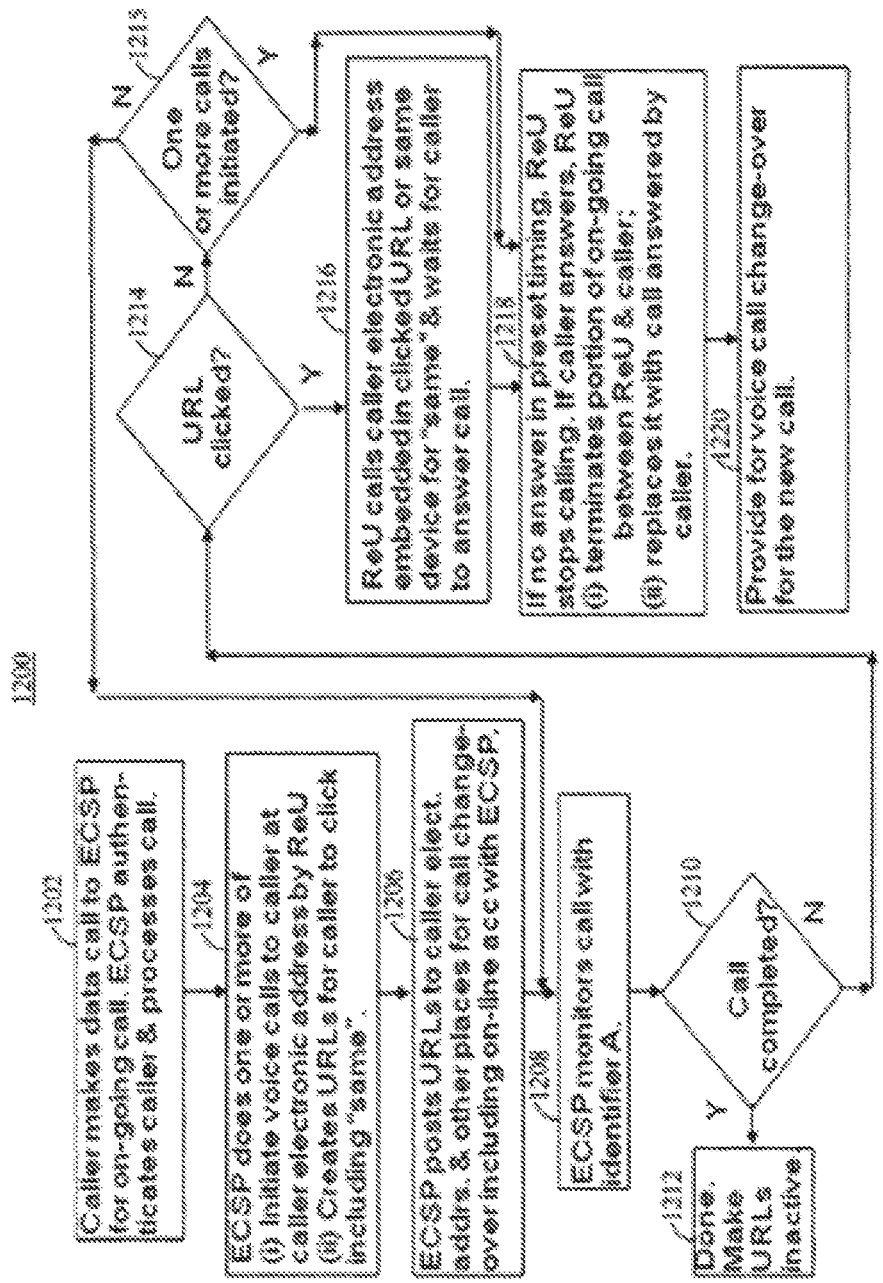
FIG. 12 depicts a flowchart for a caller initiated data call to the ECSP for a Voice Call change-over in accordance with the present embodiment.

Referring to FIG. 12, a flowchart 1200 for the caller initiated data call to ECSP for a voice call change-over. The caller makes a data call (consisting of one or more data messages or by accessing its on-line account) to the ECSP 102 authenticating himself to ECSP and requesting a voice call change-over for the current voice call at step 1202. The caller may have specified caller electronic addresses for call change-over to the on-line account with the OlaU 112 or they may be a part of the data call. The ECSP 102 may also combine the two lists of electronic addresses. Based on the data call and the on-line information, the OmU 114 at step 1204 proceeds to do either one or more of (i) Initiate voice calls to the caller electronic addresses, or (ii) Create URLs and posts them at step 1206 at specified caller electronic addresses, to the caller in a data call, and other appropriate places, which when clicked at step 1214 may initiate a voice call to the corresponding caller electronic address including "same" for a certain period of time as per calling rules (step 1216). As the caller either answers a voice call in (i) or clicks a URL link in (ii), the ReU/OmU of the ECSP 102 proceeds to set up a new call. At step 1218, the OmU 114 identifies and terminates the portion of the ongoing voice call between the ReU 116 and the caller and replaces it with the new call answered by the caller. The ReU 116 may have a pre-set overlap between the two calls to ensure smooth handover. If the caller does not answer any of the calls set up by the ReU 116 for voice call change-over (step 1215), then the ReU 116 terminates these calls and returns back to monitoring the original call (step 1208). The caller may also be informed of this action.

Voice Call Change-Over: Caller Initiated Voice Call to ECSP.

Figure 13:
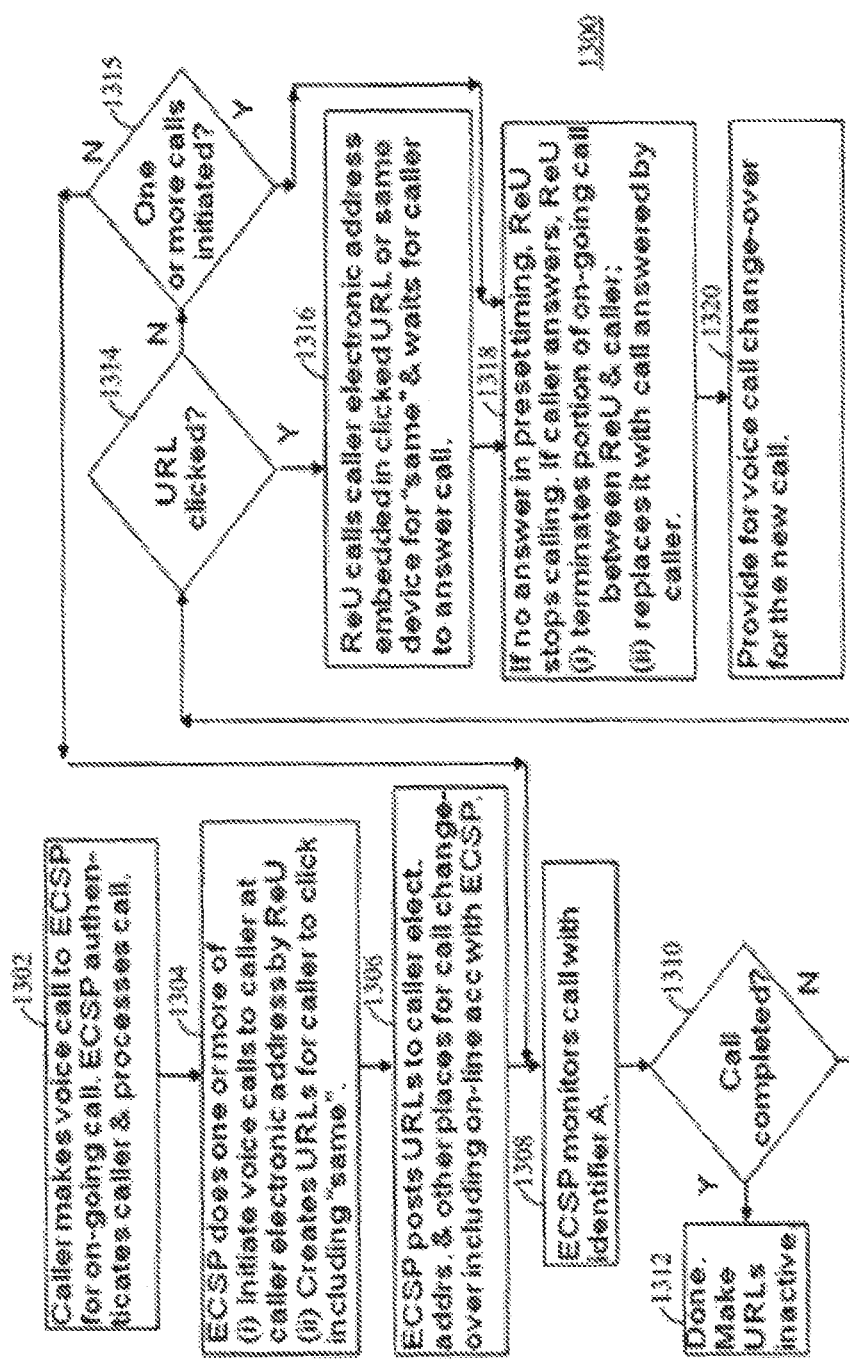
FIG. 13 depicts a flowchart for a caller initiated voice call to the ECSP for a Voice Call change-over in accordance with the present embodiment.

FIG. 13 shows a flowchart 1300 for the caller initiated voice call to the ECSP 102 for a voice call change-over. At step 1302, the caller makes a voice call using any device to the ECSP 102 and authenticates himself to the ECSP 102 (preferably via caller-ID) and requests a voice call change-over for the current voice call. The ECSP 102 may have a designated number for callers to call for this function. The caller may have specified caller electronic addresses for call change-over to the on-line account with the OlaU 112 or they may be a part of the voice call or may select from a menu via IVR with the OlaU 112. The ECSP 102 may also combine these lists of electronic addresses. Based on the voice call and the on-line information, the OmU 114 proceeds at step 1304 to do either one or more of (i) Initiate voice calls to the caller electronic addresses (ii) Create URLs and, at step 1306, post them at specified caller electronic addresses, to the caller in a data call, and other appropriate places, which when clicked may initiate a voice call to the corresponding caller electronic address including "same" for a certain period of time as per calling rules. As the caller either answers a voice call in (i) or clicks a URL link (step 1314) in (ii), the ReU/OmU of the ECSP 102 proceeds according to set up a new call at step 1316. The OmU 114 identifies and terminates the portion of the ongoing voice call between the ReU 116 and the caller at step 1318 and replaces it with the new call answered by the caller. The ReU 116 may have a pre-set overlap between the two calls to ensure smooth handover. If the caller does not answer any of the calls set up by the ReU 116 for voice call change-over (step 1315), then the ReU 116 terminates these calls and returns back to monitoring the original call (step 1308).

Voice Call Change-Over: Callee Initiated Data/Voice Call to ECSP.

A callee may not know much about the ECSP 102 electronic addresses and hence it may not always be in a position to initiate a voice call change-over. However, in many cases a callee may also have a user account with the caller's ECSP or may know of ECSP information via some other means. Instances include when the ECSP 102 is integrated with the PBX of an organization. Other instances could be by way of requesting the caller for more information about how the call was set-up and asking for the caller to initiate a voice call change-over for him. In these situations, it may be possible to initiate voice call change-over in the similar way as a caller using either a data or a voice call. A callee may also call back the ECSP phone number that he receives the call from on his device captured via the caller-ID function on his device as he may be reached by the ECSP 102 via that number whenever a particular caller calls him.

Voice Call Change-Over: Caller/Callee Initiated Data Call to ACSP.

Figure 14:
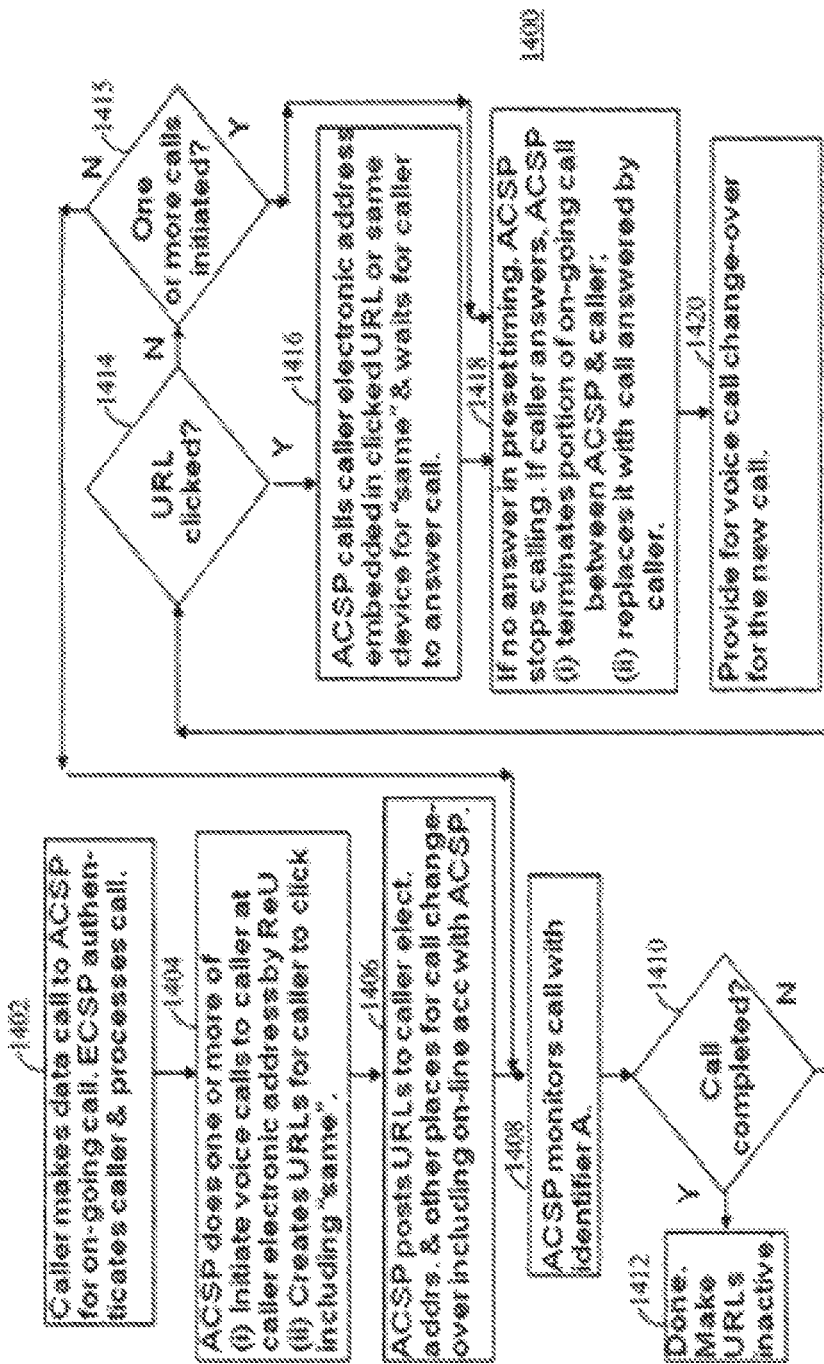
FIG. 14 depicts a flowchart for a caller and/or callee (called "the user") initiated data call to an ACSP for voice call change-over in accordance with the present embodiment.

FIG. 14 depicts a flowchart 1400 for the caller and/or the callee (called "user") initiating a data call to an ACSP for a voice call change-over. At step 1402, the user makes a data call (consisting of one or more data messages or by accessing its on-line account) to the ACSP authenticating himself to the ACSP and requesting a voice call change-over for the current voice call. The user may have specified user electronic addresses for call change-over to the on-line account with the ACSP or they may be a part of the data call. The ACSP may also combine the two lists of electronic addresses. Based on the data call and the on-line information, the ACSP proceeds at step 1404 to do either one or more of (i) Initiate voice calls to the user electronic addresses (ii) Create URLs and, at step 1406, post them at specified user electronic addresses, to the user in a data call, and other appropriate places, which when clicked at step 1414 may initiate at step 1416 a voice call to the corresponding user electronic address including "same" for a certain period of time as per calling rules. As the user either answers a voice call in (i) or clicks a URL link in (ii) (i.e., step 1414), the ACSP proceeds to set up a new call at step 1416. The ACSP identifies and terminates at step 1418 the portion of the ongoing voice call between the ACSP and the user and replaces it with the new call answered by the user. The ACSP may have a pre-set overlap between the two calls to ensure smooth handover.

Voice Call Change-Over: Caller/Callee Initiated Voice Call to ACSP.

Figure 15:
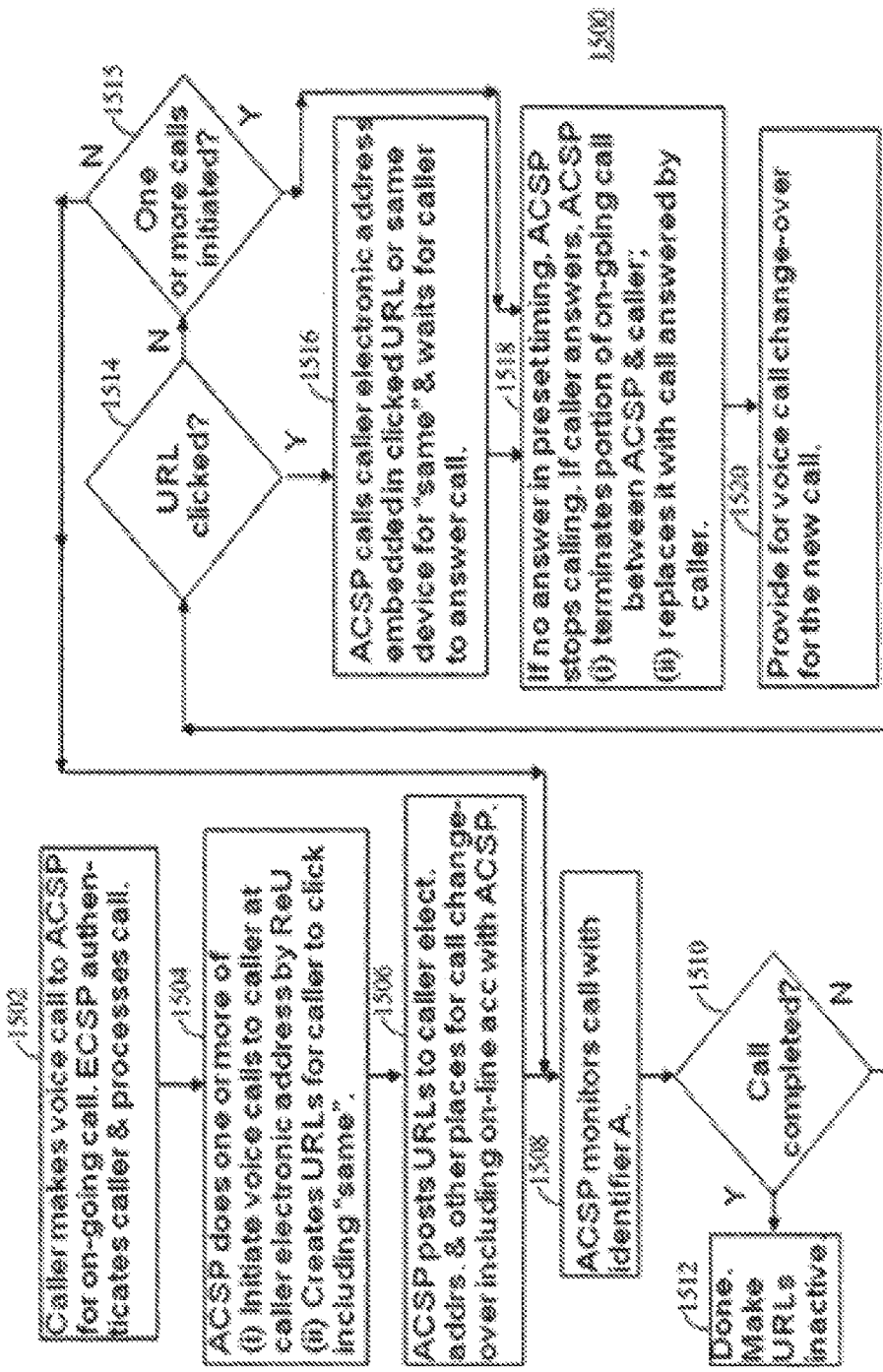
FIG. 15 depicts a flowchart for a caller and/or callee (called "the user") initiated voice call to the ACSP for voice call change-over in accordance with the present embodiment.

Referring to FIG. 15, a flowchart 1500 depicts a process for the caller and/or the callee (called "user") initiated voice call to the ACSP for a voice call change-over. At step 1502, the user makes a voice call using any device to the ACSP and authenticates himself to the ACSP and requests a voice call change-over for the current voice call. The user may have specified user electronic addresses for call change-over to the on-line account with the ACSP or they may be a part of the voice call or may select from a menu via IVR with the ACSP. The ACSP may also combine these lists of electronic addresses. Based on the voice call and the on-line information, the ACSP at step 1504 proceeds to do either one or more of (i) Initiate voice calls to the caller electronic addresses (ii) Create URLs and, at step 1506, post them at specified user electronic addresses, to the user in a data call, and other appropriate places, which when clicked (step 1514) may initiate (step 1516) a voice call to the corresponding user electronic address including "same" for a certain period of time as per calling rules. As the user either answer a voice call in (i) or clicks a URL link in (ii), the ACSP proceeds according to set up a new call (step 1516). At step 1518, the ACSP identifies and terminates the portion of the ongoing voice call between the ACSP and the user and replaces it with the new call answered by the user. The ACSP may have a pre-set overlap between the two calls to ensure smooth handover.

Data Calls

Figure 16:
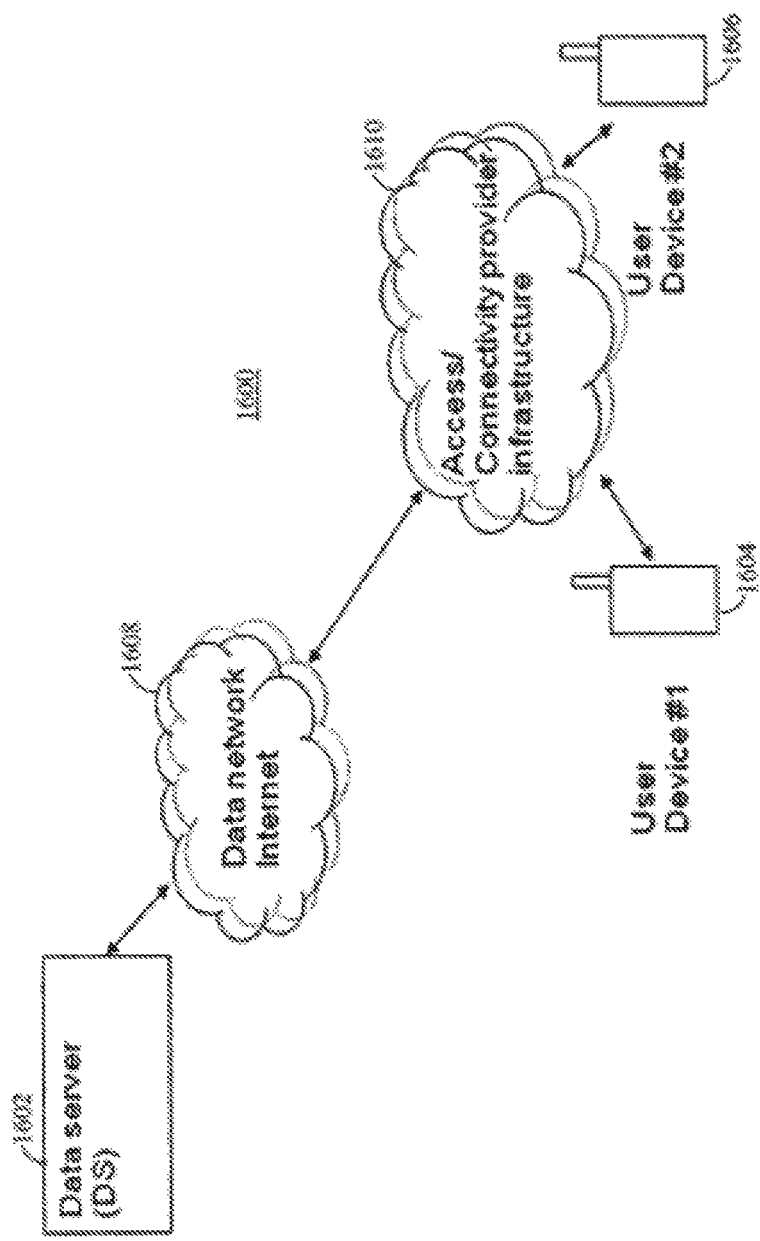
FIG. 16 depicts a diagram for typical data call flow between a data server (DS) and a user device in accordance with the present embodiment.

Data Call Change-Over:

There are two parties for an ongoing data call, namely the user and a data server. Say the data call was set up by the user to download data intensive content/application such as downloading information/content such as data files, presentations, graphics, animation, audio, video or multi-media content or a game and play it in real time. The protocol used for data communication between the user device and the data server may depend on the content itself. FIG. 16 shows a diagram 1600 for a typical data flow between a data server 1602 and a user device 1 (1604) via a data network 1608 and an ACSP 1610.

Embodiments where a user may change one or more of (i) devices, say the user device 1 (1604) to a user device 2 (1606);

(ii) electronic addresses; and (iii) connectivity (for instance from cellular broadband to WiFi) during an ongoing data call will now be described.

Figure 17:
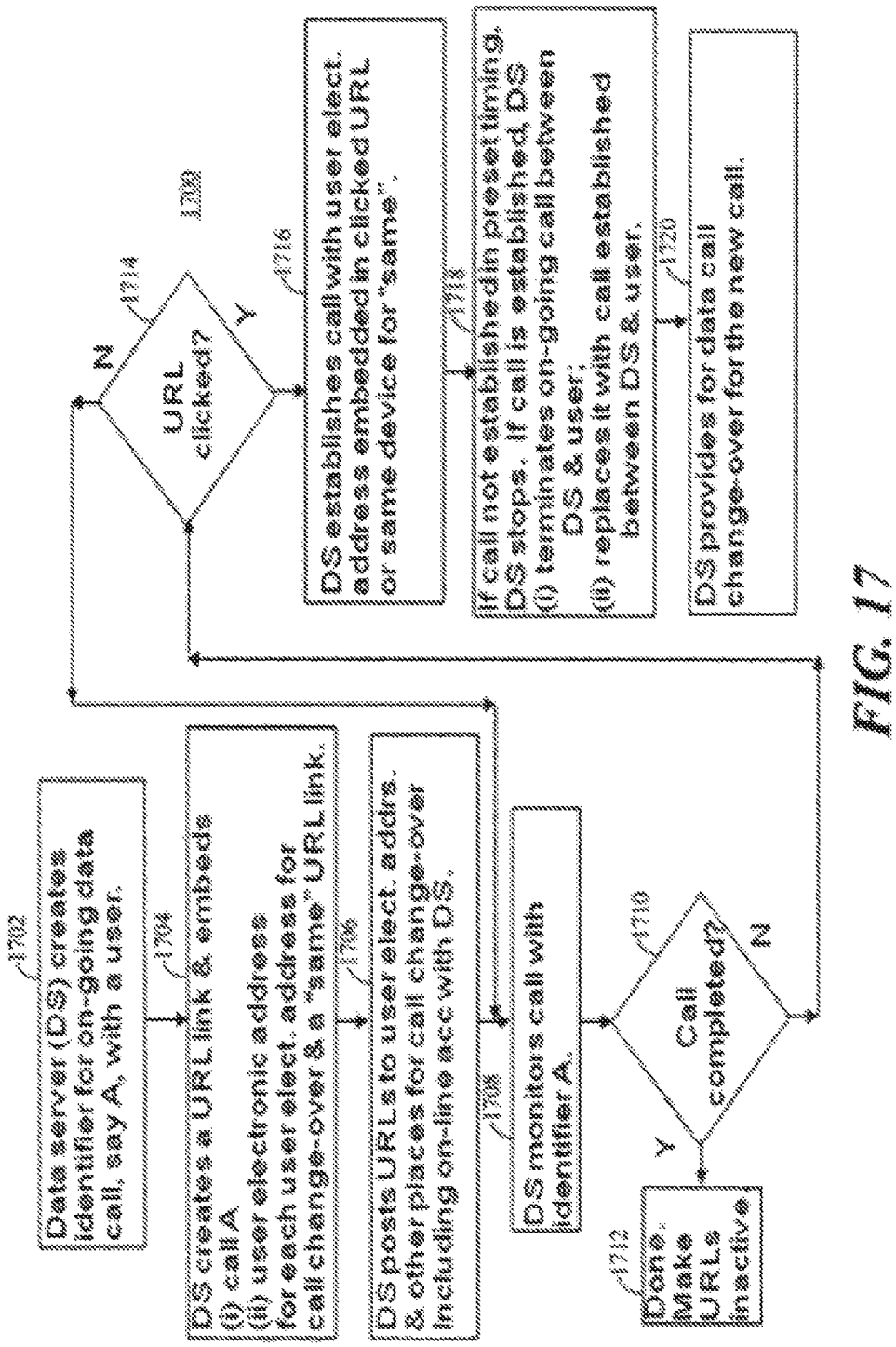
FIG. 17 is a flowchart for a data server (DS) assisted data call change-over in accordance with the present embodiment.

Data Server (DS) Assisted Data Call Change-Over:

FIG. 17 shows a flowchart 1700 for a data call change-over assisted by the data server (DS) 1602. Here, the ECSP 102 is a part of the data server infrastructure. For an ongoing data call, the data server 1602 at step 1702 creates an identifier (or uses an already existing one if any) for the data call (call identifier A). Call identifier A can be a string of alphanumeric and other characters uniquely identifying a call. It may be the same for the entire duration of the call or may change or be updated as a call is shifted in accordance with the present embodiments. It may also capture all pertinent information associated with a call such as time duration or addresses of parties or be used to extract such information from a database. The DS 1602 at step 1704 creates a URL link embedded with A and a user electronic address for call change-over. The user may have specified one or more of his electronic addresses to the DS 1602 for the purposes of call change-over. These electronic addresses for call change-over may also be stored in the on-line account of the user associated with the DS 1602. The DS 1602 also stores electronic addresses of the user for posting such one or more URLs. This URL is posted at step 1706 by the DS 1602 to the user electronic addresses stored in on-line account of caller in data server for posting call change-over URLs via "app", data call to the user, emails, SMS, IM, Facebook page, user's on-line account with data server, websites related to the DS 1602 including the web-pages the user is currently visiting, and other websites. When this URL is clicked by the user at step 1714, the DS 1602 sets up a data call to the user's electronic address embedded in the URL at step 1716. The DS 1602 identifies and terminates the ongoing data call A embedded in the URL and continues the data call answered by the user at step 1718. The DS 1602 may have a pre-set overlap between the two calls to ensure smooth handover. The URL may also be a URL that contains instructions for "same" instead of user electronic address for call change-over. Such a URL when clicked at step 1714 establishes a new data call (for call change-over) between the "same" user device (where the URL is clicked) and the DS 1602 at step 1716. Finally, the DS 1602 creates URLs for each of the electronic addresses specified by the user for the purposes of call change-over (step 1704). All the URLs are posted by the DS 1602 in the same manner for the user to click (step 1706). Instead of creating URLs for a one-click solution to call change-over, it is also possible to have the "app" or the DS to interact with the user via one or more data calls to achieve the same purpose. For instance, when the URL is clicked at step 1714, the DS 1602 may request an additional password before setting up the data call for change-over. In the "app" or the on-line account with the DS 1602, the user may specify/select electronic address(es) from a menu for call change-over and URL posting and press the call change-over button. The URLs remain active as long as the data call A is ongoing (step 1708). As soon as the data call A is terminated at step 1710, the URLs become inactive (step 1712). Also, once the call undergoes a change-over, the DS 1602 may yet again provide a change-over mechanism for the changed-over call (step 1720).

Figure 18:
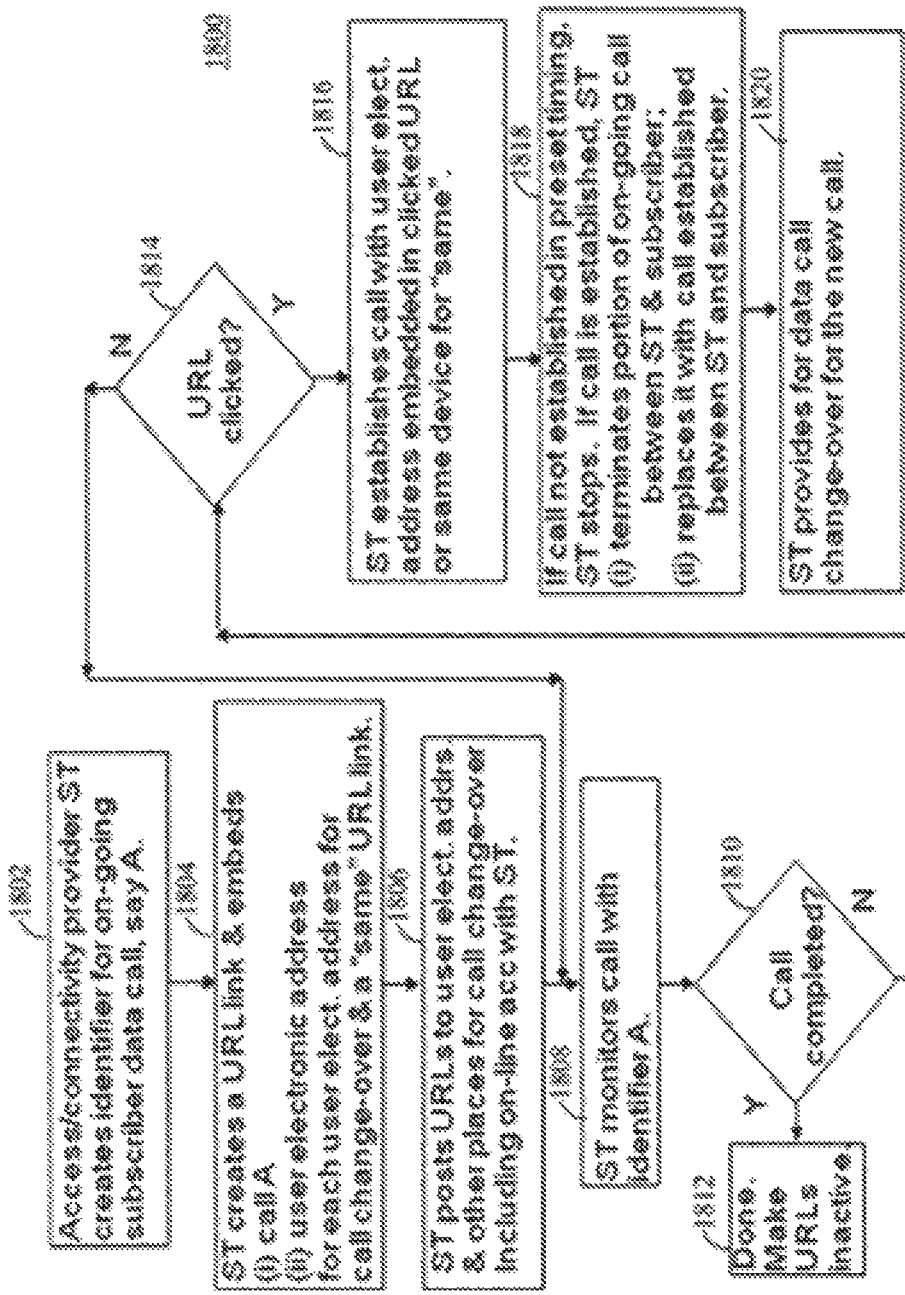
FIG. 18 is a flowchart for an ACSP assisted data call change-over in accordance with the present embodiment.

Access/Connectivity Provider ACSP Assisted Data Call Change-Over:

For an ongoing data call between the DS 1602 and the user, there are providers other than the DS 1602 that also can provide the services of data call transfer. FIG. 18 shows a flowchart 1800 for a data call change-over assisted by an access/connectivity provider ACSP. Here, the ECSP 102 is a part of ACSP infrastructure. Say the user is using ST as his mobile phone operator (access/connectivity provider ACSP) and the data call A is between the user's mobile phone and the DS 1602. Then, ST can also provide the services of call change-over to the user via a user on-line account that provides ST with electronic addresses of the user for data call change over and posting of URLs. Even a URL for "same" can be posted. It may also be done via an "app". In this instance, when the user clicks a URL, the ACSP ST terminates the portion of an ongoing call between itself and the user/subscriber and replaces it with new call established between itself and user/subscriber as per the clicked URL (step 1818). Thus, a data call may be shifted from a cellular data channel to a LAN channel or to a WiFi channel on the same/different device by the access provider via an "app", preferably in one-click, by the user, as many smartphones have the capability to use cellular broadband and WiFi networks simultaneously.

Thus far, embodiments for data call change-over that were initiated by either the DS 1602 or the access/connectivity provider ACSP have been described. It is also possible for such data call change-over to be initiated by the user. In the following, such embodiments are described.

Figure 19:
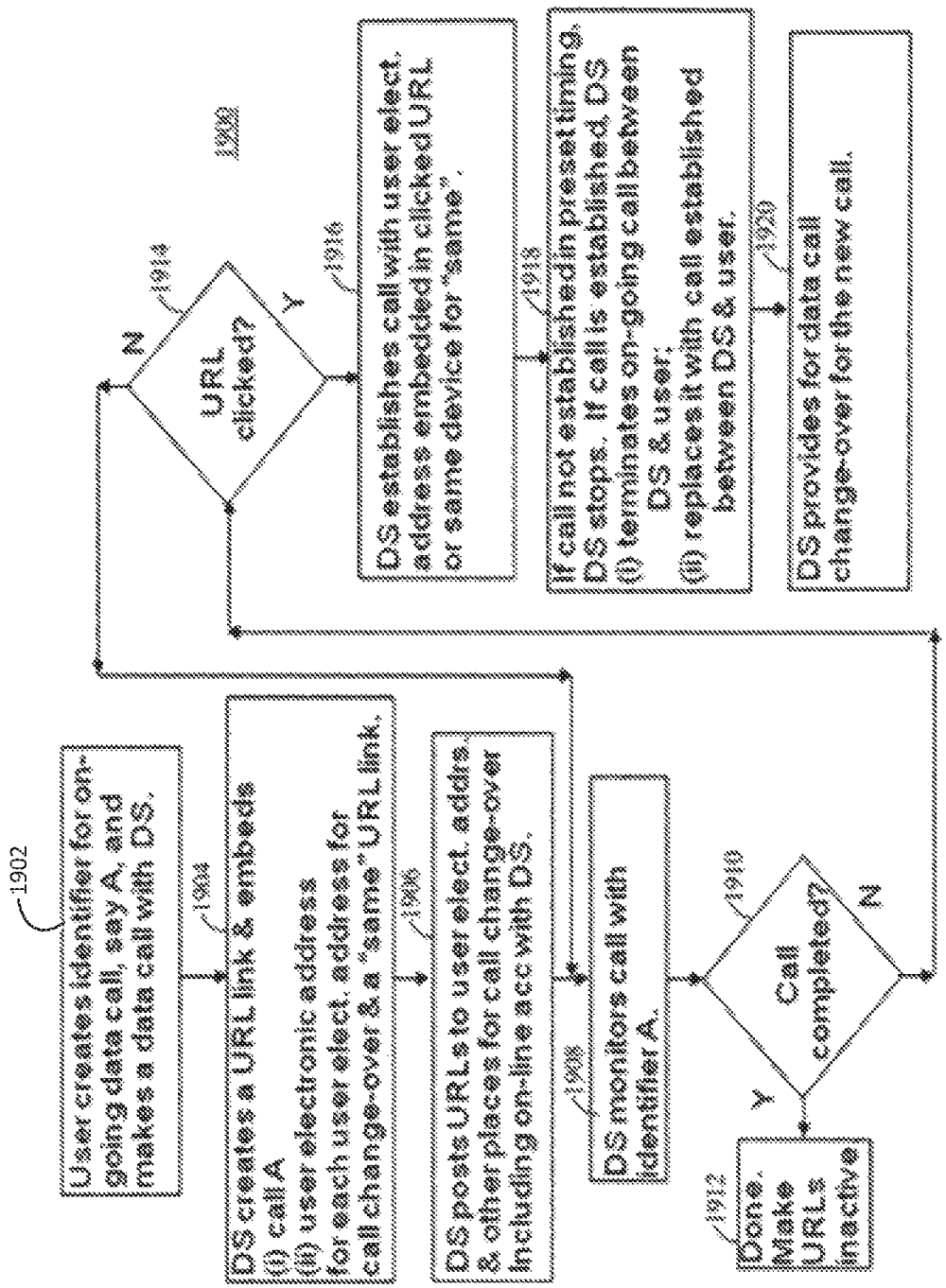
FIG. 19 depicts a flowchart for user-initiated data server (DS) assisted data call change-over in accordance with the present embodiment.

User Initiated Data Server DS Assisted Data Call Change-Over:

Referring to FIG. 19, a flowchart 1900 for a user-initiated data call change-over assisted by the DS 1602 is depicted. For an ongoing data call, the user at step 1902 creates an identifier for the ongoing data call say A. The user then makes a data call (step 1904) consisting of one or more data messages to the data server requesting a data call change-over for the data call A. The data call may also include user authentication information and the user electronic addresses for data call change-over. This data call may also include user electronic addresses for posting of the links. The DS may also extract the user electronic addresses for the data call change-over and posting from the on-line account information of the user. The DS 1602 creates a URL link embedded with A and a user electronic address for call change-over (step 1904). The DS 1602 also stores electronic addresses of the user for posting such one or more URLs. This URL is posted at step 1906 by the DS 1602 to the user electronic addresses stored in on-line accounts (and/or extracted from the data call of the user) of user in data server for posting call change-over URLs via "app", data call to the user, emails, SMS, IM, Facebook page, user's on-line account with the DS 1602, websites related to the DS 1602 including the web-pages the user is currently visiting, and other websites and so on. When this URL is clicked by the user at step 1914, the DS 1602 sets up a data call at step 1916 to the electronic address of the user embedded in the URL. The DS 1602 identifies and terminates the ongoing data call A embedded in the URL at step 1918 and continues the data call answered by the user. The DS 1602 may have a pre-set overlap between the two calls to ensure smooth handover. The URL may also be a URL that contains instructions for "same" instead of user electronic address for call change-over. Such a URL when clicked at step 1914 establishes a new data call (for call change-over) at step 1916 between the "same" user device (where the URL is clicked) and the DS 1602. Finally, the DS 1602 creates URLs for each of the electronic addresses specified by the user for the purposes of call change-over at step 1920. All the URLs are posted by the DS 1602 at step 1906 in the same manner for the user to click. Instead of creating URLs for a one-click solution to call change-over, it is also possible to have an "app" or the DS 1602 to interact with the user via one or more data calls to achieve the same purpose. For instance, when the URL is clicked, the DS 1602 may request an additional password before setting up the data call for change-over. In the "app" or the on-line account with the DS 1602 accessed via "app" or the web, the user may specify/select his electronic address from a menu for call change-over and press the call change-over button. The URLs remain active as long as the data call A is ongoing (step 1908). As soon as data call A is terminated at step 1910, the URLs become inactive at step 1912. Also once the call undergoes a change-over, the DS 1602 may yet again provide a change-over mechanism for the changed-over call.

Figure 20:
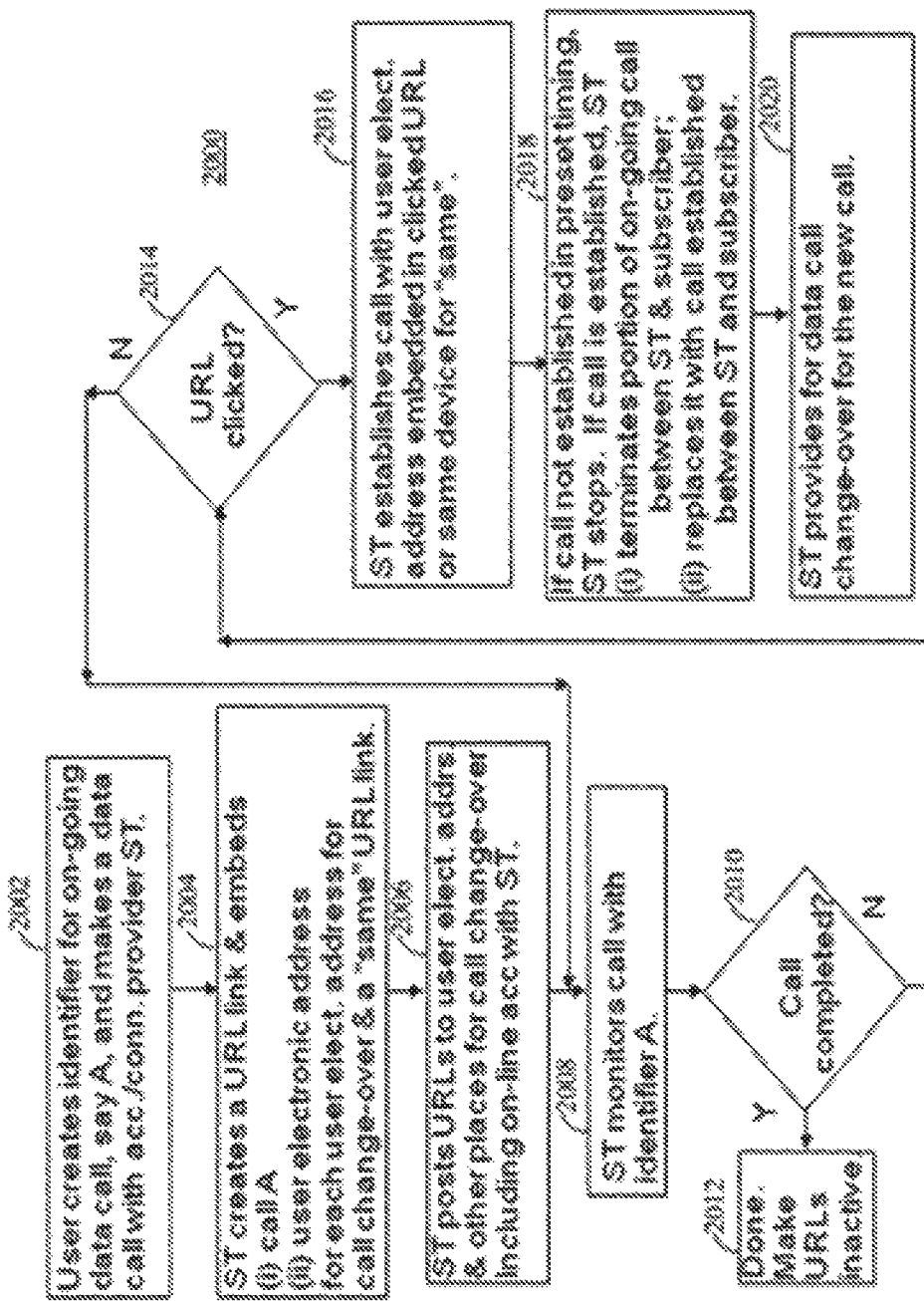
FIG. 20 depicts a flowchart for user-initiated ACSP assisted data call change-over in accordance with the present embodiment.

User Initiated Access/Connectivity Provider ACSP Assisted Data Call Change-Over:

For an ongoing data call between the DS 1602 and the user device, there are providers other than DS that also can provide the services of data call transfer. FIG. 20 shows a flowchart 2000 for a user-initiated data call change-over assisted by an access/connectivity provider ACSP. Say the user is using ST as his mobile phone operator (access/connectivity provider ACSP) and the data call A is between the user's mobile phone and the DS 1602. For an ongoing data call, the user creates an identifier for the ongoing data call A at step 2002. The user then makes a data call consisting of one or more data messages to SingTel server requesting a data call change-over for the data call A. The data call may also include user authentication information and the user electronic addresses for data call change-over. This data call may also include user electronic addresses for posting of the links. ST can provide the services of call change-over to the user via a user on-line account that provides ST with electronic addresses of the user for data call change over and posting of URLs. Even a URL for "same" can be posted. It may also be done via an "app". In this instance, when the user clicks a URL at step 2014, the access/connectivity provider at step 2018 terminates the portion of the ongoing call between itself and the user/subscriber and replaces it with a new call established between itself and the user/subscriber as per the clicked URL. Thus, a data call may be shifted from a cellular data channel to a LAN channel or to a WiFi channel on the same/different device by the access provider via an "app", preferably in one-click, by the user. Many smartphones have the capability to use cellular broadband and WiFi networks simultaneously.

The ECSP 102 may be a part of the LAN infrastructure. In this case, the user may stay on the same LAN while he may change the device (say from a smartphone to an office PC or to a smart TV) using the methods described. It is observed that in the case of an intranet, the DS 1602 along with the ECSP 102 may be a part of an ACSP infrastructure. In this case, either one may provide for the data call change-over whether initiated by DS/ACSP and or the user.

As a voice/data call is shifted, the data server may also amend the information stream for voice call or data call as per the user requirements, device settings and characteristics, addresses, type of network and network conditions. Thus the data server may amend the resolution, source coding as well as error control coding, data rates, encryption, protocol (such as UDP, TCP, or RTSP), based on the network (e.g., PSTN, VoIP, mobile broadband, or LAN), device type, OS, software, display size, audio characteristics or other call parameters. Further, the method in accordance with the present embodiments may be used to have a data server split an information stream into multiple sub-streams first and then shift each of the sub-stream to a different device/place (e.g., video to a high resolution smart TV and audio to Hi-Fi speakers). Thus, a call can be split into multiple sub-calls and shifted from a first device to multiple second devices using a third device which may also be one of the first and/or second devices.

The systems and methods in accordance with the present embodiments can also be utilized to split and shift information content (e.g., data, files, audio, multimedia, or games) residing on or being downloaded to a home data server such as a computer, a smartphone, a content server, a set-top box, a TiVo, Netflix and/or similar type of home appliances in real time or non-real time to multiple home devices via a WiFi router. The WiFi router then incorporates aspects of call splitting and shifting as described herein. In other embodiments in accordance herewith, the home data server may incorporate the functionalities provided by the WiFi router.

It is possible that the content downloaded by the user using the system and method in accordance with present embodiments gets fragmented at one or more user devices and/or one or more electronic addresses. This can be managed by having a local or ad-hoc data network between the user devices (say Bluetooth or LAN) to transfer and combine the fragments at a user designated space (e.g., device, electronic address and on-line storage). This can be done simultaneously as the data call is ongoing or after it is completed. In a similar manner, fragments on the same device may also be combined into one content file. In other instances, there may not be any need to do so. For instance, the user may be consuming the content only one-time as it is downloaded (playing a computer game or watching streaming evening news) and he may not wish to keep it for later use. Finally, in the context of a data call the terms "user" and "subscriber" are used interchangeably.

Many of the functions and interactions required between the user and the enhanced communications services provider ECSP, access/connectivity service provider ACSP, and data servers DS can be facilitated by one or more "apps" running on smart user devices. This includes data calls (one or more data messages) for the functions of account creation, management, authentication, access, update and modifications to on-line accounts, call set-up and initiation, call change-over for both data and voice calls, on-line access, posting of URLs for call change-over to user devices, and processing of URLs when clicked.

Thus far, the described embodiments have made use of URLs that users click to provide for various functions to the users in one click. However, the same or equivalent functions may also be implemented via on-line systems, websites and "apps". In that sense, they are very much included in the embodiments described here and are a part of these embodiments. It will be apparent to those skilled in the art that though described in the context of data download, the systems and the methods described herein are also applicable to data upload.

Figure 21:
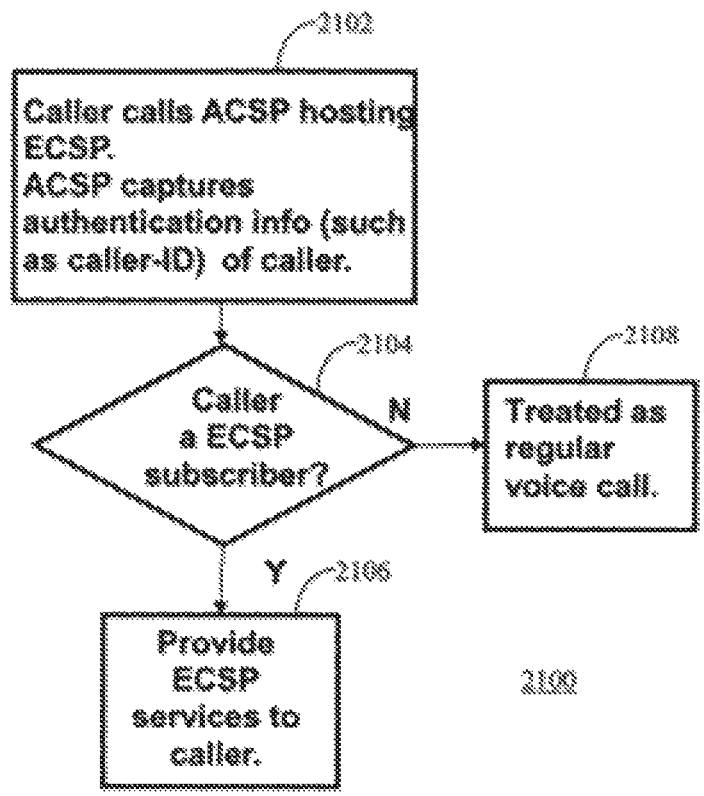
FIG. 21 depicts a flowchart for the ACSP when the ECSP is a part of the ACSP in accordance with an aspect of the present embodiment.

Referring to FIG. 21, when the ECSP 102 is a part of ACSP (say a mobile operator ST) infrastructure, a flowchart 2100 depicts a method that may be implemented in a way that the callers do not have to change their calling behavior for making voice calls. As the caller initiates a voice call at step 2102, the ACSP uses the phone number of the caller to check if he has signed up for the ECSP 102 (step 2104). If so, the ECSP services are provided to the caller (step 2106), otherwise it is treated as a regular voice call (step 2108). Other variations such as the caller pre-fixing the callee number with an ECSP specific code can also be implemented as known to those skilled in the art.

The systems and the methods described herein can also be used for setting up conference calls whereby the caller and the callees can be called at multiple electronic addresses and their voice calls provided for change-over by either the ECSP 102 or the ACSP or both.

Method and System for Allowing One or More Electronic Devices to Participate in a Phone Call Over a Land-Line Phone Line Landline phone lines (residential as well as business) can be provided using either regular PSTN or via VoIP with an ATA and broadband internet connection. Instances of the VoIP based landline phone lines include service providers that provide for a regular phone to be connected to an ATA that in turn connects to the broadband internet. The landline phone number is hosted by the service provider. Such VoIP based landline numbers provide the additional benefit of portability whereby the ATA can be connected to the broadband internet from any location.

Landline phone lines as provided by the PSTN or the VoIP providers suffer from the drawback of ringing at only one location where the phone connected to the ATA is located. Hence, there is a need for extending the landline phone line to another device, preferably a mobile device such as a smartphone and/or a tablet, independent of the location of the landline phone line provided by either the PSTN or the VoIP provider. This ensures that the user never misses an incoming call to his landline phone line number. Also, he is always able to use his landline phone line to make outgoing calls regardless of where he is located. Such a landline phone line terminating at a user device is referred to herein as a "soft landline".

Landline phone lines have many features and it is preferable that the soft landline also have those features so that the users of the soft landline may also use these features. For instance, multiple phones can be connected to a single phone line via splitters or jacks connected to the same landline phone line. They all ring simultaneously for an incoming call and any phone can be used to answer the call. All other phones can still be used to join an ongoing call. In the same way, any phone can be used to make an outgoing call. Also, all other phones can still be used to join an ongoing call. Further, unless other hardware, such as a PBX or phones with other communications means, are used, these multiple phones connected to a single phone line cannot be used for communication among each other.

Preferably, the soft landline retains these features. Whether someone uses a landline phone line (PSTN and/or VoIP) via a regular phone or a soft landline via a user device (smartphone, tablet, PC, laptop, e-book, watch, TV), the user experience for the use of the phone line is preferably the same for incoming/outgoing calls. For instance, a soft landline should provide for the user to be able to join in an ongoing call.

Present embodiments seek to provide a system and method for a soft landline that in most respects is similar to a landline phone line. Additional functions and services can be built over and above such a soft landline. This includes voice mail at a user device, change-over of a call among multiple soft landlines using data calls, selective call processing based on caller-ID at a user device, co-locating soft landline converter (SLC) with a service provider, and integrating SLC with a PBX, to mention a few.

Figure 22:
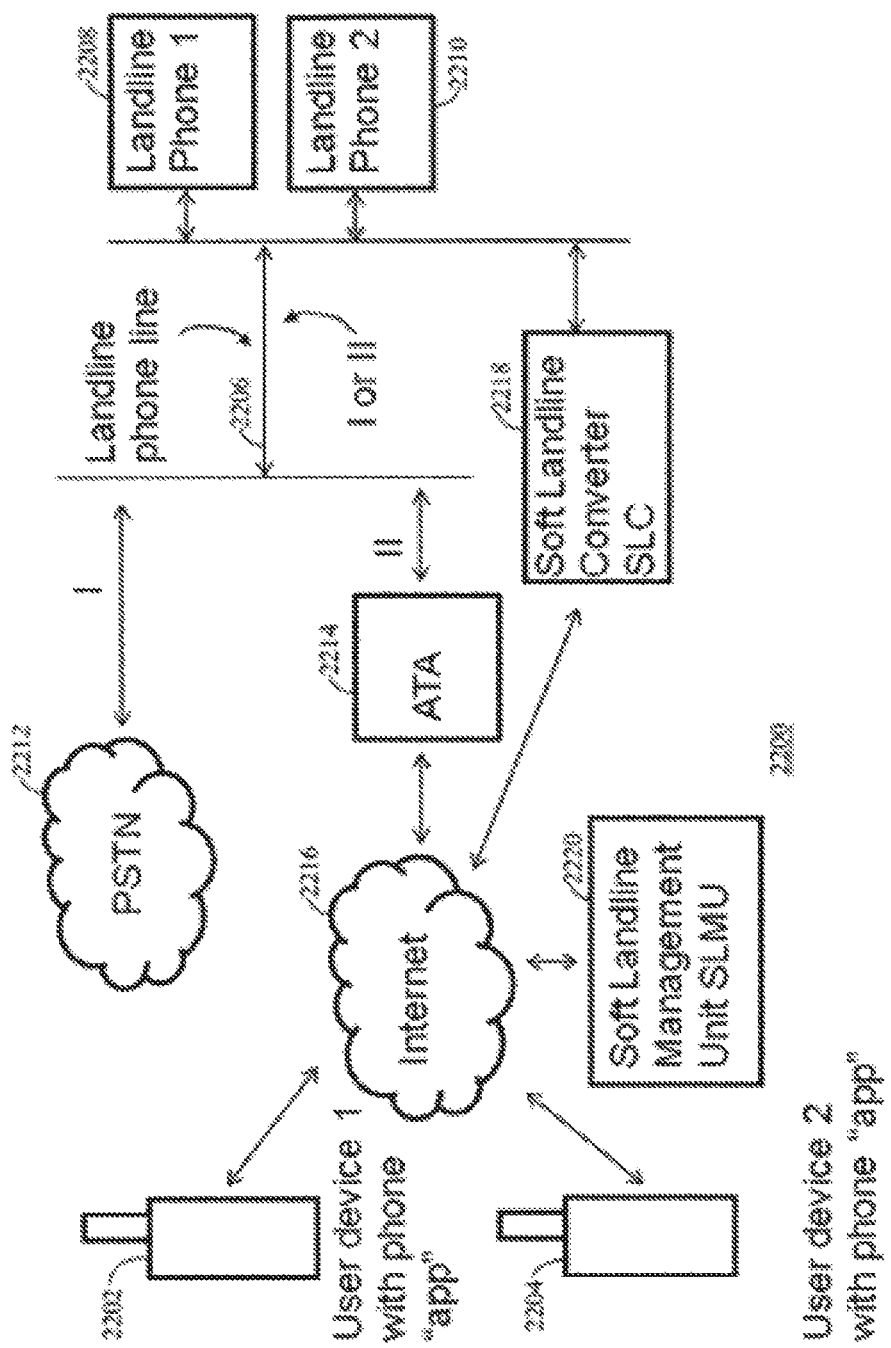
FIG. 22 depicts a system configuration for enabling soft landline that terminates at user devices in accordance with the present embodiment.

Referring to FIG. 22, a diagram 2200 depicts a system configuration for enabling a soft landline that terminates at user devices 1 (2202) and 2 (2204). The diagram 2200 shows a typical landline phone line 2206 with multiple landline phones 2208, 2210 connected to it. The landline phone line 2206 can be provided by a PSTN 2212 or an ATA 2214 connected to broadband internet 2216. The regular landline phones 2208, 2210 (including appliances such as answering machines and home security systems) are connected to the landline phone line 2206. The system configuration includes a soft landline converter (SLC) 2218 that is connected to the landline phone line at one end and a soft landline management unit (SLMU) 2220 via the broadband internet 2218 at the other end. Further, the system and method include a software phone or a phone "app" running on a user device 2202, 2204 and in communication with the SLC 2218 via the SLMU 2220. The system and the method enable soft landlines such that there is practically no difference between soft landlines terminating at user devices 1 and 2 (2202, 2204) and the regular landline phone line 2206 terminating at landline/regular phones 1 and 2 (2208, 2210). There can be as many regular phones connected to the landline phone line 2206 as can be supported by the phone line 2206. There can also be more than one soft landline for a landline phone line terminating at the user devices running the phone "app" on them. Such a soft landline along with the user device running the phone "app" is called a soft landline phone (SLP). It is also possible for the soft landline converter (SLC) 2218 to provide for a regular phone jack so that the user may connect a regular phone to it at home/office premises. Also, the ATA 2214 and the SLC 2218 may be combined into one entity with a shared processor; memory and logic to reduce costs and enhance functionality to the user. The system includes the PSTN 2212 and/or landline phone line 2206 obtained via the broadband internet 2216 and the ATA 2214, the soft landline converter (SLC) 2218, the broadband internet 2216, the soft landline management unit (SLMU) 2220, and phone "apps" running on user devices 2202 or 2204.

Figure 23:
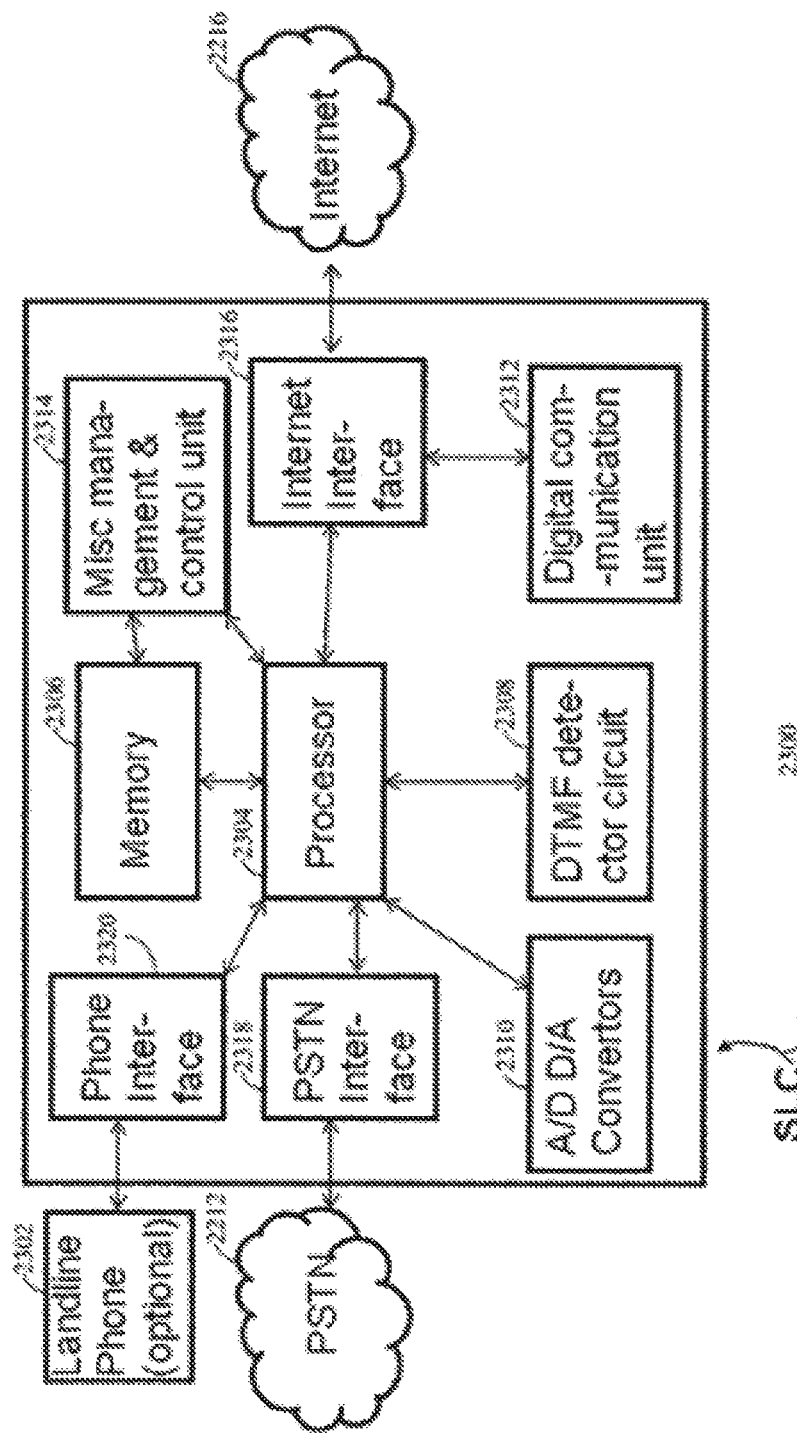
FIG. 23 depicts a block diagram for a soft landline converter (SLC) in accordance with the present embodiment.

Referring to FIG. 23, a block diagram 2300 depicts the SLC 2218 and its components. The SLC 2218 consists of a processor 2304, a memory 2306, a DTMF detector circuit 2308, an analog to digital convertor 2310 and a vice-versa for voice, digital data transmission software 2312 for data communication including the various protocol stacks, encryption/decryption, user authentication, and systems 2314 for overall management. SLC may use standard protocols such as SIP or some other proprietary protocol for the voice call communications. The SLC 2218 provides for ports to connect the landline phone line 2206, the internet 2216, and optionally a jack for connecting a regular phone 2302 to the landline phone line 2206 via the SLC 2218. The SLC 2218 has an interface for Ethernet 2316 for the internet 2216, a phone line interface 2318 for the landline phone line (the PSTN 2212), and an optional interface 2320 to connect a regular phone 2302. The SLC 2218 may alternatively be connected to the internet 2216 via wireless connectivity such as WiFi or broadband cellular. The SLC 2218 may also provide for cordless phone connectivity for the regular phones to be connected to the SLC 2218.

The SLMU 2220 enables data communication between the SLC 2218 and user devices running the phone "app". It takes care of packet IP addressing, managing communication (data as well as voice calls) between the SLC 2218 and the SLMU 2220 on one hand and between the SLC 2218 and the user devices 2202, 2204 on the other. It may also provide additional value added services to the user devices 2202, 2204. In an IPv6 environment where the SLC 2218 has a fixed public IP address, the SLMU 2220 may be eliminated as the SLC 2218 uses the fixed public IP address for direct communication with the user devices 2202, 2204. Also, the SLMU 2220 and/or, optionally, the SLC 2218 may be a part of the PBX (or IP-PBX) of an organization and provide for soft landlines along with landline phone lines. In an alternate embodiment, the SLC 2218 may also reside in the service provider (for landline phone line) infrastructure rather than at customer premises as shown in the diagram 2200. The phone "app" running on a user device enables all the functions of a phone (and optionally other value added services) using software and broadband internet connectivity. Such value added services may also be provided by the SLMU 2220 or by a suitable combination of a phone "app", the SLC 2218 and the SLMU 2220. Such phone "apps" will become clear to those skilled in the art from the description given here.

There may be three types of phones: (a) the regular landline phones 2208, 2210 connected directly to the landline phone line 2206; (b) the regular landline phones 2302 connected to the SLC 2218 at the customer premises; and (c) soft landline phones (SLPs) in communication with the SLC 2218 via the SLMU 2220 and the internet. For the first type of landline phones 2208, 2210 connected directly to the landline phone line 2206, the SLC 2218 can only monitor the call/phone line and not do much else.

The operation of the system and method for the soft landline is now described. This is done in four ways:
  (i) Incoming call to a landline phone line;
  (ii) Outgoing call from a regular phone connected to a landline phone line;
  (iii) Outgoing call from a phone "app" running on a user device; and
  (iv) Outgoing call from a regular phone connected to the SLC 2218.

A flowchart is presented for each. It will be clear to those skilled in the art that data calls are extensively utilized for exchange of messages and signaling information among the SLC 2218, the SLMU 2220, and user devices for management of voice calls. They will therefore not be mentioned explicitly each time.

Incoming Call to Landline Phone Line.

Figure 24:
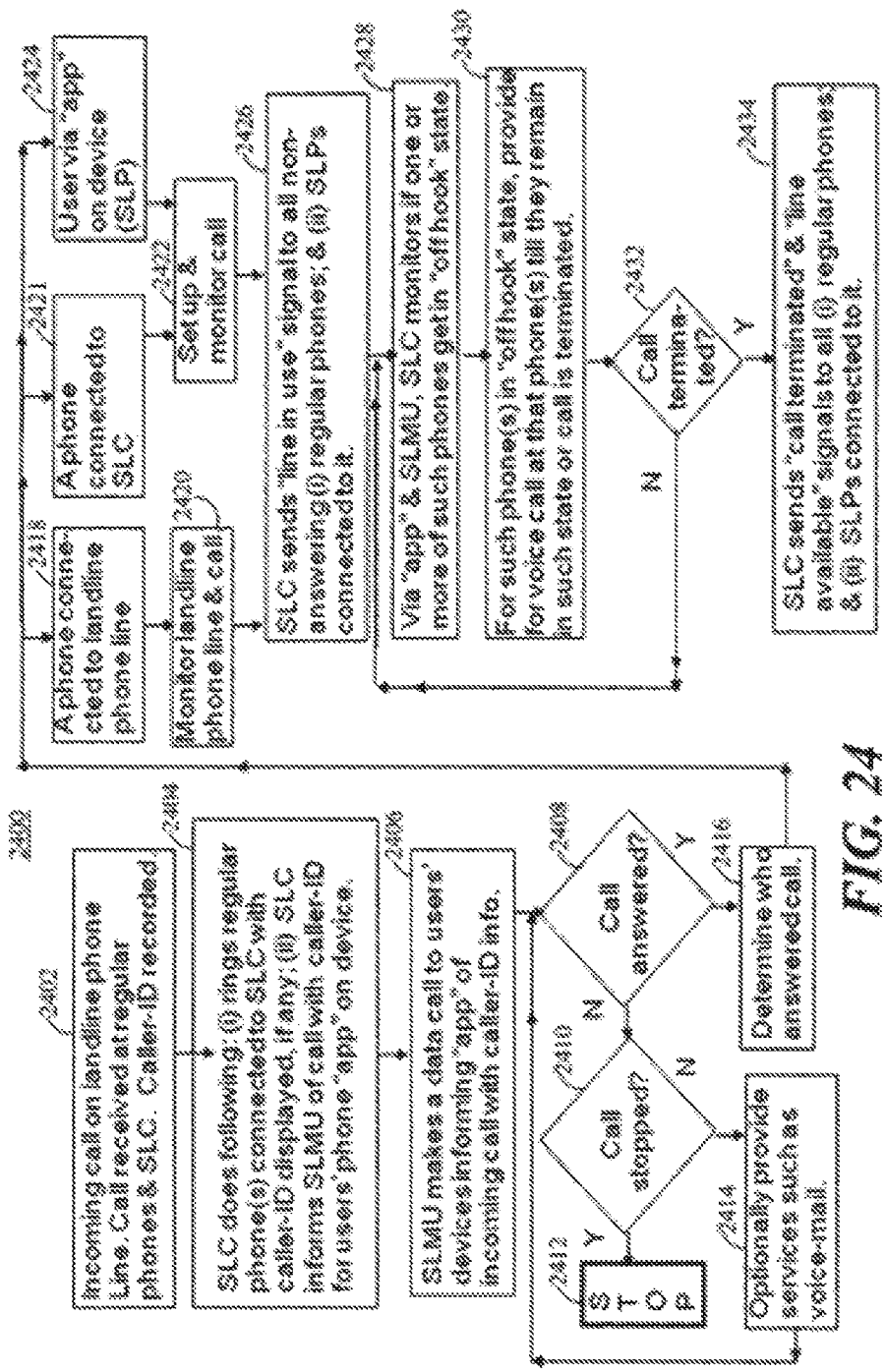
FIG. 24 depicts a flowchart for a method for an incoming call to landline phone line in accordance with an aspect of the present embodiment.

FIG. 24 shows a flowchart 2400 for the method that the SLC 2218, the SLMU 2220, and the SLP follow for an incoming call to the landline phone line. For such a call, the SLC 2218 records the caller-ID associated with the incoming call at step 2402. Then, at step 2404, the SLC 2218 rings the regular phone(s) connected to it and displays the caller-ID and also informs the SLMU 2220 of the incoming call with caller-ID information to be communicated over to one or more users' phone "app" on device (SLPs). The SLMU 2220 makes a data call (consisting of one or more data messages) over the internet at step 2406 informing the user device of the incoming call with caller-ID information. If the call is not answered (step 2408), the SLC 2218 and/or the SLMU 2220 may provide for additional value-added services such as voice-mail at step 2414. If a call stops (step 2410), then it ends the process at step 2412. If a call is answered at step 2408, then the SLC 2218 works with the SLMU 2220 to determine who answered the call at step 2416. The SLC 2218 monitors the call and the landline phone line. For a call answered by a phone connected to landline phone line (step 2418), the SLC 2218 determines this at step 2426 via its monitoring of the landline phone line as one of such phones goes "off hook". For a call answered by a phone connected to the SLC 2218 (step 2421), the SLC 2218 knows the status of such a phone at all times (step 2422). For a call answered by a user using his device (SLP) (step 2424), the "app" on device sends a signal (for instance via a data call) to the SLMU 2220 informing it that the user at that device has answered the call. The SLMU 2220 then informs the SLC 2218 of the same. For the first of these three cases (step 2418), the SLC 2218 monitors the landline phone line and the call at step 2420. For the second case (step 2421), the SLC 2218 sets up and monitors the call at step 2422. For the third case (step 2424), the SLC 2218 along with the SLMU 2220 sets up the call and monitor the same at step 2422. Further, at step 2426 the SLC 2218 sends "line in use" signal to all non-answering (i) regular phones; and (ii) SLPs connected to it.

The SLC 2218 monitors the call and landline phone line till the call is terminated (step 2432) and the landline phone line returns back to its "available" state. The phone "app" detects call termination at a user terminal and informs the SLC 2218 (via the SLMU 2220) of the same. The SLC 2218 detects call termination for the regular phones connected to the landline phone line via its monitoring of landline phone line. The SLC 2218 detects call termination for the regular phones connected to the SLC 2218 via its monitoring of these phones. For a call terminated by one of the regular phones or SLPs connected to the SLC 2218, the SLC 2218 disconnects or releases the landline phone line.

For an ongoing call, the SLC 2218 (via "app", the SLMU 2220, and data calls) also monitors if one or more of regular phones connected to the SLC 2218 or SLPs get in "off hook" state at step 2426. For such phones in "off hook" state, the SLC 2218 provides for voice call at that phone(s) at step 2430 till they remain in this state or till the call is terminated at step 2432. Once the call is terminated by all phones connected to the landline phone line, as determined by the SLC 2218 by monitoring of landline phone line and call, the SLC 2218 at step 2434 sends "call terminated" and "line available" signals to all (i) regular phones; and (ii) SLPs connected to it.

Outgoing Call from a Regular Phone Connected to Landline Phone Line.

Figure 25:
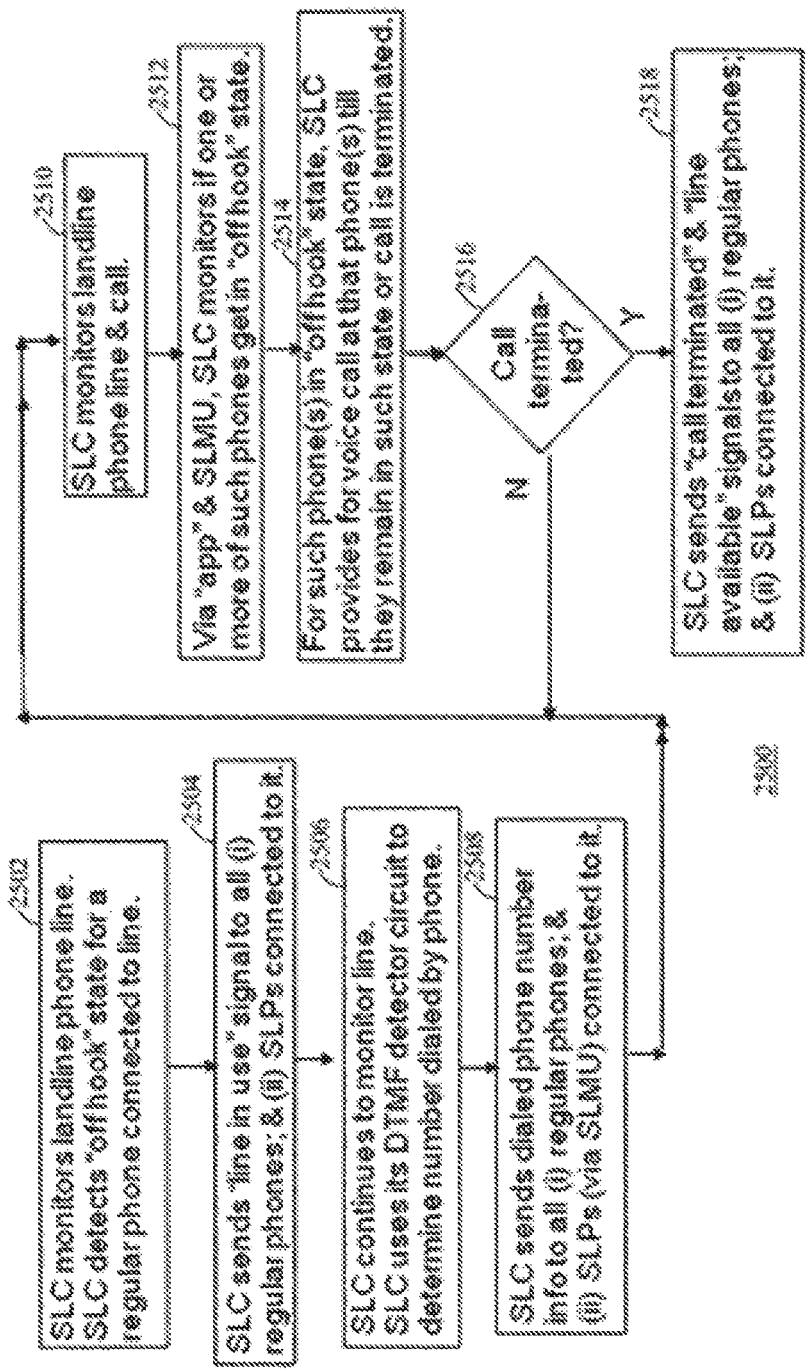
FIG. 25 depicts a flowchart for a method for an outgoing call from a regular phone connected to a landline phone line in accordance with the present embodiment.

FIG. 25 depicts a flowchart 2500 for the method that the SLC 2218, the SLMU 2220, and SLP follow for an outgoing call from a regular phone connected to a landline phone line. At step 2502, the SLC 2218 monitors the landline phone line and detects "off hook" state for a regular phone connected to the landline phone line. At step 2504, the SLC 2218 sends "line in use" signal to all (i) regular phones; and (ii) SLPs connected to the SLC 2218. As the number is dialed on one of these regular phones, the SLC 2218 uses the DTMF detector circuit at step 2506 to determine the number dialed by the phone. At step 2508, the SLC 2218 then sends this information to all regular phones and SLPs connected to it.

At step 2510, the SLC 2218 monitors the landline phone line and the call. As the SLC 2218 detects, at step 2516, call termination via its line monitoring, the SLC 2218 sends "call terminated" and "line available" signal to all (i) regular phones; and (ii) SLPs connected to it at step 2518. For an ongoing call, the SLC 2218 (via "app" and the SLMU 2220) also monitors at step 2512 if one or more of regular phones connected to the SLC 2218 or SLPs get in "off hook" state. For such phones in "off hook" state, the SLC 2218 provides for voice call at that phone(s) at step 2514 until they remain in this state or till the call is terminated.

Outgoing Call from a Phone "App" Running on User Device.

Figure 26:
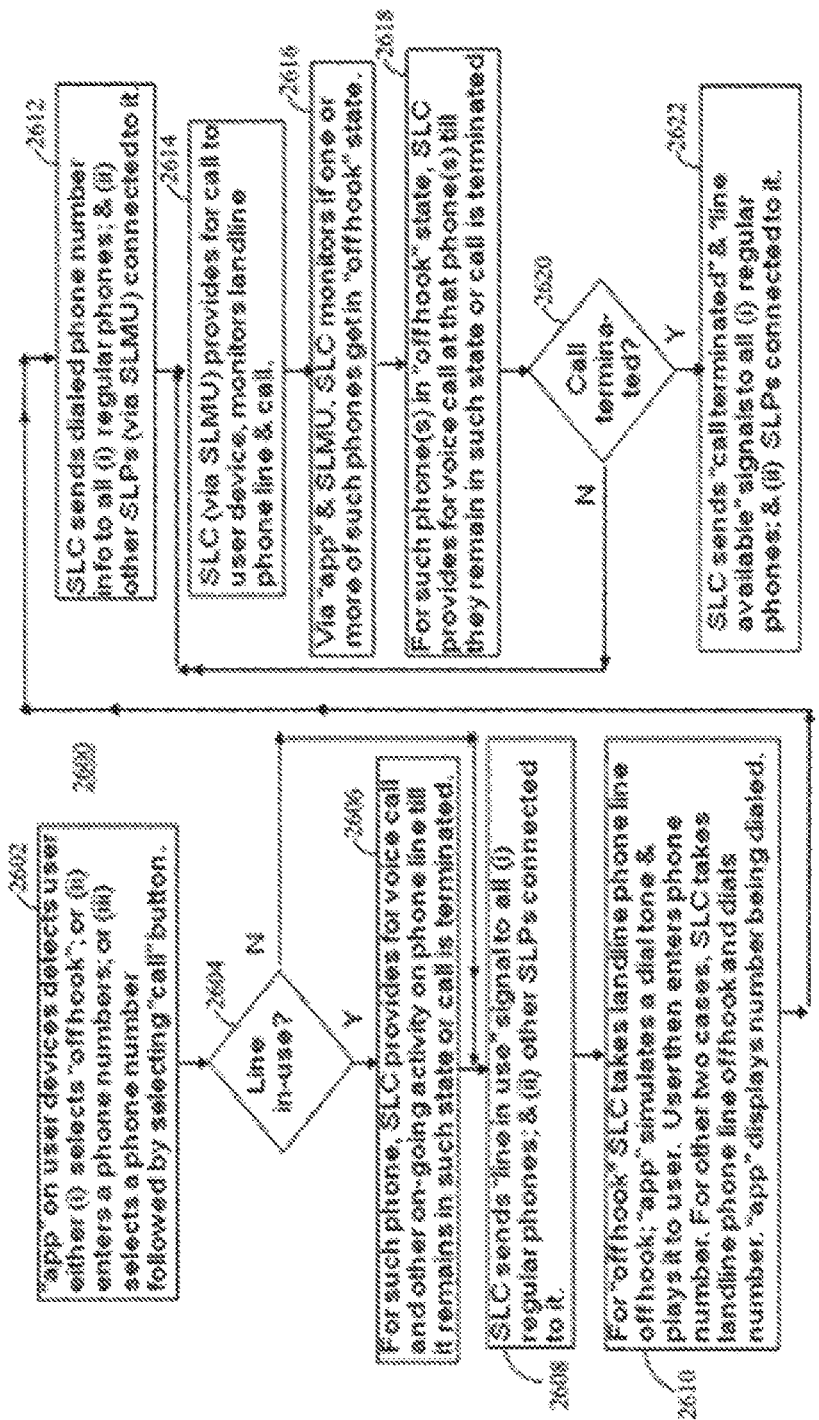
FIG. 26 depicts a flowchart for a method for an outgoing call from a phone "app" on a user device in accordance with the present embodiment.

Referring to FIG. 26, a flowchart 2600 for the method that the SLC 2218, the SLMU 2220, and the SLP follow for an outgoing call from a phone "app" running on user device. It starts at step 2602 with the phone "app" on the device detecting the user doing one of (i) selects "off hook", or (ii) enters a number, or (iii) selects a phone number, with (ii) and (iii) followed by selecting "call" button. The "app" checks/verifies (via SLMU & the SLC 2218) if landline phone line is in use or not at step 2604. If it is in use, then at step 2606 the SLC provides ongoing activity on the phone line (the voice call and other activity) to the user till the phone line remains in such state (step 2604) or the call is terminated (step 2620). If the landline phone line is not in use at step 2604, then the SLC 2218 sends the "line in use" signal at step 2608 to all (i) regular phones and (ii) other SLPs connected to the SLC 2218. For a device in an "off hook" state, at step 2610 the SLC 2218 takes the landline phone line off hook; the "app" simulates a dial tone and plays it to the user (or conveys the dial tone from the landline phone line). The user then enters the phone number. For the other two cases, the SLC 2218 takes the landline phone line off hook and dials the phone number. The "app" displays the number being dialed. Then, at step 2612, the SLC 2218 sends the dialed phone number information to all (i) regular phones; and (ii) other SLPs (via SLMU) connected to it.

At step 2614, the SLC 2218 (via the SLMU 2220) provides the call to a user device and monitors the landline phone line and the call. As the SLC 2218 detects call termination via the SLMU 2220 at step 2620, the SLC 2218 sends "call terminated" and "line available" signals at step 2622 to all (i) regular phones; and (ii) SLPs connected to it. For an ongoing call, at step 2616, the SLC 2218 (via the "app" and the SLMU 2220) also monitors if one or more of regular phones connected to the SLC 2218 or SLPs get in "off hook" state. For such phones in "off hook" state, the SLC 2218 at step 2618 provides for voice call at the phone(s) until they remain in this state or till the call is terminated.

Outgoing Call from a Regular Phone Connected to SLC.

Figure 27:
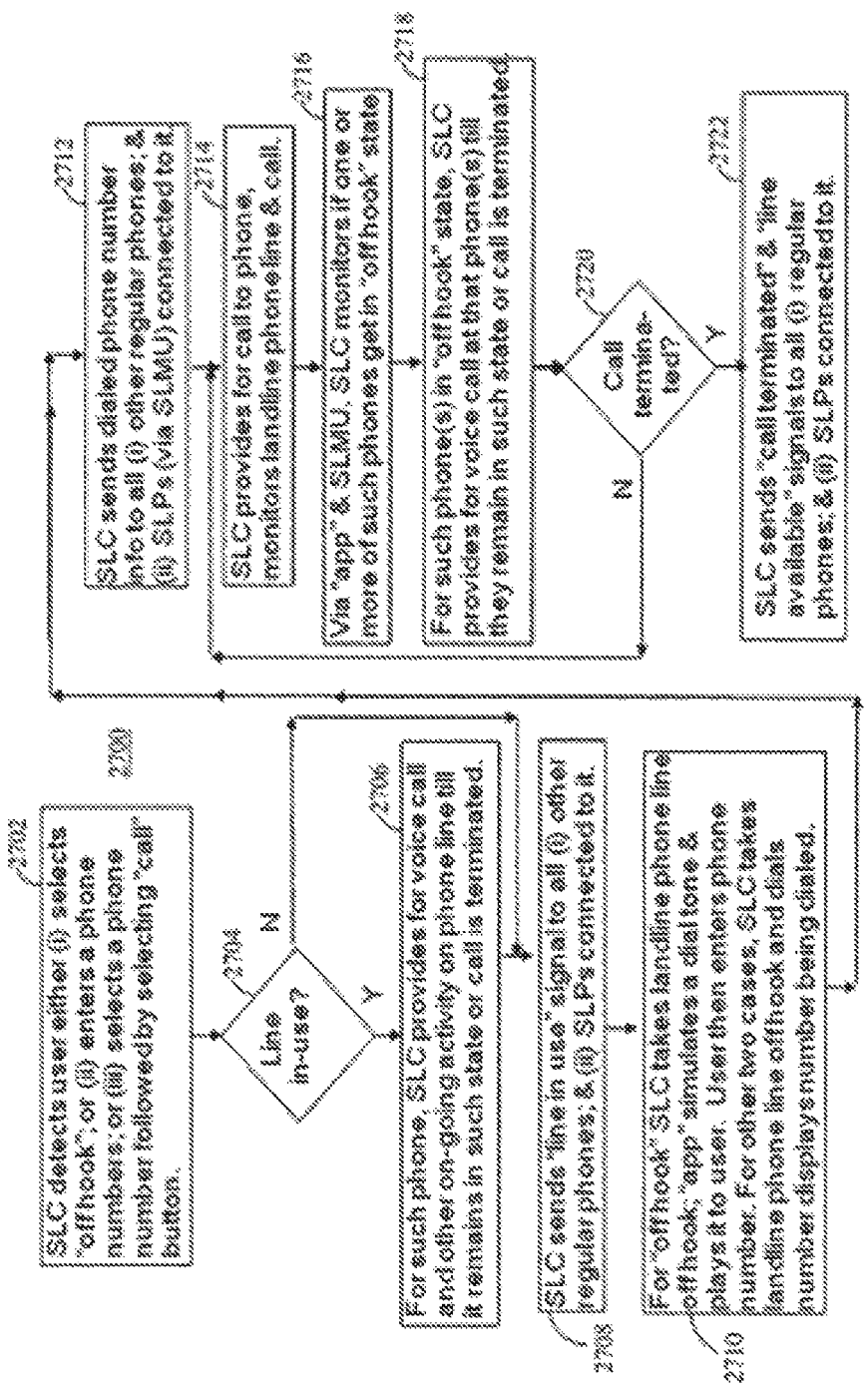
FIG. 27 depicts a flowchart for a method for an outgoing call from a regular phone connected to a SLC in accordance with the present embodiment.

FIG. 27 shows a flowchart 2700 for the method that the SLC 2218, the SLMU 2220, and the SLP follow for an outgoing call from a regular phone connected to the SLC 2218. It starts at step 2702 with the SLC 2218 detecting the user doing one of (i) picks up the phone to enter a state of "off hook"; or (ii) enters a number; or (iii) selects a phone number, with (ii) and (iii) followed by selecting "call" button. The SLC 2218 checks at step 2704 to see if the landline phone line is in use or not. If it is, then at step 2706 the SLC 2218 provides ongoing activity on phone line (voice call & other activity) to the user till phone line remains in such state or call is terminated. If it is not, then at step 2708 the SLC 2218 sends the "line in use" signal to all (i) other regular phones and (ii) SLPs connected to the SLC 2218. For the phone in the "off hook" state, at step 2710 the SLC 2218 takes the landline phone line off hook, simulates a dial tone and plays it to the user (or conveys the dial tone from the landline phone line). The user then enters the phone number. For the other two cases, the SLC 2218 takes the landline phone line off hook and dials the phone number. The SLC 2218 displays the number being dialed on the phone being used. At step 2712, the SLC 2218 sends the dialed phone number information to all (i) other regular phones; and (ii) SLPs (via the SLMU 2220) connected to it.

At step 2714, the SLC 2218 provides the call to the phone and monitors the landline phone line and the call. As the SLC 2218 detects call termination at step 2720, the SLC 2218 sends "call terminated" and "line available" signals at step 2722 to all (i) regular phones; and (ii) SLPs connected to it. For an ongoing call, the SLC 2218 (via "app" and SLMU) also monitors at step 2716 if one or more of the regular phones connected to the SLC 2218 or the SLPs get in an "off hook" state. For such phones in the "off hook" state, at step 2718 the SLC 2218 provides for the voice call at that phone(s) while they remain in this state or until the call is terminated.

For the system configuration shown in the diagram 2200 (FIG. 22), there can also be alternate embodiments. In place of the SLMU 2220 using the broadband internet to make VoIP calls to the user device, it may make regular phone calls to user devices as per system settings and the availability of broadband internet.

Figure 28:
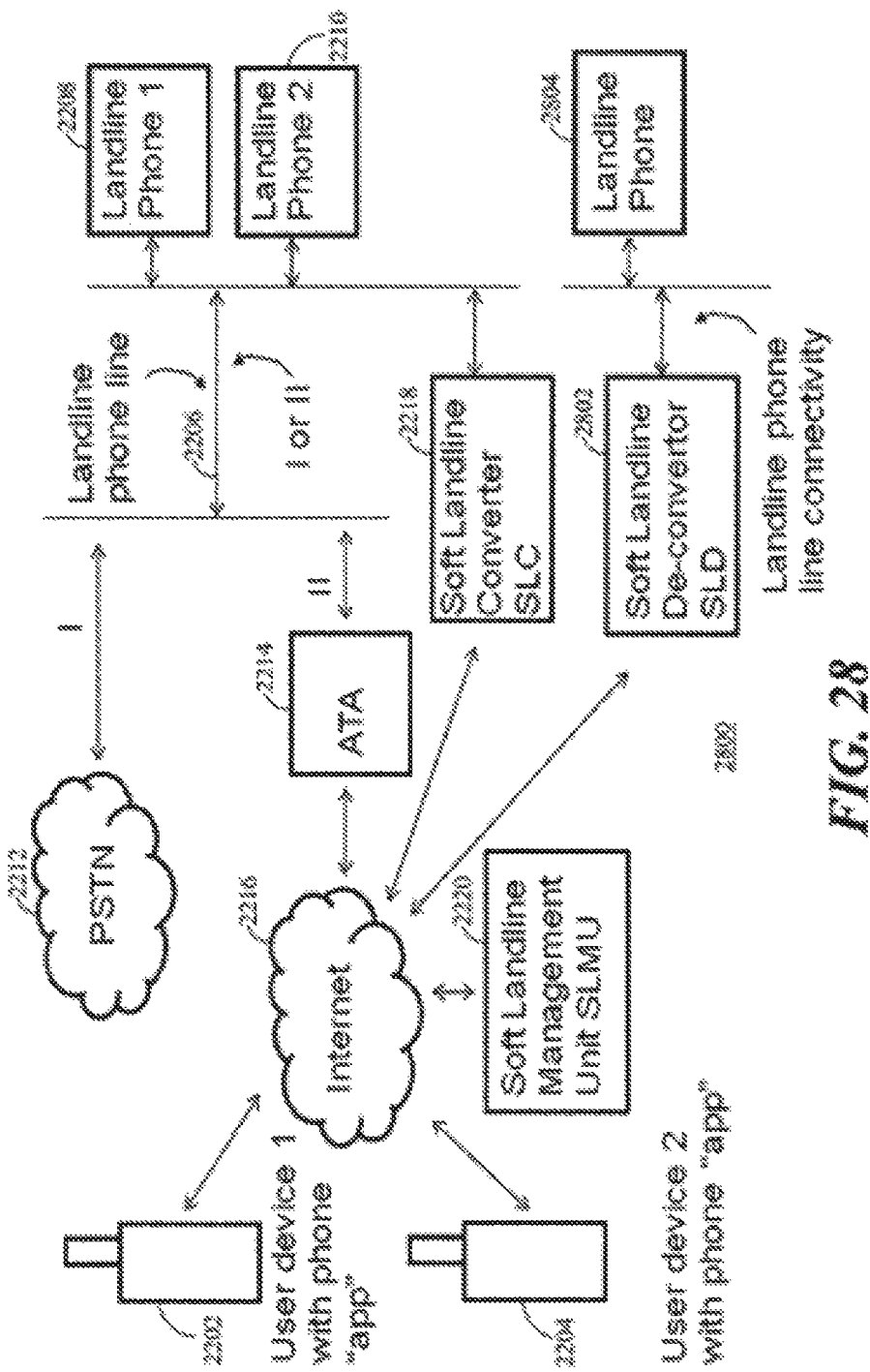
FIG. 28 depicts a system configuration for using a regular phone at a receiving end for a soft landline in accordance with the present embodiment.

Also, thus far various embodiments have been described with a phone "app" running on a user device. In other instances, the user may wish to use a regular phone to receive the call at their end. A system configuration 2800 for such an embodiment is shown in FIG. 28. A soft landline de-convertor (SLD) 2802 is used to communicate with the SLMU 2220. A regular phone 2804 can be connected to the SLD 2802 which provides for landline phone line connectivity. The SLD 2802 coupled with the regular phone 2804 provides the functionality of a phone "app" running on a user device. The overall system realization of the SLD 2802 will be clear to those skilled in the art given the description of the SLC 2218 provided herein. The SLD 2802 provides for conversion of a voice call from the broadband internet 2216 to a regular voice call in a manner that is the reverse of the SLC 2218. The SLC 2218 and the SLD 2802 may work as a pair with the SLMU 2220 in the middle to provide for voice calling as well as other value-added services.

The systems and methods described herein can also be used to provide for other value-added services. The SLC 2218 and the SLMU 2220 can be used to provide for voice call logs on user devices and/or via on-line accounts. They can also be used for voice call recording, DTMF detection and transmission, voice mail including its transcription, conference call, call waiting, call forward, and selective call processing based on caller-ID and other rules. For instance, the user may set his device rules such that his device is informed of only certain selected incoming calls by the SLC 2218 and/or the SLMU 2220 based on caller-ID of caller and other calling rules. In another instance, the user may set his device rules such that his device is informed of only certain selected outgoing calls by the SLC 2218 and/or the SLMU 2220 based on a caller-ID of callee, a user device making the call, and other calling rules. Voice mail transcriptions may be done by the SLC 2218 and/or the SLMU 2220 emailed to a user or sent to a user device in a data call or provided via an on-line account. The SLMU 2220 may also be hosted/provided by the landline phone line service provider. The SLMU 2220 may also provide for voice call change-over from one user device to another user device. Also, the SLMU 2220 may provide for data calls among "apps" of different user devices so that a user on one device may invite the user on another user device to join a call (during call initiation or during an ongoing call).

The systems and methods described here can be extended to the case of more than one SLC per landline phone line. Also, the SLC 2218 may provide for soft landlines to two or more landline phone lines with a user device having a phone "app" for one or more of these soft landlines as per user preferences and overall system and access settings.

Figure 29:
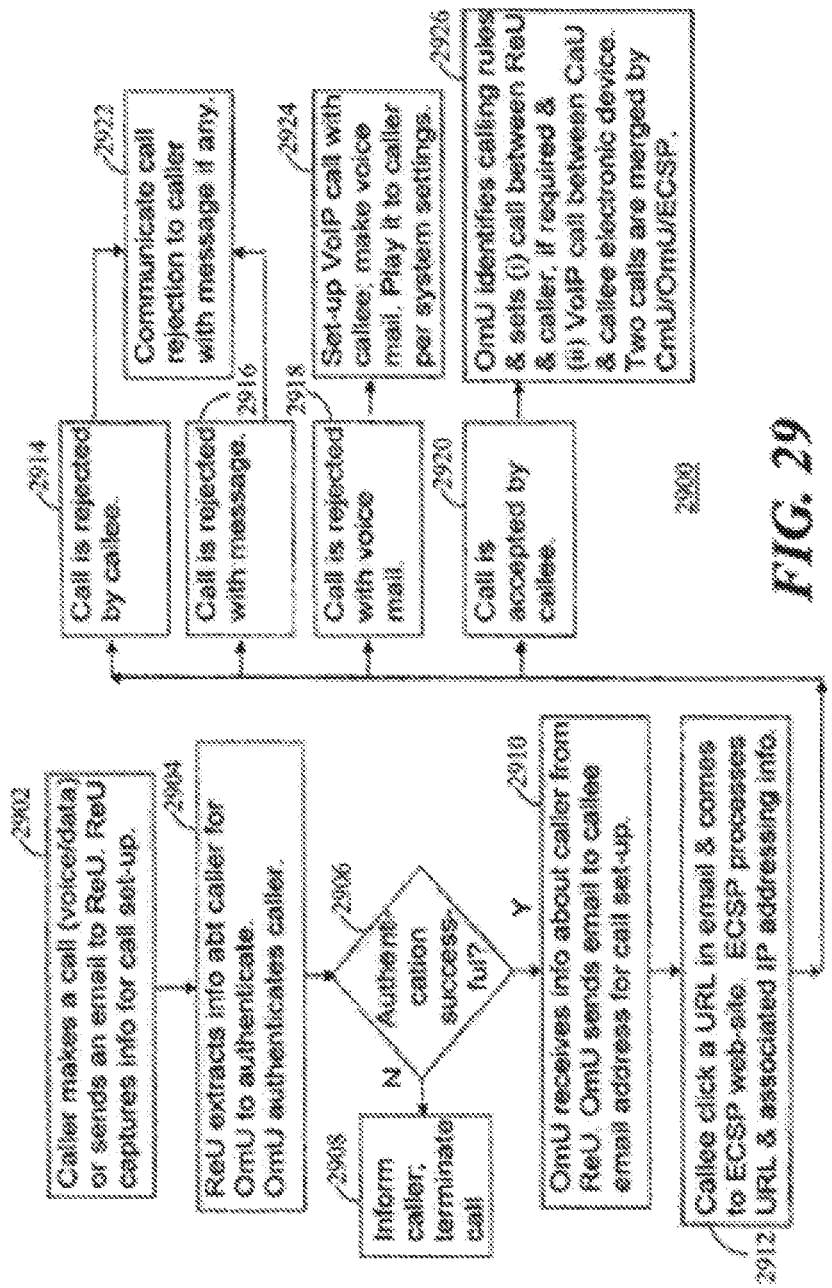
FIG. 29 depicts a flowchart for a call set-up procedure when knowing a callee's email address in accordance with the present embodiment.

FIG. 29 shows a flowchart 2900 for a call set-up procedure for a caller knowing a callee's email address. In this case, the caller knows one or more email addresses for a callee and wishes to have a voice conversation with the callee via them. The steps for such a voice call are as follows:

Step 1. Call Initiation by Caller.

At step 2902, the caller makes a voice or a data call to the ReU 116 (FIG. 1) that captures all the parameters and information associated with the call.

Voice Call.

For a voice call made by the caller, the ReU 116 may capture a phone number of the caller's calling electronic device (mobile or landline phone), the phone number of the ReU 116 called by the caller, and email address(es) of the callee. The caller may be identified by the caller ID information. Further, account numbers, passwords and PINs may also be required and used for added security features. The email address(es) may be captured by the ReU 116 via voice recognition as the caller speaks the electronic address(es). The ReU 116 (working in collaboration with the OlaU 112 and the OmU 114) may also interact with the caller to secure more information via IVR and DTMF. For instance, the ReU 116 may use the on-line account of the caller with the OlaU 112 to play the names and/or email address(es) registered by the caller via IVR and have the caller make a selection of the callee's email address(es) using DTMF. One or more numeric digits entered by the caller via DTMF may also be used by the ReU 116 to determine the callee's email address(es) associated with those digits.

The ReU 116 may also be set up such that it can be called at multiple phone numbers by a caller. For any caller, different phone numbers of the ReU 116 are registered corresponding to email address(es) of different callees in the caller on-line account with the OlaU 112. In such a case, the ReU 116 (working in collaboration with the OlaU 112 & the OmU 114) uses a unique combination of the caller's identification via an on-line account, or a caller ID (the phone number the caller calls the ReU 116 from) and the ReU phone number called by the caller to determine email address(es) of the callee.

For the voice call, the ECSP 102 may also offer a call-back mode of operation whereby the caller may hang up after the ECSP 102 has determined the callee's electronic address(es) and the ECSP 102 calls the caller back once the callee is available. Also, the caller may express his intentions to make a call by calling one of the several numbers of the ReU 116. In such a case, it is possible that the ReU 116 does not answer the caller's call till the callee becomes available. Again, a call-back mode may be used.

Data Call.

In case of a data call by the caller's device to the ReU 116, the caller's device (e.g., via the ECSP website, an app, IM, or SMS) provides the authentication information to the ReU 116 along with the email address(es) of the callee. Such email address(es) may be provided in the data call or selected via the data call from such information stored in the caller's on-line account with the OlaU 112. It could even be a combination of the two.

A series of voice or data calls may also be used, though in one embodiment it is a single voice or a data call. At the end of the step 2902, the ECSP 102 has authenticated the caller and determined the email address(es) of the callee that the caller wants to talk to. It has also determined the caller's preferences and settings for the call.

Step 2. ECSP Processing.

The ECSP (the OlaU 112, the OmU 114 and the CaU 118) now creates one or more URL links for the callee to select/click depending on the caller's system settings and preferences for the call to the callee. These links can be partially or fully encrypted so that they cannot be tampered with. In one embodiment, the caller information may be embedded in the URL for the callee to see. The URL may also contain a call identifier, one or more identifications for one or both of the caller and the callee. Such identification can be one or more of names, electronic addresses such as phone number(s), or email address(es). These can be specified by the caller for the call via one or more of a voice/data call and/or an on-line account, and placed by the ECSP 102, preferably, in the encrypted part of URL. Depending on the possible actions by the callee permitted by the system, one or more URLs are created. Let us say that these URLs are labeled as URL1, URL2, URL3, URL4. The callee may be prompted to click one of the URLs, say URL1, to answer the call, URL2 to reject the call, URL3 to reject the call with a message back to the caller, or URL4 to forward the call to another electronic address, which can be provided by the callee as a part of URL4 before clicking it or entering it after clicking URL4. There may be more or fewer such URLs created per the caller's settings and preferences. The ECSP 102 may also create a URLcallme such that the callee may click URLcallme to call the caller any other time. Such a URL link plays the same role as the phone number in the traditional sense of telephony. The URLcallme may also be customized for each callee and include callee email address(es) and/or other identifications of the callee. It may also be partially or fully encrypted. It may also contain other information and parameters (possibly call related), such as time when the call is meant to take place. The URLs may be customized via hyperlinks (text, images, graphics, multimedia, or QR code). Further, the URLs may be further coded via short codes for URL (tiny url or other such equivalent means) before being sent in email(s) to the callee.

The ECSP 102 also determines one or more email address(es) the email to the callee's email address(es) are to be sent from. This could be unique to the caller or to the caller-callee pair or to the caller-callee-call triplet. It may depend on other parameters as per system settings. In addition, the URLs (URL1-URL4, URLcallme, in this example) can be tagged for tracking and other analytics. Thus, the ECSP 102 determines the following for emails to be sent out to the callee's email addresses:

1. Number of emails for the call
2. For each email, determine email parameters such as
   Email address for the "to" field
   Email address for the "from" field
   Content of the "Subject" field
   Content of the email including the URLs, hyperlinks, short codes, labeling, caller identification/names, message
   and compose these emails.
3. Send each of the emails to the callee's email address(es) (e.g., step 2910).

The ECSP 102 may customize each email (e.g., various email addresses, subject, content) including content and structure of the URLs to the caller settings and preferences, the caller/callee pair, and various callee's email addresses. This may be done to enable identification of the caller. For instance, one type of URL may be posted on a Facebook wall, while a hyperlink coded URL in an email may be sent to a gmail address of the callee. The structure, content and composition of the URLs may also be customized as per the different email addresses of the callee. Once again, customized URLs may be created that include the email address of the callee the URL may be sent to.

Customization may also be done to assist the callee to recognize and optionally authenticate the caller from the emails it receives for call initiation. For instance, the email address in the "from" field of such emails may optionally be used by the callee to recognize and authenticate the caller as described elsewhere in these embodiments. For more than one email, the ECSP 102 may also decide a set of "Email Rules" for the sequence of emails to be sent out. It could be a blast (all emails sent out in one go) or a process whereby one email is sent, the callee response is awaited for a duration of time, and if no response is received, the next email is sent and so on. There are numerous other Email Rules that can be built that will be clear to the callers and the service providers. The URLs and the emails may also have a time-out feature for the call. If after sending an email, a callee does not click the URL within a certain time period (per system and caller settings), the email and the URLs contained in it are deactivated. In such a case, the ECSP 102 may send another email informing the callee of the same and also inform the caller of call termination via time-out. The same could be done if the caller terminates the call by hanging up (voice call) or informing the ECSP 102 of call termination via a data call before time-out is activated.

Step 3. Call Processing.

The CaU 118 (working with the OlaU 112 and the OmU 114) monitors to see if the callee has clicked any of the URLs in the email(s) that was (were) sent to him. A time-out feature can be built in for this purpose. If the callee does not click any URL, the call initiated by the caller is terminated by the ECSP 102 and the caller is informed accordingly. As per system settings and caller preferences, the ECSP 102 may arrange for a voice message to be recorded by the caller and sent to the callee via email.

If the callee clicks a URL, the callee's electronic device comes to the website of the ECSP, say www.ECSP.com. The ECSP 102 at step 2904 processes the URL (including decrypting the encrypted part of the URL) along with the on-line information (once it determines the caller from the URL) to determine, URL authentication if required when encryption is used
   Call identification
   Caller identification
   Callee identification (optionally the ECSP 102 may also require "Callee Authentication" of the callee)
   Callee's desired action (wants to talk, call rejected, call rejected with message) (e.g., steps 2920 or steps 2914 and 2916 via step 2922)
   Other settings for the call as determined by the ECSP via the URL clicked or the caller on-line account or a combination of both.

Depending on the system settings and the caller preferences, the ECSP may also require further "Callee Authentication". This is done by sending an authentication email containing one or more URLs coded with callee authentication information for the call, PIN, password, codeword to the callee's designated email address(es) for the purpose. The callee may click the URL and/or enter the PIN/password/codeword at the ECSP web-page that the callee is presented for the purpose. Instead of sending a separate authentication email, authentication information may be included in the original email sent to a callee for call set-up. Further, the callee may also reply back to an authentication email authenticating their email addresses.

The ECSP may also provide for means for call/caller authentication for the call. This can be done by sending the original and/or authentication emails to the callee's email addresses from an email address specific to the caller and/or the call. For instance, one such email address is CallerIdentifier_CallIdentifier@ECSP.com. Another is caller's email address caller@mydomain.com. One or more email addresses may also be included in the 'cc' field of the email. Thus, the callee may press the "reply" or "reply all" button. The callee may optionally also include some other information for authentication in a prescribed format. Once such an email is received, the ECSP verifies the callee and call identifications from the email addresses of the original call request and the email addresses in the callee email. The ECSP then sends an email reply back to the callee, thus authenticating the genuine nature of the call and caller. A similar system of authentication can also be designed when the original emails are sent from a common email address of the ECSP. In this case, authentication information may be included in the body/subject of the emails.

Once the callee, caller and the call are identified and authenticated along with the action to be taken as per the URL clicked at step 2904, the ECSP 102 may terminate the call with or without message (steps 2914 and 2916) if the callee has chosen the URL for call termination with or without message, respectively. The caller is then informed of the message by the callee (step 2922). The caller may additionally be presented at step 2918 a choice to make a voice recording that is then sent to the callee at step 2924 via an email to the callee at his email address(es). The ECSP may also email a URL that the callee can click to retrieve the voice message from the ECSP on-line voice message server.

If the callee has chosen to answer the call at step 2920 by clicking the appropriate URL, then the ECSP establishes a VoIP call between the CaU 118 and the callee's electronic device in accordance with step 2926. The ECSP 102 further connects/bridges this VoIP call to the call from caller to the ReU 116. The ECSP 102 may also have to establish a call between caller and the ReU 116 (before connecting the two calls). This may happen for instance if the caller has opted for a call-back mode. Such a call between the ReU 116 and the caller may be a regular voice call or a VoIP call. Once either party terminates the call, the ECSP also terminates the other call. Certain other management functions (such as billing or time/duration of the call) are also carried out for the call. Although the call is described in terms of a voice call, it could be a multimedia/video call and also the caller and the callee may be provided means to text, exchange other information, documents, or files during the call. Different URLs for the type of call (e.g., only voice, video) could be sent to the callee in the emails that are sent to the callee.

It is also possible that one or more emails sent to the callee email address(es) contain only one URL which can have functions such as "answer the call". Alternatively, a single URL sent to a callee in an email may be such that it takes the callee to the ECSP website where the callee can choose from multiple options such as "answer the call", "reject the call", "reject with message" and so on. The callee may even provide a phone number for the ECSP to call for the voice call to take place.

Thus far, a system and method for using the ECSP 102 to call a callee at his email address has been described. It will be clear to those from the first three aspects described earlier in these embodiments that this system and method can be extended to a mix of electronic addresses (e.g., phone numbers, VoIP ID, email addresses). Once again, "calling rules" are required for the ECSP 102 to identify the callee electronic address(es) to contact when the caller initiates a call and also for contacting such multiple electronic addresses. For instance, the ECSP 102 can be designed to follow the following rules include time related information to apply when the caller using a mobile phone number XX initiates a voice call to a callee at a phone number YY:

RULE 1. If the time is between 01:00 and 05:00, call YY first and if no response is received in ten seconds, terminate the call and then call the callee (using the method described here) at the callee's email address.

RULE 2. If time is between 05:00 and 12:00, call YY and the callee's email address simultaneously. If the callee answers one of these, establish the voice call on the one answered and terminate the other.

RULE 3. If time is between 12:00 and 23:00, call the callee's email address first and if there is no response in ten seconds, terminate the email call and then call YY next.

RULE 4. If time is between 23:00 and 01:00, call the callee's email address only.

Another set of rules can be

RULE 1. Contact the callee at his email address first followed by calling the callee's phone number, when a call to the callee's phone number would include toll charges (such as a long distance or an overseas call).

RULE 2. Contact the callee at his email address alone if the time is between 22:00 and 08:00.

The ECSP 102 as described here can also be integrated with PBX (IPPBX included) based calling. Such integration may require co-location of the PBX and the ECSP or the PBX and the ECSP may be located independently and communicate via networks such as the internet and/or an intranet using well-known protocols. For PBX calls, the calls internal to the PBX are dialed via a shorter dialing sequence (or may require a prefix), while outgoing calls external to the PBX are dialed via regular telephone numbers. As a caller dials a number to make a call to a callee (either external or internal to the PBX), the ECSP, now integrated with the PBX, is communicated the caller and callee identification information (e.g., their phone numbers). The ECSP automatically checks to see if the caller has registered one or more email addresses for email calling with its account with the ECSP for the particular callee. If so, then the ECSP establishes parameters for calling one or more email addresses of the callee for establishing the voice call. Customization may also be done to assist the callee to recognize and optionally authenticate the caller from the emails it receives for call initiation. For instance, the email address in the "from" field of such emails may optionally be used by the callee to recognize and authenticate the caller as described elsewhere in these embodiments.

Thus, the ECSP provides the additional service of email-based calling, as per the caller and ECSP/PBX system preferences and settings, for a PBX call from the caller to the callee, in addition to the usual service of dialing the callee number for a voice call. In this case, the call from the caller to the PBX would need to be extended to the ReU 116 (FIG. 1) that may require using VoIP techniques. The caller may also have registered his email address with the ECSP 102 for a call to be made to him when he initiates a call to a callee as described above. In this case, the two calls are merged by the ECSP 102 for a voice call from the caller to the callee.

The ECSP as described here can also be integrated with the infrastructure of regular phone operators that provide landline and/or mobile based calling. Such integration may require co-location or the operator infrastructure and the ECSP may be located independently and communicate via networks such as the internet and/or the intranet using well-known protocols. In this case, for a regular call dialed via a regular telephone number by the caller, the ECSP, now integrated with the phone operator infrastructure, is provided the caller and the callee identification information (e.g., their phone numbers). The ECSP automatically checks to see if the caller has registered one or more email addresses for email calling with its account with the ECSP for the particular callee. If so, then the ECSP establishes parameters for calling the one or more email addresses of the callee and establishes the voice call accordingly. Customization may also be done to assist the callee to recognize and optionally authenticate the caller from the emails it receives for call initiation. For instance the email address in the "from" field of such emails may optionally be used by the callee to recognize and authenticate the caller as described elsewhere in these embodiments.

Thus, the ECSP provides the additional service of email-based calling, as per caller and phone operator/ECSP system preferences and settings for a regular call from the caller to the callee, in addition to the usual service of dialing the callee number for a voice call. In this case, the call from caller to its operator infrastructure would need to be extended to the ReU 116 perhaps requiring using VoIP techniques.

Call Initiation by Email.

The call initiation by a caller thus far was via either a voice call or a data call. The ECSP may also provide for caller to trigger a voice call via an email (and other means such as IM or SMS). In such an embodiment, an email composed by the caller in the right format for call initiation/trigger is sent to the ECSP. The ECSP may authenticate the caller by sending a verification email back to the caller at the same or a different email address registered by the caller with the ECSP in his on-line account (if any) for the purpose. The on-line account of the caller can be identified by the ECSP via a password/codeword/PIN or via an email address of the sender/caller or via processing the email using other means established in advance. Such an email contains the URL and/or PIN or codeword/password which the caller would need to provide back to the ECSP to verify that he indeed is the rightful owner of the email account that sent the call request. Once the call request email from caller to the ECSP is authenticated, the ECSP processes content of the email and the caller's on-line account (if any) to establish call parameters (e.g., one or more caller/callee electronic addresses, calling rules). As per calling rules, the ECSP then establishes two calls, one from the ReU 116 to the caller electronic address and second call from the CaU 118 to the callee electronic address. In this case, if the caller electronic address is an email address, the ReU/ECSP sends an email back to the caller with the appropriate URLs for the caller to click to establish the call with the ReU 116. The same goes for the callee electronic address being an email address. Subsequently these two calls, a first one between the ReU 116 and the caller and a second one between the CaU 118 and the callee, are merged for a voice call between the caller and the callee to take place. The ECSP may also provide for the caller to trigger a voice call via clicking a URL appropriately structured with information required to establish the voice call to an email address of a callee. This may be preceded with the caller authentication as the URL is clicked followed by establishment of the call.

In the following, several instances of the structure of the email that the caller sends to the ECSP to initiate a call are presented.

Instance 1. Include callee electronic address(es) in the subject field or body of the email.

Instance 2. Include callee name(s) in the subject field and use the on-line account to extract the corresponding electronic addresses.

Instance 3. Include callee electronic address in the email ID of the email sent to the ECSP, say at www.ECSP.com. A callee electronic address abc@xyz.com can be indicated by the caller to the ECSP by sending an email to abc_xyz.com@ECSP.com. The ECSP can then extract the callee electronic address at its server. Similarly, a callee phone number can be communicated via an email sent to caller_phone_number@ECSP.com.

A user who subscribes to the ECSP may also provide for others to be able to call him. Thus, a third-party that wants to call the user contacts the ECSP via a voice call, data call, or via email, and authenticates himself to the ECSP. Such an authentication requires the third-party to be authenticated for its identity and then cross-referenced against the information in the on-line account of the identified user. Once authenticated, the ECSP then proceeds to establish the call between the third-party and the user as per associated calling rules. The user of the ECSP may also authorize the third-party to make calls to "other parties". These "other parties" are identified once the ECSP identifies/authenticates the user and the third party. For each of the third-parties that the user has authorized in his on-line account, a list may be provided containing certain electronic addresses that the third party is allowed to use, or certain electronic addresses that the third party is not allowed to use. Alternatively, it could be based on other rules and parameters such as toll cost or time. An instance of a typical email for a third party to initiate a call to 'other party' via email is as follows:

Instance 1. Include other party electronic address in the subject field and the user electronic address in the cc field. The third party is identified by the email address the third party uses to send the email from. The third party is also authenticated via this email address.

In addition to email based call set-up for a third party to make calls, voice/data call based call set-up may also be provided as described earlier.

The ECSP as described here can also be integrated with the PBX (IPPBX included) based calling for incoming calls to a callee. Such integration may require co-location of the PBX and the ECSP or the PBX and the ECSP may be located independently and communicate via networks such as internet and/or intranet using well-known protocols. In the case of the PBX, the incoming calls originating internal to the PBX are dialed via a shorter dialing sequences (and may require a prefix) while incoming calls originating external to the PBX are dialed by the caller via regular telephone numbers. For an incoming call to the PBX (whether it originates internally or externally to the PBX), the ECSP, now integrated with the PBX, is communicated caller and callee identification (e.g., their phone numbers). The ECSP automatically checks to see if the callee has registered one or more email addresses for email calling with its account with the ECSP for the particular caller. If so, then the ECSP establishes parameters for calling one or more email addresses of the callee and establishes the voice call accordingly. Thus, the ECSP provides the additional service of email-based calling as per the callee and the ECSP/PBX system preferences and settings for an incoming call to the PBX from a caller to the callee, in addition to the usual service of completing the call to the callee. In this case, the call to the PBX would need to be extended to the ReU 116 by the PBX and may require using VoIP techniques. Unlike the caller registering for the on-line account, it is the callee that registers himself with the ECSP for the incoming calls to be received at his email addresses in addition to the phone numbers. The calling rules in this instance can be caller-ID of the caller based along with other parameters associated with the callee and system settings and preferences.

Customization may also be done to assist the callee to recognize and optionally authenticate the caller with the ECSP/PBX from the emails it receives for call initiation. For instance the email address in the "from" field of such emails may optionally be used by the callee to recognize and authenticate the caller with the ECSP/PBX as described elsewhere in this embodiments. Say the callee number is 123 and his email address is abc@xyz.com. Several instances of such rules follow:

Instance 1. For an incoming call to 123 from a phone number 456, let 123 ring first for five rings. If there is no answer, set up a call to abc@xyz.com. Use email address 456@xxyz.com to send the email "from".

Instance 2. For an incoming call to 123 from a phone number 789, let abc@xyz.com ring first. If there is no answer, set up a call to 123.

Instance 3. For an incoming call to 123 from numbers other than 456 and 789, let 123 and abc@xyz.com ring simultaneously. When the callee answers one of these, terminate the other call.

Instance 4. For an incoming call from any number other than 789 including calls with private numbers or missing caller ID, call only the email address abc@xyz.com.

The ECSP as described here can also be integrated with the infrastructure of regular phone operators that provide landline and/or mobile based calling for incoming calls to a callee. Such integration may require co-location or the operator infrastructure and the ECSP may be located independently and communicate via networks such as the internet and/or an intranet using well-known protocols. In this case, for a regular incoming call to a callee, the ECSP, now integrated with the phone operator infrastructure is communicated the caller and callee identification information (e.g., their phone numbers). The ECSP automatically checks to see if the callee has registered one or more email addresses for email calling with its account with the ECSP for the particular caller. If so, then the ECSP establishes parameters for calling one or more email addresses of the callee and establishes the voice call accordingly. Customization may also be done to assist the callee to recognize and optionally authenticate the caller with the ECSP/phone operator from the emails it receives for call initiation. For instance the email address in the "from" field of such emails may optionally be used by the callee to recognize and authenticate the caller with the ECSP/phone operator as described elsewhere in this embodiments.

Thus, the ECSP provides the additional service of email-based calling as per the callee and the phone operator/ECSP system preferences and settings for a regular incoming call from a caller to the callee in addition to the usual service of completing the call to the callee. In this case, the call from the callee's operator infrastructure would need to be extended to the ReU 116 and may require using VoIP techniques. Unlike the caller registering for the on-line account, it is the callee that registers himself for the incoming calls to be received at his email addresses in addition to the phone numbers. The calling rules in this instance can be caller-ID of the caller based along with other parameters associated with the callee and system settings and preferences. Say the callee number is 123 and his email address is abc@xyz.com. Several instances of such rules follow:

Instance 1. For an incoming call to 123 from a phone number 456, let 123 ring first for five rings. If there is no answer, set up a call to abc@xyz.com.

Instance 2. For an incoming call to 123 from a phone number 789, let abc@xyz.com ring first. If there is no answer, set up a call to 123.

Instance 3. For an incoming call to 123 from numbers other than 456 and 789, let 123 and abc@xyz.com ring simultaneously. When the callee answers one of these, terminate the other call.

Instance 4. For an incoming call to 123, ring abc@xyz.com only if the callee is detected by the mobile operator to be "roaming". If there is no answer, direct the call to a voice mail service and email that voice mail to the callee at email address abcd@xyz.com. Further, send an SMS to the callee at 123 with call and voice mail particulars, if any.

The system and method described herein thus far deals with a caller-callee phone call. It can also be extended for a conference call initiated by a caller to multiple callees via their email addresses and/or a mix of email addresses and other electronic addresses for some callees and electronic addresses (other than email addresses) for other callees. In that case the CaU 118 sets up calls with multiple callees and then merges them together along with the call between the caller and the ReU 116 for a conference call to take place.

Text Messaging

Further, for text messaging between two types of electronic addresses, namely email addresses and URLs, a system and method can be developed wherein the ECSP creates and maintains a data-base with affiliations between email addresses and URLs along with "texting rules". For instance, the ECSP may create email address for each user so that there is a one-to-one affiliation between a user's URL address and his email address by the ECSP. The same is done for each unique group of users. The users in a group are identified by their URL and email addresses. Communications in this case are processed as follows:

1. An email is received by the ECSP. The email address in the 'from' field identifies the sender and his URL, the ECSP email address in the 'to' field identifies a single or a group of recipients by their email addresses and/or URLs. The first sender is authenticated. For a single recipient with a URL address, the text message (e.g., in the subject or body of the email) is sent to his URL via the URL address of the sender. For recipients in a group with a group URL address, the text message (e.g., in the subject or body of the email) is sent to their URLs that constitute the URL address of the group. The sender is also identified via his URL. A similar task is performed for the recipients identified with email addresses.

2. A text message is received by the ECSP via a URL. The ECSP identifies the sender via his URL. The URL the text is sent to identify one recipient or a group of recipients by their email addresses and/or URLs. The first sender is authenticated. For a single recipient with an email address, the text message is sent to his email address via the email address of the sender with the ECSP. For recipients in a group with a group email address, the text message is sent to their email addresses via the group email address by the ECSP. The sender is also identified by including his email address in the email. A similar task is performed for the recipients identified with URL addresses. A mix of email addresses and URL addresses can also be managed in a similar manner.

Figure 30:
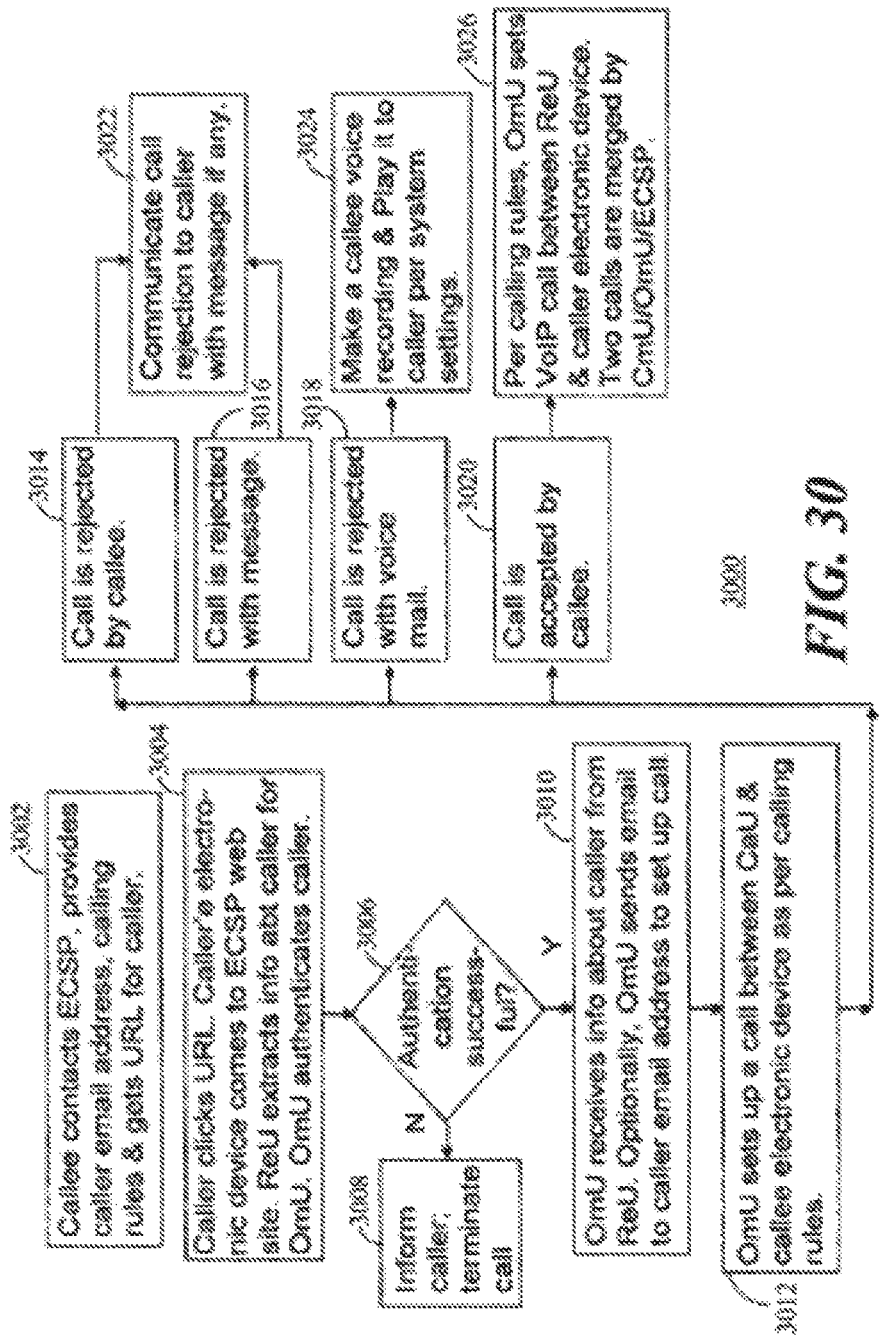
FIG. 30 depicts a flowchart for a conference call set-up procedure when knowing the caller/callee email addresses in accordance with the present embodiment.

Referring to FIG. 30, a flowchart 3000 for a call set-up procedure for a callee knowing a caller's email address is depicted. Here, systems and methods for enabling a voice call between a caller's electronic device and a callee's electronic device when the callee knows the caller's email address are described. Several extensions are also described.

In this case, at step 3002 a callee makes a voice call and/or data call including on-line access to the ECSP and provides the ECSP with the caller's one or more email addresses (and other electronic addresses, if any) along with calling rules if the caller were to call. The ECSP creates a URL that contains identifiers for the callee, the caller, the call, calling rules and so on, and passes it to the callee. Some of these identifiers may be optional. The callee may include this URL in his call to the caller or via other means such as email inform the caller of the URL. The URL may be partially encrypted to avoid any tampering. Such a URL can be stored by the caller as a phonebook entry in his phonebook. Such an entry in the phonebook can be used to perform the function of caller ID for incoming calls by a user.

The caller can now click the URL at step 3004 to initiate a call to the callee. As the URL is clicked by the caller, the caller's electronic device comes to the ECSP website. The ECSP processes the URL (including decryption if required) to extract identification for the caller and the callee. With these identifications, the ECSP proceeds to further extract the caller's email address from the URL in combination (if required as per user/system settings) with the on-line account information of the callee with the ECSP. The ECSP then proceeds to authenticate the caller by sending an authentication email to the caller at his email address for that purpose with call and callee information. The original URL may also be included. An email reply back from the caller may indeed confirm that he initiated the call be clicking the URL. The caller may also be required to enter a PIN/codeword/password (this may even be for one time use) on the ECSP website/page provided to him via the authentication email or otherwise.

Authentication can also be done via SMS in a manner similar to email authentication as described herein if the callee had included the caller's mobile phone number for that purpose in the URL. The process is terminated at step 3008 if authentication is not successful at step 3006. Once authenticated (step 3006), the ECSP determines the calling rules set by the callee for the call from the caller. Accordingly, the ECSP at step 3026 establishes a VoIP call between the caller's electronic device at the ECSP website and the ReU 116, another call between the callee and the CaU 118, and merges the two calls for voice communication between the caller and the callee to take place. The call between the caller's electronic device and the ReU 116 may also be set up by using the caller's email address as per callee/system settings/preferences. The call between the callee and the CaU 118 may be a VoIP call, a call to callee's email address, or a regular phone call as per callee/system settings. The ECSP at step 3022 may also inform the caller of call rejection (step 3014) or call rejection with message (step 3016), if any.

For the phone call between the CaU 118 and the callee, the call from the CaU 118 may also be placed from one of the CaU's multiple phone numbers as designated by the callee for receiving calls from the particular caller. The CaU 118 establishes calls to the callee from different CaU phone numbers for different callers. This can act as a caller ID for the call to the callee. Also different phone numbers of the callee may be called by the CaU 118 for different callers as per the calling rules.

As described earlier, the ECSP may also provide means for call/caller authentication for the call depending on the callee's choice. This may be preferred by the callee if the call between the callee electronic device and the CaU 118 is also set up via email. Such an authentication can also be based on an email and/or data/voice call.

As a further extension, a caller may create his own URL with his ECSP (e.g. call it ECSPx though ECSPx may also be the same as the ECSP) that includes the URL provided by the callee. Such a caller can create his own on-line account with ECSPx and use it for making calls to URLs provided to it. In such a case, when the caller clicks his own URL (e.g., URLx) the caller device comes to the ECSPx website and the ECSPx determines the caller identity, extracts the URL for the callee, and determines the calling rules. The ECSPx also performs authentication of the caller for itself as well as the ECSP, if required. The ECSPx then proceeds to establish a call between the caller's electronic device and the ECSPx and another call between the ECSPx and the callee device via the ECSP by clicking the URL supplied by the callee. The calls are merged by the ECSPx for a voice call between the caller and the callee.

It is also possible for the callee to not include caller authentication information in the URL and still identify and authenticate him. In this case, when the URL is clicked by the caller, the caller comes to the ECSP website. The ECSP website can prompt the caller to provide his identification information by entering it on-line or via a data/voice call. It may be on-line account information and a password, an email address, a mobile phone address or any other electronic address that may be used for the purpose. The ECSP then proceeds to authenticate the information provided by the caller by checking log-in information for an on-line account and/or sending an authentication email, SMS, or an appropriate communication to the electronic address provided. The information in the email may contain URLs or password/PIN that the caller is required to click or provide to the ECSP. Once the caller is identified/authenticated via his electronic address, the ECSP checks to see how the callee has set-up calling rules for such an electronic address and then proceeds to provide the calling service accordingly. It may result in the voice call being established or rejected as per the calling rules.

Figure 31:
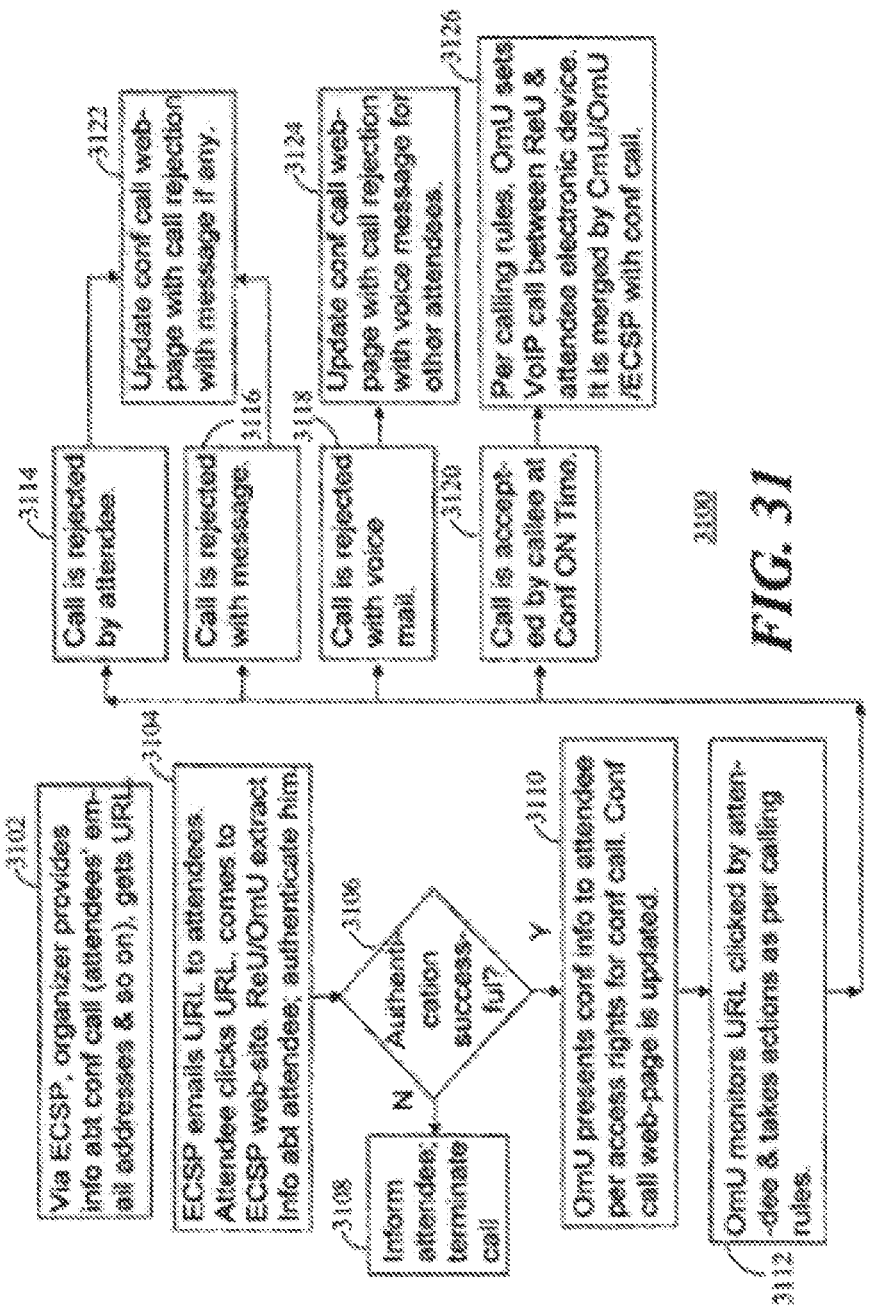
FIG. 31 depicts a flowchart for a call set-up procedure when knowing a caller's email address in accordance with the present embodiment.

FIG. 31 shows a flowchart 3100 for call set-up procedure for a conference call knowing email addresses of attendees/participants. Conventional URL based conference calling does not provide for attendee identification and authentication before they join the conference call. The present embodiment as described in the flowchart 3100 overcomes this prior art drawback. In this section, systems and methods for enabling a voice/conference call among multiple parties when these parties are known to the conference organizer via their email addresses are described. Say a user A wishes to organize a conference call among users A1, A2, . . . , An and that A knows users A1, . . . , An by their email addresses. The conference call has the following parameters:

Title/Identifier of Conference call
Organization
Organizer(s)
Chair(s)
Attendees names and email addresses
Schedule of conference call (e.g., time, date)
Documents
Other The user A is authorized to organize such a conference with the ECSP and signs into his on-line account with the ECSP. As the user enters the pertinent information about the conference at step 3102, the ECSP creates a web-page for it. Such a page creation, though optional, may be used to facilitate communication among the various parties and exchange of documents.

At step 3102, the ECSP further processes the email addresses of all the attendees and creates one or more customized URLs for each of them containing information on Conference call identifier (unique for all conferences)

The conference call particulars

Time/Date of the conference call

Identification/Authentication for the particular attendee the URL is to be sent to Identification of all attendees Access rights for various attendees for information and documents The conference call identifier is a string of alphanumeric characters that may optionally be encrypted partially or fully. Part of the information may be optional. However the URL must contain the conference identifier and the identifier/authentication information for the particular attendee the URL is customized for such that the ECSP may retrieve it. The attendee may be identified by a unique name or his email address or a sequence of alphanumeric characters that can be used to extract his unique name/email address via the on-line account/system. Part of the information in the URL may also be encrypted to protect it from tampering. For instance, an attendee may be sent three customized URLs, say URL1, URL2 and URL3; URL1 to just click and join the conference call, URL2 to have the ECSP call a particular phone number for the attendee, and URL3 for the attendee to indicate his unavailability for the conference call. At step 3104, each of the attendees is emailed his customized URLs for the conference call. Such emails may optionally contain information for a traditional way of conference calling whereby one or more conference call phone numbers along with one or more PINs are sent for the conference call. In addition, the PINs that are provided for the "traditional way" may be customized to the particular attendee in a way that when he enters the PIN, the conference call system is able to identify and authenticate the particular attendee at step 3106.

The ECSP may provide means for conference call authentication to the attendees (at step 3106) depending on the system settings and conference call originator's preferences. This can be done by sending the original emails to the attendees' email addresses from an email address specific to the conference call and optionally the originator of the conference call or another authorized person for the conference call. For instance, one such email address is ConfCallIdentifier_ConfCallOriginator@ECSP.com. One or more email addresses may also be included in the 'cc' field of the email. Thus, the attendee simply has to press the "reply" or "reply all" button optionally including some other information for authentication. Once such an email is received, the ECSP verifies identifications for attendee, conference call, and originator from the email addresses of the original call request and the email addresses in the attendee email including "to", "from" and "cc" fields and sends an email reply back authenticating the genuine nature of the conference call with the attendee. A similar system of conference call authentication can also be designed when the original emails are sent from a common email address of the ECSP. In that case ConfCallIdentifier and ConfCallOriginator identification and authentication information may be included in body/subject of the emails.

If a particular attendee clicks a URL in the email from the ECSP for a conference call, his electronic device comes to the ECSP where the first step for ECSP is to verify and authenticate that attendee for a particular conference call (step 3106). This may be done by first composing and sending a verification and authentication email to the attendee's email address retrieved from the URL, preferably/ optionally its encrypted part. In this process, the ECSP may also use the information about the conference call stored in its data-base. For instance, the ECSP may extract the unique conference identifier from a certain encoded/encrypted part of the URL and then extract the unique name/email address of the particular attendee from a certain encoded/encrypted identifier in the URL. The ECSP then checks with the conference call particulars stored in its database and verifies that indeed the identified person is registered for the particular conference call. Once this is verified, the ECSP then sends an email to the attendee's email address for authentication. The email address for authentication may be sent to an attendee's email address which may be the same or different than the email address the original URL was emailed to. The email reply by an attendee to such an email authenticates him for the particular conference call. Further, the attendee may be required to enter a PIN/password/ codeword extracted from emails sent by the ECSP on ECSP website/page for the conference call. Authentication can also be done via SMS in a manner similar to email authentication as described herein if the callee had included caller's mobile phone number for that purpose in the URL.

Once the attendee is identified and authenticated, his access rights are determined and accordingly he is presented with conference information by the ECSP at step 3110. This could be done by customizing, updating, and presenting the web-page for the conference (e.g., updates such as who has agreed to attend, who has declined) for the particular attendee as per his access rights. A clock may also be presented indicating the start time/date and the time left. Even information for the traditional way of conference calling may be provided to the attendee. If the particular attendee has clicked the URL for joining the call as determined at step 3112 and the conference start is close or if the call is already going on (Conf ON Time), the attendee may be placed in the conference call at step 3126 by establishing a VoIP call between the ECSP communications server for the conference call and the attendee's electronic device visiting the ECSP's website. Attendee's joining the call is announced (e.g., audio, image, multi-media announcement) to other conference attendees and displayed accordingly along with his particulars, if any. Similar actions may be taken by the ECSP for the other URLs clicked by the particular attendee once he is identified and authenticated.

For an ongoing call, in addition to voice/video conversation, the ECSP may also facilitate exchange of documents and a white board for discussion. Even exchange of text messages among peers or group of peers may be allowed. This may be done as per the device and network characteristics. As per settings, a conference call may also be recorded and made available to authorized users for later use. Other services such as transcription may also be provided. Billing information may also be documented. The system and the method described herein can also be used to set up conference calls at the moment of establishment with the ECSP.

It is also possible for the conference call organizer/ originator to not include caller authentication information in the URLs and still identify and authenticate him. In this case, when the URL is clicked by an attendee, the attendee comes to the ECSP website. The ECSP website can prompt the attendee to provide his identification information by entering it on-line or via a data/voice call. It may be on-line account information and the password, an email address, mobile phone address or any other electronic address that may be used for the purpose. The ECSP may even require that it be the same email address to which the original conference call notification was sent. The ECSP then proceeds to authenticate the information provided by the attendee by checking log-in information for an on-line account and/or sending an authentication email, SMS, or an appropriate communication to the electronic address provided. The information in the email may contain URLs or password/PIN that the attendee is required to click or provide to the ECSP. Once the attendee is identified/authenticated via his electronic address, the ECSP checks to see how the conference call organizer has set-up conference call rules for such an electronic address (step 3112) and then proceeds to provide the conference call service accordingly.

Other Enhancements

It will now be clear to those skilled in the art that the systems and methods for ECSP based communications in the present aspect may also be combined with the systems and methods described hereinbefore to provide for further enhanced user-experience to its users as described in these embodiments. For instance the ECSP may provide for conference call-shifting service to an attendee/participant to a conference call. Alternatively, voice calls may be encrypted. Voice mail servers may provide for URL based calling if a user wants to call back a caller at his email address for a missed call. Also, it will be clear to those skilled in the art that a VoIP call from a caller to a callee enabled via two VoIP calls, one between the ReU 116 and the caller and a second one between the CaU 118 and the callee, may also be provided using peer-to-peer SIP or some other peer-to-peer proprietary protocol. The same goes for conference calls among several persons. As described hereinbefore, although the terms call or voice call are used in many places in the description, such terms are also meant to include video/multimedia calls throughout.

The email provider may also provide call forward and other call related services to its email subscribers. For instance, a callee may register one or more of its phone numbers and other VoIP account information, pertinent information, and calling rules about incoming calls with its email provider. Examples of such pertinent information about incoming calls to a callee's email address with an email provider includes an email address in the "from" field or text in the "subject field" or a suitable combination of these two. When the email provider detects an incoming call for a callee via an email, it authenticates the callee with the ECSP associated with the incoming call. It also processes the received email to extract the caller identification information. Further, the email provider establishes the calling rules to process such a call. As per those rules, it may establish a call (or reject the call or do nothing) between its communications server and the caller via his ECSP by clicking the appropriate URL and another call between its communications server and the callee. The call to the callee may be at a designated phone number of the callee as decided by the calling rules for a call from that particular caller. The two calls are merged by the email provider to provide for a voice call between the caller and the callee. The callee may also have his calling emails (all or selectively) forwarded to another provider who may process the emails and provide call forwarding and other related services as described in the previous paragraph. This could be useful in situations when the original email provider does not provide call forwarding call related services as described.

Apps for User Electronic Devices

In an embodiment, there is provided an "app" to simplify the user experience for incoming and outgoing calls even further via the "app" that can run on a user electronic device. A suitable or an equivalent version of such an "app" can be a plug-in into email clients or they could be offered via web-based email systems. As emails are received by the user from pre-designated email servers from the ECSP web-server at www.ECSP.com, the "app" could be designed to process emails that the user device receives from all email addresses of the type abc@ECSP.com, abc being an arbitrary email ID for different ECSPs for different callers. The "app" can then create audio/multimedia notification for the incoming call including caller identification and represent various possible actions (e.g., authentication, call answer, call reject) via possible hyperlinks embedded in images, videos or other information. This could be especially useful for mobile and touch based electronic devices whereby the user may have the same experience of answering/rejecting a call based on incoming emails as he has for regular voice calls. Similarly, an address-book based on a URL address (preferably provided by a callee) for calling a callee, initiating such a call via selecting an address-book entry and pressing the call button, authentication and call logs can be built and provided for by the "app" as a "select & call" experience. Address-books may also be constructed identifying callers by their email addresses to provide for caller ID information for incoming emails. Appointment entries in various calendars can also be automated. Voice and/or data calls for initiating a call to an email address can be implemented such that when the user selects an email address in the "app" by highlighting the associated name and presses the call button, the "app" automatically executes all the steps required to set up the call. Even email based call set up can be provided by the "app" as a "select & call" experience to a user. Hyperlinks and URLs may also be automatically created for all the entries (phone numbers, email addresses) in the address-book by the "app" and the user may be given an option to call any person in the address-book via the methods described herein. The "app" may also run on a user electronic device such that whenever it detects an email address (e.g., in a document, IM, email or in a web-page) on the user electronic device, it displays an icon for the email address. A voice call is established between the user electronic device and the corresponding email address when the email address is selected, by clicking the icon or via other means.

VoIP clients may also offer this "app" customized such that when the email address is selected, by clicking the icon or via other means, a voice call is established between the VoIP client running on the user electronic device and the corresponding email address. The same may also be done for the incoming calls to an email address of a callee by a VoIP client running on a user's electronic address. The ECSP may need account log-in information (e.g., account name, password) for the various user accounts with other on-line providers in order to send or retrieve certain information. Such account log-in for a user may be provided on a one-time basis in advance and stored in his on-line account with the ECSP or may be provided to the ECSP via a voice/data call or an email.

Though it is shown that the various constituent units of the ECSP in FIG. 1 are located in proximity to each other, they may alternatively be located in diverse locations, communicating with each other using well-known protocols and high speed networks. There may also be multiple copies of each constituent unit located in geographically diverse locations to better serve the customers in multiple geographic regions.

Facilitating the Callee.

Figure 32:
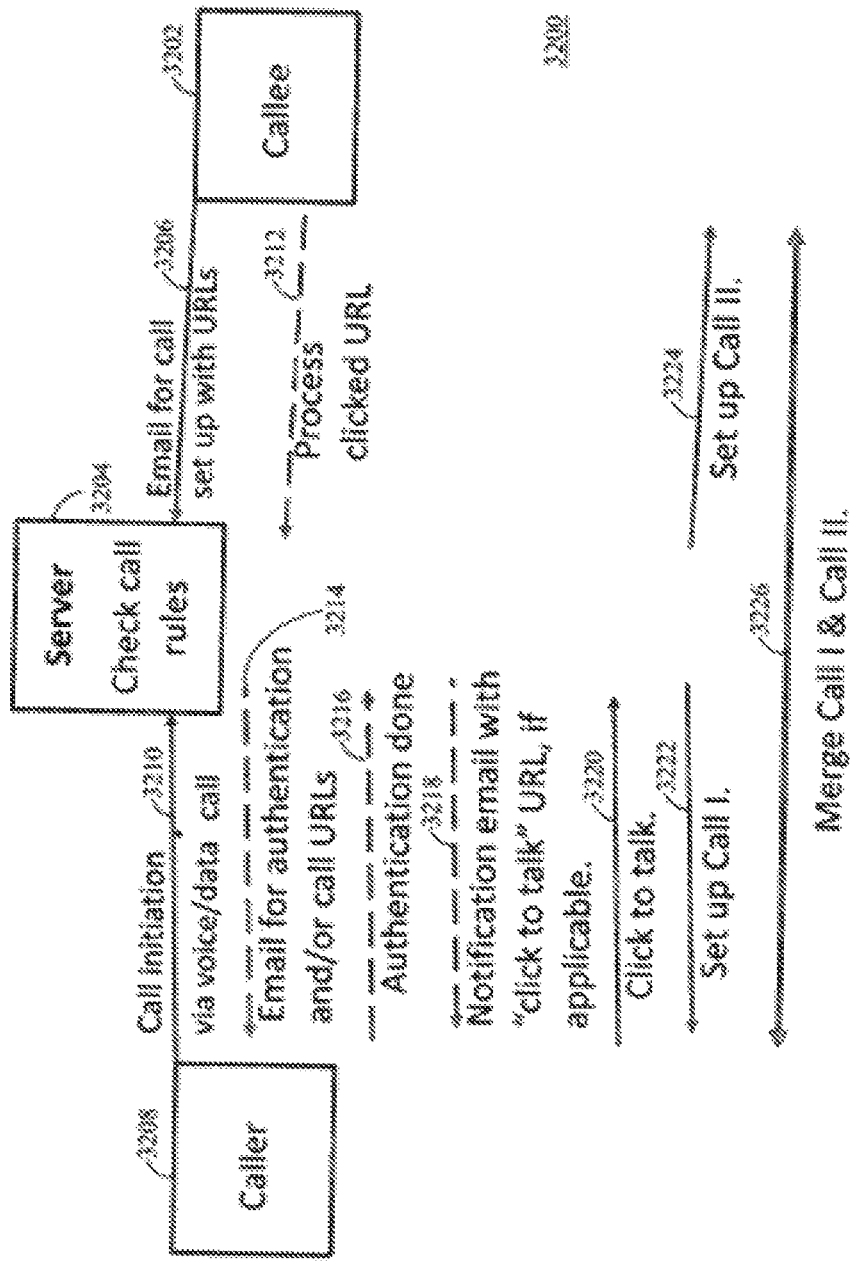
FIG. 32 depicts a flowchart for call initiation and processing via voice or data call in accordance with another aspect of the present embodiment.

Referring to FIG. 32, a diagram 3200 depicts operation where a recipient/callee 3202 sets up call rules with a server 3204 and/or with his email provider by sending an email 3206 indicating how to manage an incoming email for a call. Such emails can be identified via email addresses of the callee, the caller, email addresses in a "cc" list, a subject, other identifiers included in body of the email or callee information stored with the Server. For instance, a recipient can include additional email addresses including addresses with the server 3204 for email call initiation to be sent to and/or phone numbers for the call to be connected to. Such calls may automatically be rejected beyond certain time intervals. A recipient account may be configured to send/forward an email for a call to one or more email addresses. All of this can be done based on caller identity, other information including callee's information, and rules/parameters.

In all embodiments, as a caller 3208 initiates 3210 a call via any of the methods, the caller 3208 may also indicate whether he wants to initiate a voice and/or multimedia call. In such a case or even in general, the URLs sent to the callee(s) 3202 include such URLs that can set up either a voice call or a multi-media call depending on the URL clicked by the callee 3202. Once the URL is clicked 3212 by the callee(s) 3202 to begin the call, the server 3204 may also present 3214 options to the caller 3208 to select and enter numerical digits via a keypad, turn on a speaker, mute the call, route the call to the headset and other such call related functions. Exchange of documents, text messaging, is also supported during an ongoing call.

Call Initiation Via URLs.

Callers may also click a call URL (provided by the caller, callee or third party) to initiate a call to an email address whereby the information pertaining to the callee and/or caller email address(es) and/or phone numbers for voice/SMS is embedded in the URL. Such URLs may also incorporate call rules set up by the caller/callee(s) or both. Such information may be one or more email and other addresses of the callee in plain or encrypted form or in a codeword form which may additionally be included in encrypted form. The server 3204 then processes the URL clicked, extracts email and other address(es) to be used for calling, and other call rules to be used for the call. The clicking of URL 3220 is also used by the server 3204 to set up a call between itself and the caller 3208 preceded, optionally, by caller authentication 3216, 3218 by email or other suitable means such as account name and/or password. Alternatively, the clicking of the URL by a caller 3208 may trigger sending of an email with call URLs to the caller email address. A call is established 3222 by the server 3204 between itself and the caller 3208 if the caller clicks the appropriate URLs contained in such an email. Clicking 3220 of the original call URL by the caller 3208 triggers an email with call URLs sent to the callee's email address. The server 3208 establishes 3224 a call between itself and the callee 3202 if the callee clicks 3212 the appropriate URL contained in the email. Finally, the server 3204 merges 3226 the two calls for the call between the caller 3208 and the callee 3202 to take place.

Figure 33:
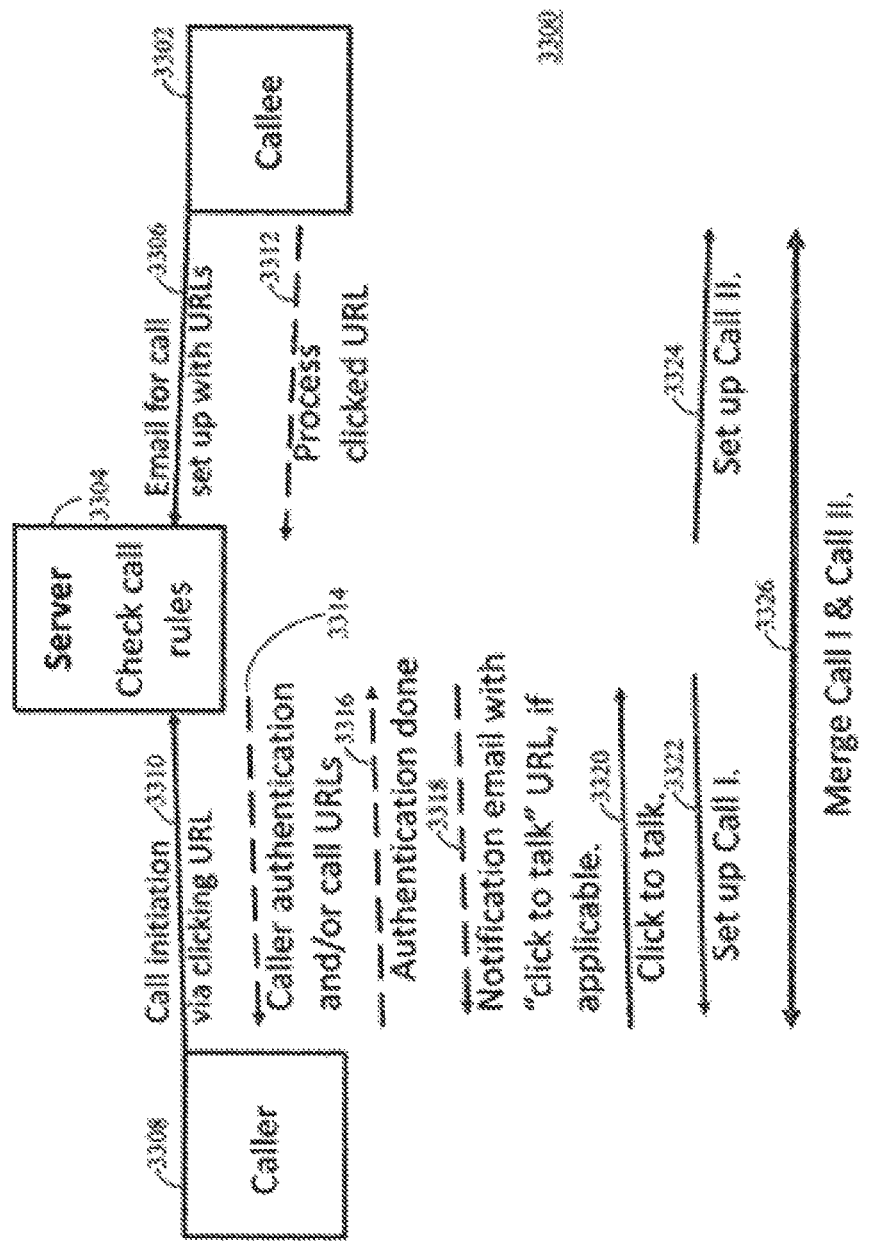
FIG. 33 depicts a flowchart for call initiation and processing via URL in accordance with the other aspect of the present embodiment.

Similar to the processing of the diagram 3200, FIG. 33 depicts a diagram 3300 of a call initiation by the caller 3308 and processing via URLs. The server 3304 may also use the website/page the URL is clicked at to further customize the call processing (such as caller authentication 3314, 3316 if the caller 3308 is logged into his/her on-line account with the website) and other multimedia content presented to the caller 3308 and the callee 3302. It may even be a conference call with the URL containing contact information (directly or via a codeword) of the various callees (email addresses, phone numbers).

Integration with Email Clients.

The URL based call initiation may be performed via an independent application software and/or an email client running an application software as a plug-in. It may also be a browser plug-in and/or a plug-in to web-based versions of email clients or other on-line email systems. As the application detects an email address and/or a user selects an email address with the application, it generates one or more URL for call initiation (including tiny URL) and/or voice mail and displays it directly or indirectly by embedding it in a call icon that can be image and/or multimedia based. The application may also integrate presence management via email clients into the URLs (e.g., red if available for call, green if not) and other displays as per various callees' availability for taking the call. For example, one URL may be for a voice call and another URL may be for a video call. The email address mentioned here also includes group email addresses. In such a case, when the URL is clicked, the email client also sends one or more emails to server 3304 and/or the callee(s) 3302 such that the URL and the emails are both used in a coordinated manner for call set up between the caller 3308 and the callee(s). The email client/system and/or the server 3304 may also provide for a customized message (text or multi-media) to be included in the emails sent to callee(s).

The email clients as described here may also be used to facilitate incoming emails for call set up. In this case, the incoming email address and contents of the email (including subject field) may be used to identify that the email is meant for a call set up and the callee device with the email client may present the call URLs in the email to the callee in a more user-friendly manner. For instance the URLs may be converted to icons (e.g., green phone to answer, red phone to reject, face for video call) and also incorporating and playing appropriate audio ringtones possibly customized for each incoming caller. Call rules that the callee has for such call may also be built into the email client via application programming or a plug-in.

Direct Call Initiation by a Caller.

Figure 34:
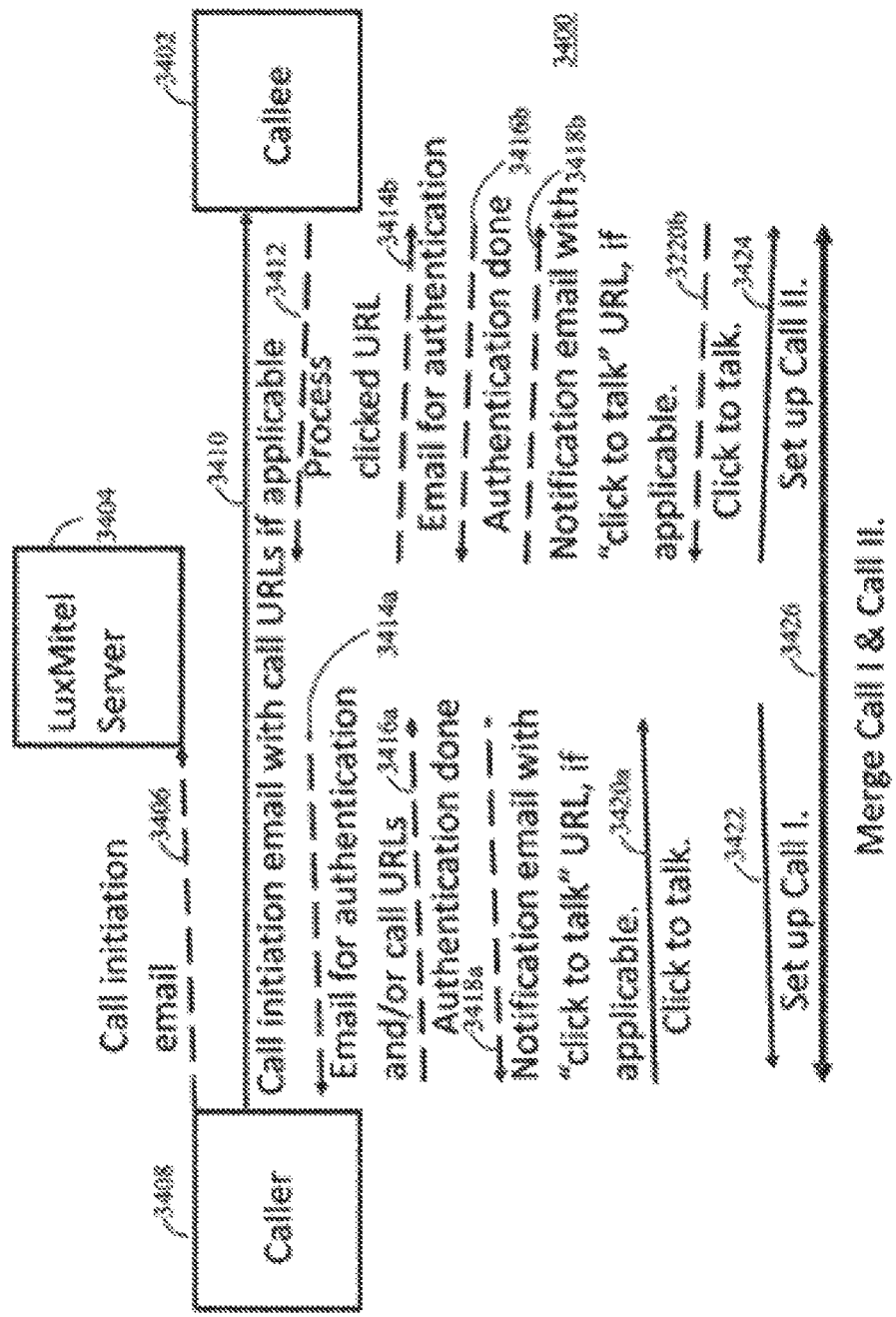
FIG. 34 depicts a flowchart for direct call initiation by the caller in accordance with the other aspect of the present embodiment.

Referring to FIG. 34, a diagram 3400 depicts processing and call initiation in accordance with a direct call initiation by a caller 3408. The caller 3408 may send 3410 an email/message with call URLs directly to callee(s) 3402 or to callee(s)' and the server's address(es). When the callee 3402 clicks the URL 3412, the serve 3404 processes the URL and other information (such as caller's email/message) to set up 3424 the call between itself and the callee 3402 by identifying and optionally authenticating 3414b, 3416b the callee(s) via callee(s)' address(es). Using the URL and other information (such as caller's email/message), the server 3404 also identifies and optionally authenticates 3414a, 3416a the caller address (e.g., email address(es), phone number(s)) and establishes a call 3426 between the server 3404 and the caller 3408. For instance, the server 3404 may send an email/message to the caller's address(es) (e.g., email, SMS, chat box) with call URLs that identify that the email and call URL contained inside correspond to the call initiated by the caller 3408. The caller 3408 can then click 3420a an appropriate URL for call set up between itself and the server 3404. The two calls are merged 3426 for the call between the caller 3408 and the callee(s) 3402 to take place. Peer-to-peer communication may also be used for the call once it is set up.

The email based (direct or otherwise) call initiation may be performed via an independent application software and/or an email client running an application software. As the application detects an email address and/or a user selects an email address with the application, it generates an icon for the option of email based call initiation and displays it. Such an icon can be image and/or multimedia based. In such a case, the email client may send one or more emails to the server 3404 and/or the callee(s) 3402 such that they are used together in a coordinated manner for call set up. Again, the email clients as described here may also be used to facilitate incoming emails for call set up.

Further value added services may be provided if a call to an email address is not answered. For instance, after a lapse of reasonable time after the email is sent, the caller 3408 may be asked to leave a voicemail for the callee 3402 which is delivered to him via an email (either as a voice-file attachment, text via speech-to-text conversion either in body or attachment, or via a URL link for on-line access). Further information (text, graphics, documents, spreadsheets, multimedia content) may also be exchanged during the call. Separate URLs may be provided for calls to be purely audio and/or video and/or multimedia calls.

The application software running on a smart device (e.g., phones, TV, watches, tablets, laptop computers, desk-top computers, gaming consoles, wearables) may also provide for connectivity with other smart devices for overall call management (e.g., call set-up, call initiation, receiving, answering). For instance, Bluetooth may be used to connect a tablet and a headset and the call may be initiated with a click of a button on the headset. Similarly, gaming consoles may be connected to a handset.

Figure 35:
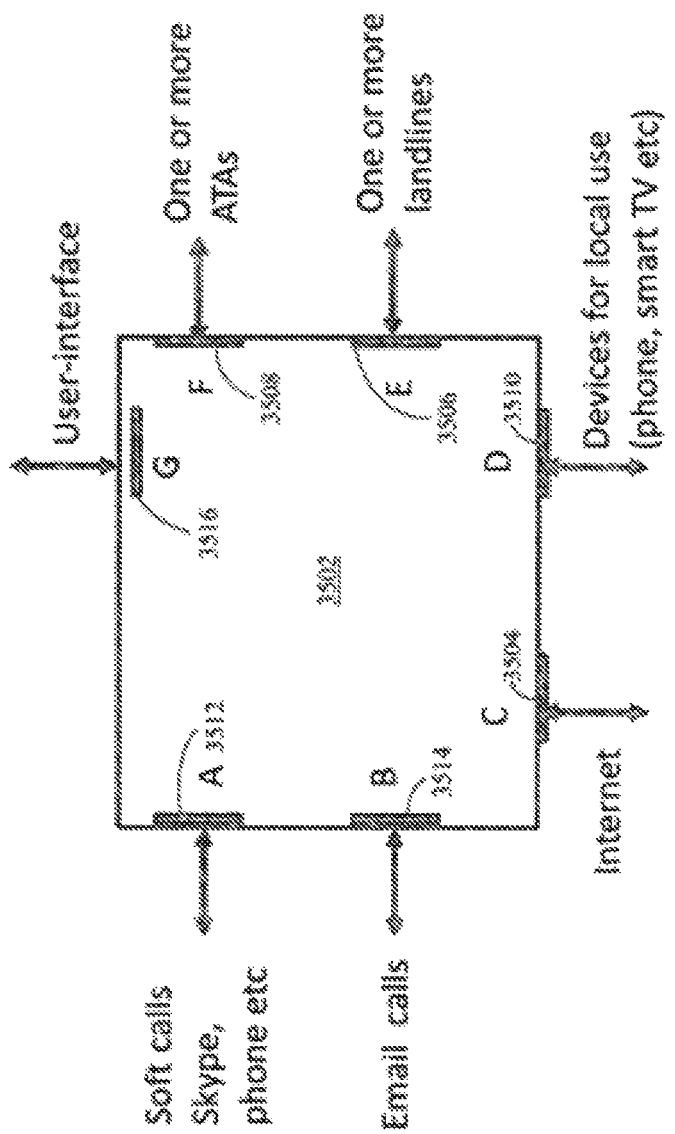
FIG. 35 depicts a block diagram of an interface device in accordance with the present embodiment.

The Device Referring to FIG. 35, a block diagram 3500 of a device 3502 with processor, memory (RAM and hard disk), keypad and keyboard, display, one or more radios for wireless communications both locally and globally, special purpose call-processing boards, and other appropriate hardware/software for call processing is depicted. A basic configuration of the SLC (Soft Landline Converter) has been described earlier. The device 3502 includes hardware and software for the purposes of providing complete functionalities of connecting and processing calls (both voice and multimedia) originating and terminating over different networks (e.g., PSTN, mobile/cellular, Internet) via different means (e.g., wired, wireless, cellular, 3G, 4G, LAN, WLAN, Bluetooth, cordless). An SLC may also be incorporated in the device 3502.

Hardware and Device Configuration

The device 3502 has multiple interfaces with means to connect to and configure and may be connected to a computing device connected to the broadband internet via wired and/or wireless means (e.g., USB port, WiFi, serial port). Thus, the device 3502 may secure power and/or internet connectivity via such a computing device. The broadband internet via an interface 3504 is directly connected via one or more wired or wireless means (routers, cable modem, DSL, WiFi, 3G, LTE, LAN, WLAN), via a landline interface 3506 and/or via an ATA interface 3508. The device 3502 also provides for ports (wired and/or wireless) 3510 and means for connecting other appliances to the device 3502 for providing broadband connectivity to them. It also provides the ports 3506, 3508 and means for connecting to the device 3502 one or more regular/ATA-based phones (wired, wireless, cordless, WiFi). It may also incorporate an ATA and also have built in one or more phones and interfaces for voice/multi-media calls 3512, 3514. Via its processors and radios, the device 3502 also has means for connecting the device 3502 to one or more other computing devices communicating in wired and/or wireless manner and that have one or more soft phones running on them and managing communication with and among them.

The device 3502 may be in one or more physical partitions in communication with each other to provide its overall functionality.

The various types of interfaces that the device 3502 has are shown in the diagram 3500 and the device 3502 may have one or more interfaces of each type. Also the interfaces 3504, 3512, 3514 require broadband internet connectivity. They are shown separately to provide a clearer understanding of the device 3502 functions as described hereinbelow. The device 3502 incorporates and performs functions of an SLC and uses them to manage overall communication taking place via the Device.

Software and Device Configurations

Figure 36:
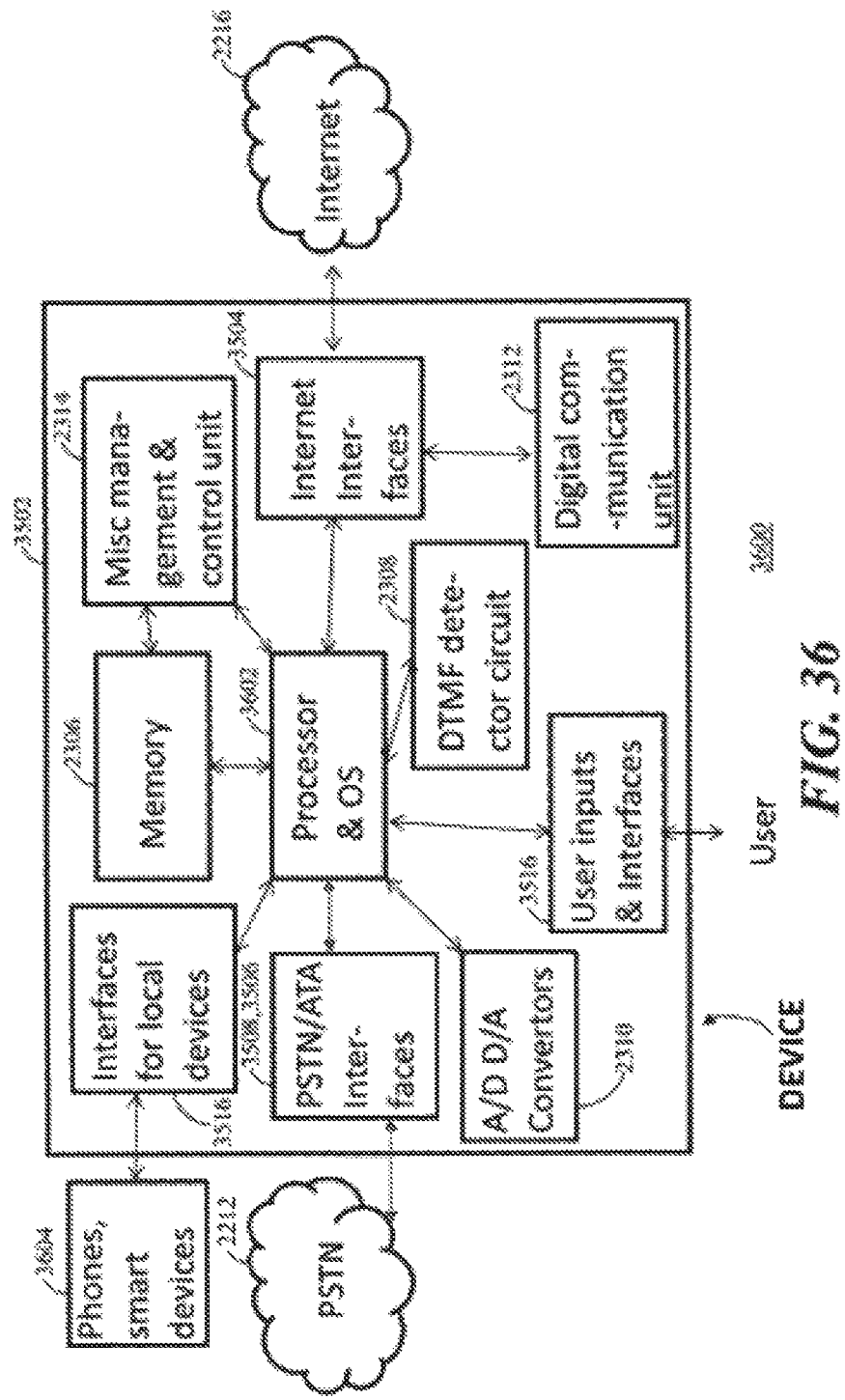
FIG. 36 depicts a block diagram for a system using the interface device of FIG. 35 in accordance with the present embodiment.

Referring to FIG. 36, a block diagram 3600 depicts the system configuration of the device 3502. The device 3502 has an OS in a processor 3602 to define, program and customize its overall functions. Via the processor 3602 and its OS, the device 3502 can be managed locally via the user interface and input means 3516 on the device 3502, and/or remotely via the internet 2216 and/or by another computing device connected to the device 3502 in a wired and/or wireless manner. The device 3502 can access the internet 2216 and can download and configure software apps required for its various functions. Using the processor 3602, the device 3502 can receive and process emails and perform tasks as per the user setting and call rules. For many such purposes, it may require user preferences, call rules, on-line account names, passwords and other such information.

The device 3502 may be used to serve more than one user. For incoming calls, the callers for a user can be identified via caller ID and other means such as an email address in a 'from' field of an incoming email for a call. For outgoing, a step of user identification via entering a user ID or a password/codeword can be incorporated. Device activity (e.g., call logs) can be provided to users using on-line accounts. The device 3502 can be used for texting and exchange of other types of information and content (e.g., documents, files, multimedia) on its own or during an ongoing call.

The device 3502 can be partitioned in a Server and a Device configuration. In such a case, the Server (same or distinct as the server 3204, 3304, 3404) can simultaneously work with multiple devices. Overall functionality of the device 3502 can be split between such on-line Server and the device 3502. Such a Server may also be implemented on a connected computer.

In one embodiment, the Server may host callee/caller information and caller/callee rules for one or more users. Email(s) for a call to a callee can be received and processed by the Server (including caller authentication). Emails for a call can be identified via email addresses of the callee, caller, email addresses in a cc list, subject line, or other identifiers included in body of the email and callee information with the Server. The Server then converts the incoming call to a call such that one or more of existing landline/ATA/softphones some or all of which may be a part of the device 3502 can be used for receiving the calls as per the rules set up by the callee. As the callee/recipient interacts with the Device/landline/ATA/Softphone, the Server executes the corresponding commands such as click the 'call accept' URL or 'call reject' URL. The Server also facilitates overall call set up and its management. Once a connection is made, the voice/multimedia communication takes place. In addition to processing the call, the Server may also have the option of forwarding the email for a call to one or more email addresses specified by the callee. These may also be done simultaneously or in a certain order specified by call rules.

In another embodiment, the Server is merged with the server 3204, 3304, 3404 to provide a full range of call services (e.g., forward calls to email addresses or phone numbers) including call services described earlier. The callee can set up call rules to process calls initiated by a caller including rules that are based on caller_ID and other related parameters such as time.

In yet another embodiment, the device 3502 has all the functionalities of the Server built into the device 3502 itself. In this case, the device 3502 is a complete instrument for processing incoming, outgoing and other peripheral communications. Thus, the device 3502 may set-up calls for a caller to callees' email addresses and receive emails (for calls) for callees. Similarly, calls can be made and received over VoIP applications such landlines and ATAs. The device 3502 also provides further functions such as taking an incoming call over a landline/ATA and forwarding it to an email address and/or vice-versa. Similar functions can be provided for outgoing calls as well. The device 3502 may also be used for initiating calls to multiple caller addresses and/or multiple callee addresses. Further, it may be used for device exchange for an ongoing call.

Additional Features and Functions

Different phones can be made to ring for incoming calls depending on rules with parameters such as incoming caller ID, email IDs/phone number, time and place. More than one phone can be used simultaneously for talking to the same or different destinations. Different ringtones can be used depending on rules with parameters such as Caller_ID, email IDs/phone number, time or place for incoming calls. Caller_ID can be displayed on the device 3502 and or other appliances PC, mobile phones, smartphones and/or watch. The device 3502 may provide for voice (includes video) calls. Different phone books (with email addresses) for one or more persons can be also be built in. The device 3502 may be used for simultaneously managing one or more incoming and outgoing calls and may be managed via remote control.

Receiver Operation

An incoming call can either by received via email or broadband internet or landline (traditional and/or via ATA). Likewise, an outgoing call can either be made via email or broadband internet or landline (traditional and/or via ATA). Also, a user may monitor the device 3502 call and line activity via the mobile and other devices connected to the device 3502 via the internet 2216 or locally. Hence in all respects, the device 3502 provides for a means to access, manage and use all the various communication systems and services (e.g., landlines, ATA, landline/ATA calls, VoIP calls, email calls) individually or collectively as per the user settings.

The device 3502 can be used to manage incoming calls such that they are terminated at a phone 3604 connected locally to the device 3502 via WiFi, cordless, Bluetooth and/or wired means or forwarded to a remote destination via the internet/landline/ATA. Similarly, the device 3502 can be used to make outgoing calls to remote destinations (email calls, phone calls, ATA calls, and/or VoIP calls) in a simple manner via the regular phone 3604 connected to the device 3502. A more complete user interface 3516 on the device may also be used for the purpose. The device 3502 may also be accessed remotely for making such outgoing calls.

The device 3502 can be used to manage incoming calls such that they are converted to outgoing calls in a way that they may be received as a call at a remote and local device simultaneously or sequentially as per call rules.

The device 3502 can also be used to monitor and participate remotely and/or locally in any ongoing conversation as per user and system settings and authorizations.

Incoming Calls:

For a call coming in via the landline/ATA interface 3506, 3508, the device 3502 detects the caller ID, line ID and other parameters such as time of day. Based on these parameters, the device 3502 then looks up the call rules for processing such a call. The actions it performs can range from doing nothing, to terminating at a local device, to providing for remote access via a soft phone app, VoIP call or an email call on a remote device using the internet 2216. For remote access, the device 3502 may pick up to answer the incoming call if the user indicates call acceptance. Similar steps are taken for call rejection. For local access, the device 3502 indicates an incoming call via devices connected to it, most likely the regular phone 3604.

The user may interact with the device 3502 via the regular phone 3604 due to simplicity of handling for incoming calls. Again, the device 3502 may pick up to answer the incoming call (by clicking an appropriate URL for an email call) if the user indicates call acceptance on the phone 3604 and sets up the call. The device 3502 may provide for remote monitoring and participation in the call via VoIP and/or email call means. In addition, calls are merged by the device 3502 for overall communication to take place.

For a call coming in via VoIP, the device 3502 detects the call parameters from/to IDs. Similarly, for emails the device 3502 extracts the email and parameters via email addresses, subject field, and content of the email and determines if it is an email call. For email calls, the device 3502 may also perform caller authentication if required as per user settings. It also determines other parameters such as time of day. Based on these parameters, the device 3502 then looks up the call rules for processing such a call. The actions it performs can range from doing nothing, to terminating at a local device, to providing for remote access via a phone/ATA call, soft phone app, VoIP call or an email call on a remote device using the internet 2216. For remote access, the device 3502 may pick up to answer the incoming call (select the corresponding URL for an email call) if the user indicates call acceptance. Similar steps are taken for call rejection. For local access, the device 3502 may pick up to answer the incoming call if the user indicates call acceptance via a device (such as phone) connected locally to the device 3502. Similar steps are taken for call rejection. For local/remote access, the device 3502 may provide for remote monitoring and participation in the call via VoIP and/or email call means. Calls are merged by the device 3502 for overall communication to take place.

Outgoing Calls:

The device 3502 can be used to make outgoing calls to remote destinations (email calls, phone calls, ATA calls and/or VoIP calls and or a mix of such calls) in a simple manner via a regular phone. A more complete user interface on the device may also be used for the purpose. For example, a user may enter #1 in a regular phone connected to the Device to indicate an email call to be made to abcdef@email.com by the device 3502. ++1 may indicate a VOIP call to a VOIP ID abcdef. Different users may set up the device 3502 functionality as per their preferences. The device 3502 may also provide for remote monitoring, and participation in the call via VoIP and/or email call means. The calls may also be conference calls where participants are dialed at one time or one by one.

Monitoring of on-Going Calls:

When a landline/ATA is used to make a call independent of the device 3502, the device 3502 may provide for remote monitoring and participation in the call via VoIP, soft phone and/or email call via the landline/ATA connected to the device 3502.

The device 3502 further includes one or more codecs operable by the processor 3602 and coupleable between the interfaces 3504, 3506, 3508, 3510 and the processor 3602. The processor 3602 selects one of the codecs for initiating and or controlling a call in response to information associated with the caller and/or the callee accessing or accessed by a call and stored in the memory 2306, the codecs being either or both of video codecs and audio codecs.

The systems and methods described here can be extended to the case of more than one SLC per landline phone line. Also, an SLC may provide for soft landlines to two or more landline phone lines with a user device having phone "app" for one or more of these soft landlines as per user preferences and overall system and access settings.

It will be appreciated by a person skilled in the art that numerous variations and/or modifications may be made to the present embodiments as shown in the embodiments without departing from the scope of the embodiments as broadly described. The embodiments are, therefore, to be considered in all respects to be illustrative and not restrictive. Implementation of the techniques disclosed herein may permit users to take advantage of significant technical benefits, including the fact that it may not be necessary for a user to download a software application for use at the user's electronic device. Thus, advantageously a user need not go to the trouble of downloading and installing a software application on his electronic device. In at least some implementations, the techniques disclosed herein may provide for true "one-click" calling requiring only, for example, selection or activation of a URL (uniform resource locator) for a communication session to be set up between the calling electronic device and the recipient electronic device. After selection or activation of the URL, all necessary procedures and communications system transactions for setting up the communication session may be automatically executed. Thus the techniques disclosed herein, and as described in details thus far, may allow a user to make a voice/video/conference call to a calling device from a provider's website in a one click manner when the user is navigating/browsing the internet using a standard web-browser or mobile/tablet web browsers on his electronic device. It may be that the user does not need to download any software or carry out any software/system configuration. The call may be established between a user's electronic device via the provider's page that the user is browsing. It is not necessary that a unique website is maintained at the web server for the ECSP for each and every calling electronic device that may be called during service. It may be that all that is necessary is for the user to be directed to the ECSP website and thereafter the communications server apparatus extracts or otherwise processes the URL for pertinent information. Also, for a user that reaches the web-page of an ECSP (e.g., www.ECSP.com) by clicking a URL, the ECSP page/web-page may have a communications application embedded therein for facilitating the communication session between the electronic devices of the users. When the page renders in, say, a web-browser of an electronic device, the web-page information communicated to the user electronic device may comprise application code for channeling the communication session between two user electronic devices. The communications application runs in the web-browser, perhaps in the background. That is, the ECSP communications server apparatus is configured to transmit application code to the user device for the application to run in the background of a web-browser program on the user electronic device. Finally, such an application may not be necessary for the more recent browsers that come equipped with protocols for real-time voice/video communications.

Thus, in accordance with the present embodiment, advantageous and robust systems and methods for user-controlled call management, including call initiation, call facilitation and call control. While exemplary embodiments have been presented in the foregoing detailed description of the embodiments, it should be appreciated that a vast number of variations exist. For example, those skilled in the art will realize from the teachings herein that the present technology may utilize any suitable software or hardware to implement the various embodiments.

It should further be appreciated that the exemplary embodiments are only examples, and are not intended to limit the scope, applicability, operation, or configuration of the embodiments in any way. Rather, the foregoing detailed description will provide those skilled in the art with a convenient road map for implementing an exemplary embodiment of the embodiments, it being understood that various changes may be made in the function and arrangement of elements and method of operation described in an exemplary embodiment without departing from the scope of the embodiments as set forth in the appended claims.

What is claimed is:

1. A method for establishing a call between two or more parties, comprising the steps of:

establishing a first call between a first party and a server by the first party dialing a phone number or selecting a VoIP address for establishing the first call;

identifying, with a processor of the server, a second party from information obtained by a first interface of the server extracting the phone number dialed for establishing the first call using a Dual Tone Multiple Frequency detector, or obtained by a second interface of the server extracting the VoIP address selected for establishing the first call from one or more data messages received at the second interface, the information being representative of at least one email address associated with the second party; and after establishing the first call, sending, with the processor, one or more URLs to the at least one email address associated with a second party;

responsive to the second party accessing one of the one or more URLs, processing, with the processor, the accessed one of the one or more URLs to determine that a second call is to be established between the server and the second party; and merging, with the processor, the first call between the first party and the server with the second call between the server and the second party.

2. The method of claim 1, wherein establishing the first call between the first party and the server includes the first party contacting the server via at least one selected from a group consisting of a data call, a voice call, a video call, a multimedia call, and an email.

3. The method of claim 1, wherein the sending of the one or more URLs to the at least one email address associated with the second party is responsive to the first party initiating the first call between the first party and the server.

4. The method of claim 1, wherein the first call between the first party and the server and the second call between the server and the second party includes at least one selected from a group consisting of a data call, a voice call, a video call, and a multimedia call.

5. The method of claim 1, wherein establishing the first call between the first party and the server includes the first party providing one or more electronic addresses to the server for the first call between the first party and the server.

6. The method of claim 1, wherein establishing the first call between the first party and the server includes sending one or more further URLs to an email address associated with the first party, and, responsive to the first party accessing one of the one or more further URLs, establishing the first call between the first party and the server.

7. The method of claim 1, wherein the one or more URLs are associated with respective call control instructions include at least one selected from a group consisting of answering the call, rejecting the call, rejecting the call with a message back to the caller, forwarding the call to another electronic address.

8. The method of claim 1, wherein establishing the second call between the server and the second party includes processing the accessed one of the one or more URLs to identify an electronic address associated with the second party.

9. The method of claim 8, wherein the electronic address is extracted from the accessed one of the one or more URLs.

10. The method of claim 8, wherein the electronic address is identified based on an identifier extracted from the accessed one of the one or more URLs.

11. A server system for establishing a call between two or more parties, the system comprising:
a first interface for receiving a first call from a first party to the server system by the first party dialing a phone number, the first interface configured to extract the phone number dialed for establishing the first call using a Dual Tone Multiple Frequency detector of the server system;
a second interface for receiving the first call from the first party to the server system by the first party selecting a VoIP address, the second interface configured to extract the VoIP address selected for establishing the first call from one or more data messages received at the second interface; and
a processor configured to identify a second party from information obtained by the first interface or the second interface, the information being representative of at least one email address associated with the second party,
wherein the server system is configured such that, after the first call is received, the processor is configured to
send one or more URLs to the at least one email address associated with the second party,
process, responsive to the second party accessing one of the one or more URLs, the accessed one of the one or more URLs to determine that a second call is to be established between the server system and the second party,
establish the second call between the server and the second party, and
merge the first call between the first party and the server system with the second call between the server system and the second party.

12. The system of claim 11, wherein the processor is configured to contact the server system via at least one selected from a group consisting of a data call, a voice call, a video call, a multimedia call, and an email.

13. The system of claim 11, wherein the processor is responsive to the first party initiating the first call between the first party and the server system.

14. The system of claim 11, wherein the first call between the first party and the server system and the second call between the server system and the second party includes at least one selected from a group consisting of a data call, a voice call, a video call, and a multimedia call.

15. The system of claim 11, wherein the processor is configured to provide one or more electronic addresses to the server system for the first call between the first party and the server.

16. The system of claim 11, wherein the processor sends one or more further URLs to an email address associated with the first party, and, responsive to the first party accessing one of the one or more further URLs, establishes the first call between the first party and the server system.

17. The system of claim 11, wherein the one or more URLs are associated with respective call control instructions including at least one selected from a group consisting of answering the call, rejecting the call, rejecting the call with a message back to the caller, and forwarding the call to another electronic address.

18. The system of claim 11, wherein the processor processes the accessed one of the one or more URLs to identify an electronic address associated with the second party.

19. The system of claim 18, wherein the electronic address is extracted from the accessed one of the one or more URLs.

20. The system of claim 18, wherein the electronic address is identified based on an identifier extracted from the accessed one of the one or more URLs.

* * * * *